United States Patent [19]
Smith et al.

[11] Patent Number: 6,154,186
[45] Date of Patent: *Nov. 28, 2000

[54] ELECTRONIC ENTERTAINMENT AND COMMUNICATION SYSTEM

[75] Inventors: Darren C. Smith; Kenji Nishizawa, both of Bellevue; David J. McCarten, Bothell; Ramin Ravanpey, Seattle; Russell G. Braun, Redmond, all of Wash.

[73] Assignee: Nintendo Co., Ltd., Kyoto, Japan

[*] Notice: This patent is subject to a terminal disclaimer.

[21] Appl. No.: 09/100,022

[22] Filed: Jun. 19, 1998

Related U.S. Application Data

[60] Continuation of application No. 08/818,123, Mar. 14, 1997, which is a division of application No. 08/477,667, Jun. 7, 1995, Pat. No. 5,923,306, which is a division of application No. 08/132,293, Oct. 6, 1993, Pat. No. 5,581,270, which is a continuation-in-part of application No. 08/080,836, Jun. 24, 1993, Pat. No. 5,959,596.

[51] Int. Cl.[7] ....................................................... G09G 5/00
[52] U.S. Cl. .............................. 345/2; 345/502; 345/508; 345/520; 345/522; 463/43
[58] Field of Search ..................................... 345/961, 965, 345/966, 521, 508, 511–514, 203, 2, 502, 520–522; 463/43; 711/172

[56] References Cited

U.S. PATENT DOCUMENTS

| | | |
|---|---|---|
| 3,833,765 | 9/1974 | Hilborn et al. . |
| 4,110,794 | 8/1978 | Lester et al. . |
| 4,471,463 | 9/1984 | Mayer et al. . |
| 4,494,197 | 1/1985 | Troy et al. . |
| 4,582,324 | 4/1986 | Koza et al. . |
| 4,584,603 | 4/1986 | Harrison . |
| 4,647,980 | 3/1987 | Steventon et al. . |
| 4,724,521 | 2/1988 | Carron et al. . |
| 4,747,043 | 5/1988 | Rodman . |

(List continued on next page.)

FOREIGN PATENT DOCUMENTS

| | | |
|---|---|---|
| 0 268 419 A3 | 5/1988 | European Pat. Off. . |
| 0 227 014 B1 | 3/1990 | European Pat. Off. . |
| 0 419 910 B1 | 4/1991 | European Pat. Off. . |
| 0 542 664 A3 | 5/1993 | European Pat. Off. . |
| 63-164233 | 7/1988 | Japan . |
| 1-34084 | 2/1989 | Japan . |
| 2-13490 | 1/1990 | Japan . |
| 2-213374 | 8/1990 | Japan . |
| 2151054 | 7/1985 | United Kingdom . |
| 2168880 | 6/1986 | United Kingdom . |
| 2194369 | 3/1988 | United Kingdom . |
| 81/01664 | 6/1981 | WIPO . |

OTHER PUBLICATIONS

Declaration by Stoel et al. filed during prosecution history of U.S. Patent Nos. 5,651,319 and 5,675,828.

Declarations of Ramin Ravanpey, Apr. 30, 1996, Nov. 12, 1993, and Feb. 26, 1998.

(List continued on next page.)

*Primary Examiner*—Richard A. Hjerpe
*Assistant Examiner*—Henry N. Tran
*Attorney, Agent, or Firm*—Nixon & Vanderhye P.C.

[57] ABSTRACT

An electronic entertainment and communications system permits users to actively participate in video game play or to use other data processing/communication services. In a guest room based entertainment system or in a passenger based entertainment system, each guest or passenger is associated with a terminal device including a display and a controller. An array of video graphics processing systems is provided where the number of video graphics processing systems in the array is less than the number of guest or passenger terminals. Each video graphics processing system includes a video graphics program executing processor, which processes information generated during an interactive video graphics display session, and a memory system storing a video graphics program. Each video graphics processing system in the array is assignable to any of the guest or passenger terminals.

48 Claims, 36 Drawing Sheets

U.S. PATENT DOCUMENTS

| | | |
|---|---|---|
| 4,774,514 | 9/1988 | Hildebrandt et al. . |
| 4,814,756 | 3/1989 | Chauvel . |
| 4,843,633 | 6/1989 | Menich et al. . |
| 4,866,515 | 9/1989 | Tagawa et al. . |
| 4,894,774 | 1/1990 | McCarthy et al. . |
| 4,922,420 | 5/1990 | Nakagawa et al. . |
| 4,926,326 | 5/1990 | McKinley . |
| 4,926,327 | 5/1990 | Sidley . |
| 4,965,568 | 10/1990 | Atalla et al. . |
| 4,999,806 | 3/1991 | Chernow et al. . |
| 5,016,876 | 5/1991 | Loffredo . |
| 5,043,908 | 8/1991 | Manduley et al. . |
| 5,083,271 | 1/1992 | Thacher et al. . |
| 5,117,225 | 5/1992 | Wang . |
| 5,231,383 | 7/1993 | Diepstraten et al. . |
| 5,237,669 | 8/1993 | Spear et al. . |
| 5,280,627 | 1/1994 | Flaherty et al. . |
| 5,311,302 | 5/1994 | Berry et al. . |
| 5,327,228 | 7/1994 | Satyanarayana et al. . |
| 5,390,293 | 2/1995 | Nishioka et al. . |
| 5,396,635 | 3/1995 | Fung . |
| 5,453,986 | 9/1995 | Davis et al. . |
| 5,469,558 | 11/1995 | Lieberman et al. . |
| 5,497,479 | 3/1996 | Hornbuckle . |
| 5,513,331 | 4/1996 | Pawlowski et al. . |
| 5,581,270 | 12/1996 | Smith et al. . |
| 5,641,319 | 6/1997 | Stoel et al. . |
| 5,675,752 | 10/1997 | Scott et al. . |
| 5,675,828 | 10/1997 | Stoel et al. . |

OTHER PUBLICATIONS

Information Disclosure Statement filed Jun. 10, 1996 in parent application Serial No. 08/477,667 and document filed Under Seal.

Information Disclosure Statement filed Mar. 5, 1997 in parent application Serial No. 08/477,667.

Information Disclosure Statement filed May 21, 1997 in parent application Serial No. 08/477,667.

Information Disclosure Statement filed Dec. 1, 1997 in parent application Serial No. 08/477,667.

Information Disclosure Statement filed Mar. 2, 1998 in parent application Serial No. 08/477,667 and documents filed Under Seal.

Information Disclosure Statement filed May 13, 1998 in parent application Serial No. 08/477,667.

Information Disclosure Statement filed Feb. 13, 1998 in now allowed related patent application Serial No. 08/080,836 and documents filed Under Seal.

Information Disclosure Statement filed Jul. 19, 1994 in parent application Serial No. 08/132,293.

Information Disclosure Statement filed Aug. 31, 1994 in parent application Serial No. 08/132,293.

Information Disclosure Statement filed Oct. 6, 1994 in parent application Serial No. 08/132,293.

Information Disclosure Statement filed Aug. 30, 1995 in parent application Serial No. 08/132,293.

Information Disclosure Statement filed May 16, 1996 in parent application Serial No. 08/132,293.

Information Disclosure Statement filed Aug. 27, 1998 in related application Serial No. 08/080,836 and documents filed Under Seal.

*Avion*, "In the Catbird Seat," pp. 21–26.

In–Flight Phone Corporation, Full page advertisement for "FlightLink" in *The EntertainAir*, USAir publication, Sep. 1993, Inflight Movies, Music & More.

*Nintendo News Pak*, vol. 1, No. 2, Jul. 1989, "The Power Source," p. 1.

Schofield, S.E., "Improving Our Product," *USAir Magazine*, Sep. 1993, p. 9.

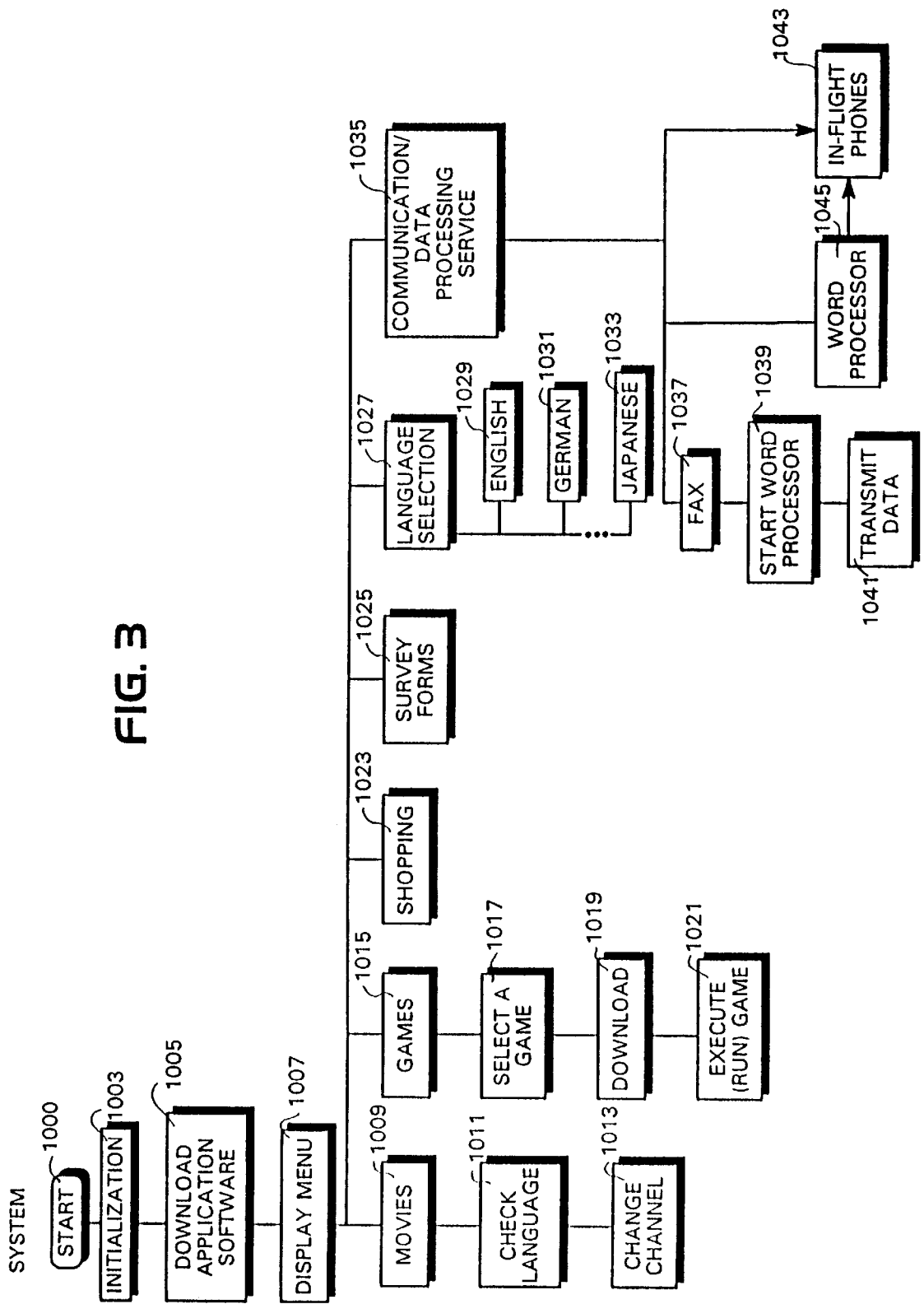

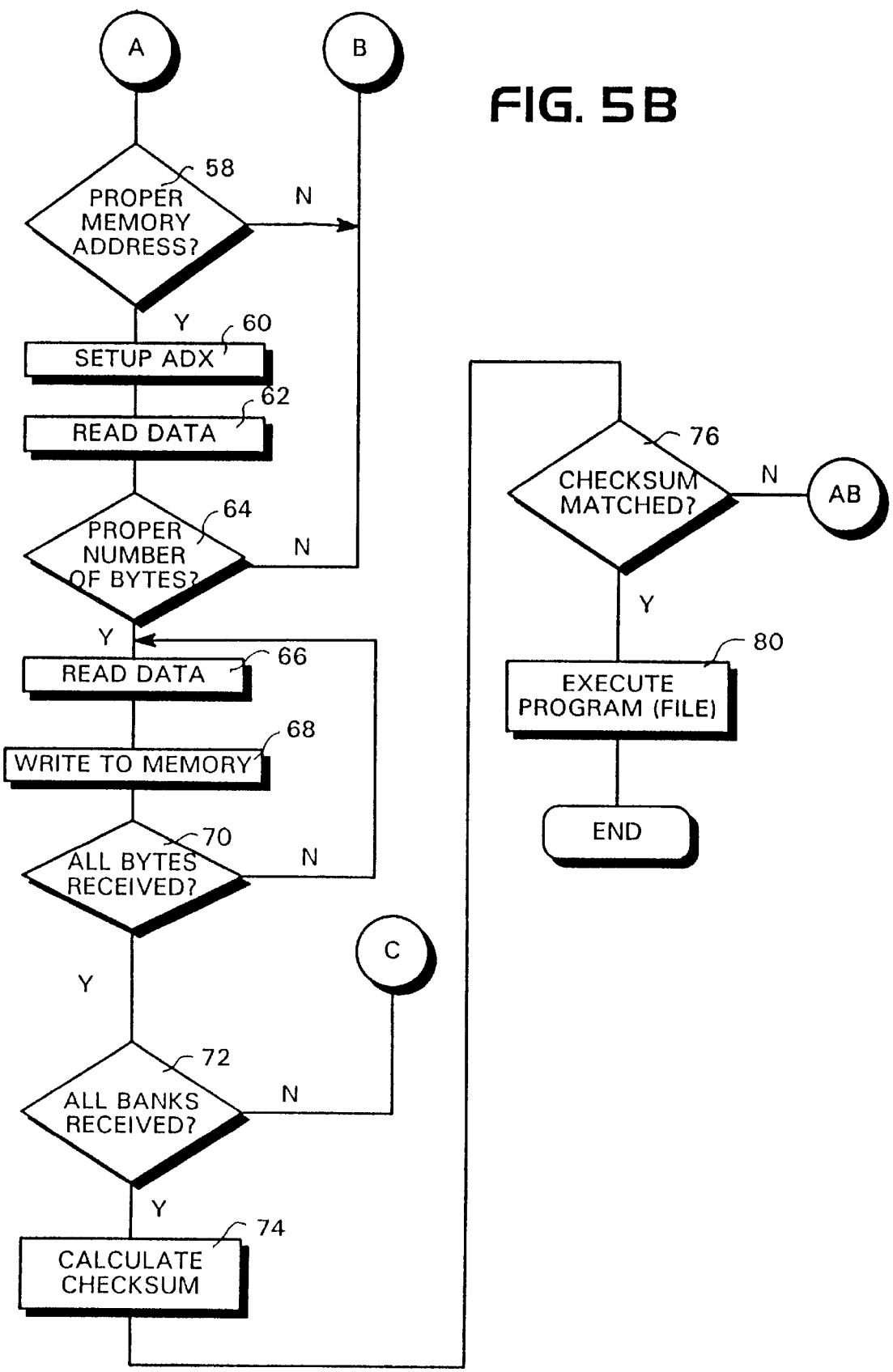

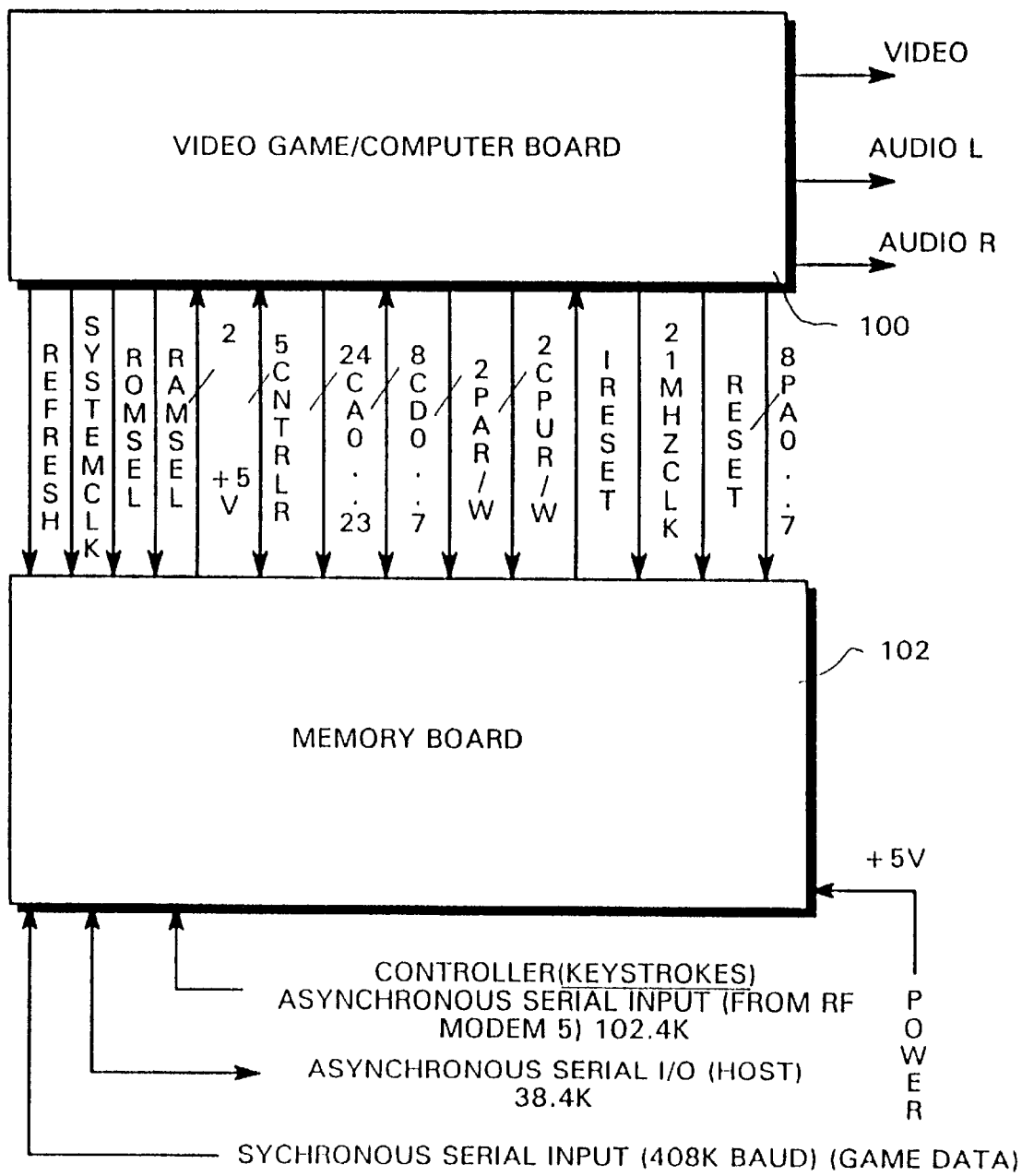

MAP MODE = 0
BOOT/RUN = 0
SPEED = X
ZBANK = X

MAP MODE = 0
BOOT/RUN = 1
SPEED = 0
ZBANK = 0

MAP MODE = 0
BOOT/RUN = 1
SPEED = 1
ZBANK = 0

MAP MODE = 1
BOOT/RUN = 0
SPEED = X
ZBANK = X

MAP MODE = 1
BOOT/RUN = 1
SPEED = X
ZBANK = 0

MAP MODE = 0
BOOT/RUN = 1
SPEED = 0
ZBANK = 1

MAP MODE = 0
BOOT/RUN = 1
SPEED    = 1
ZBANK    = 1

MAP MODE = 1
BOOT/RUN = 1
SPEED    = 1
ZBANK    = 1

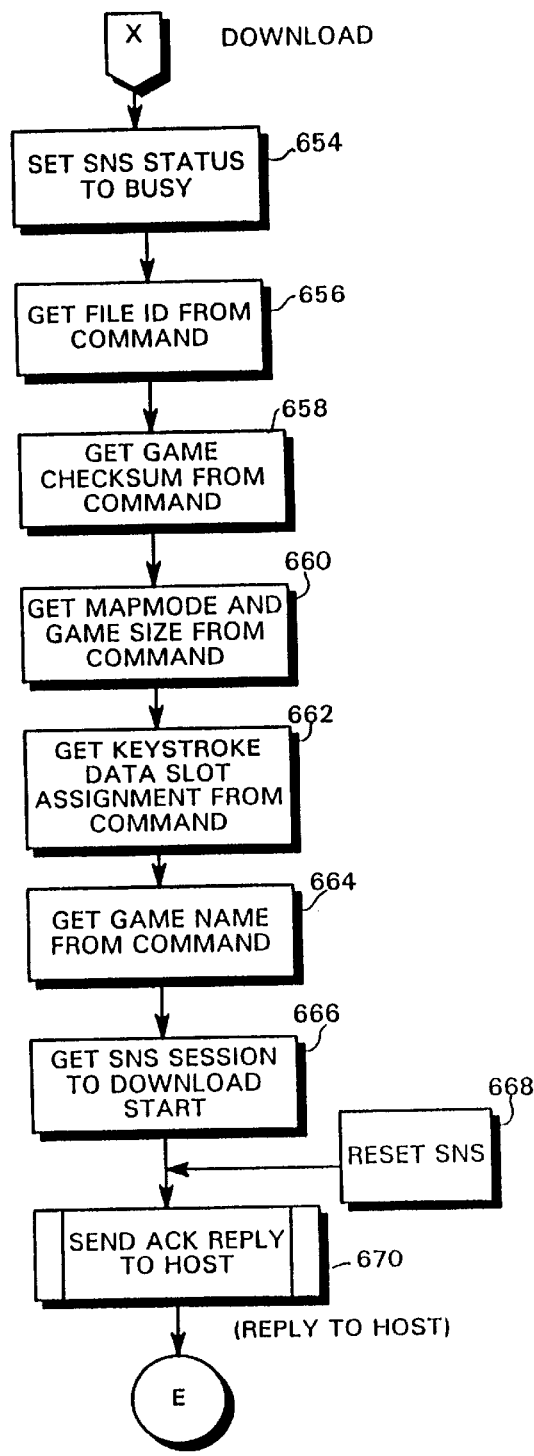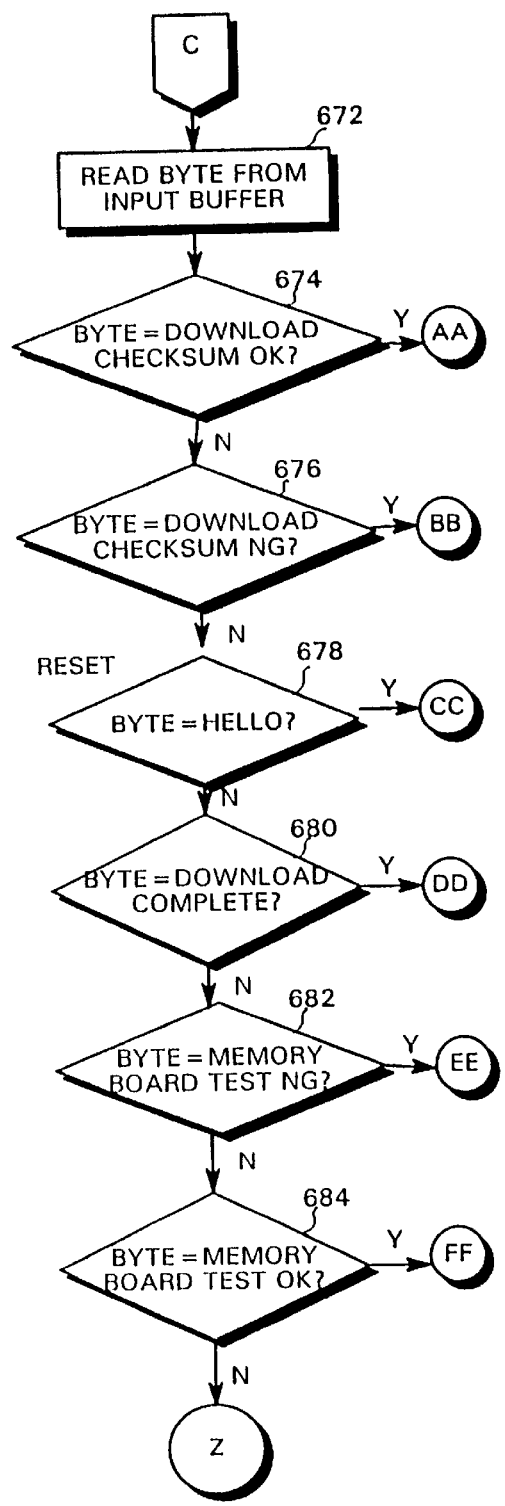

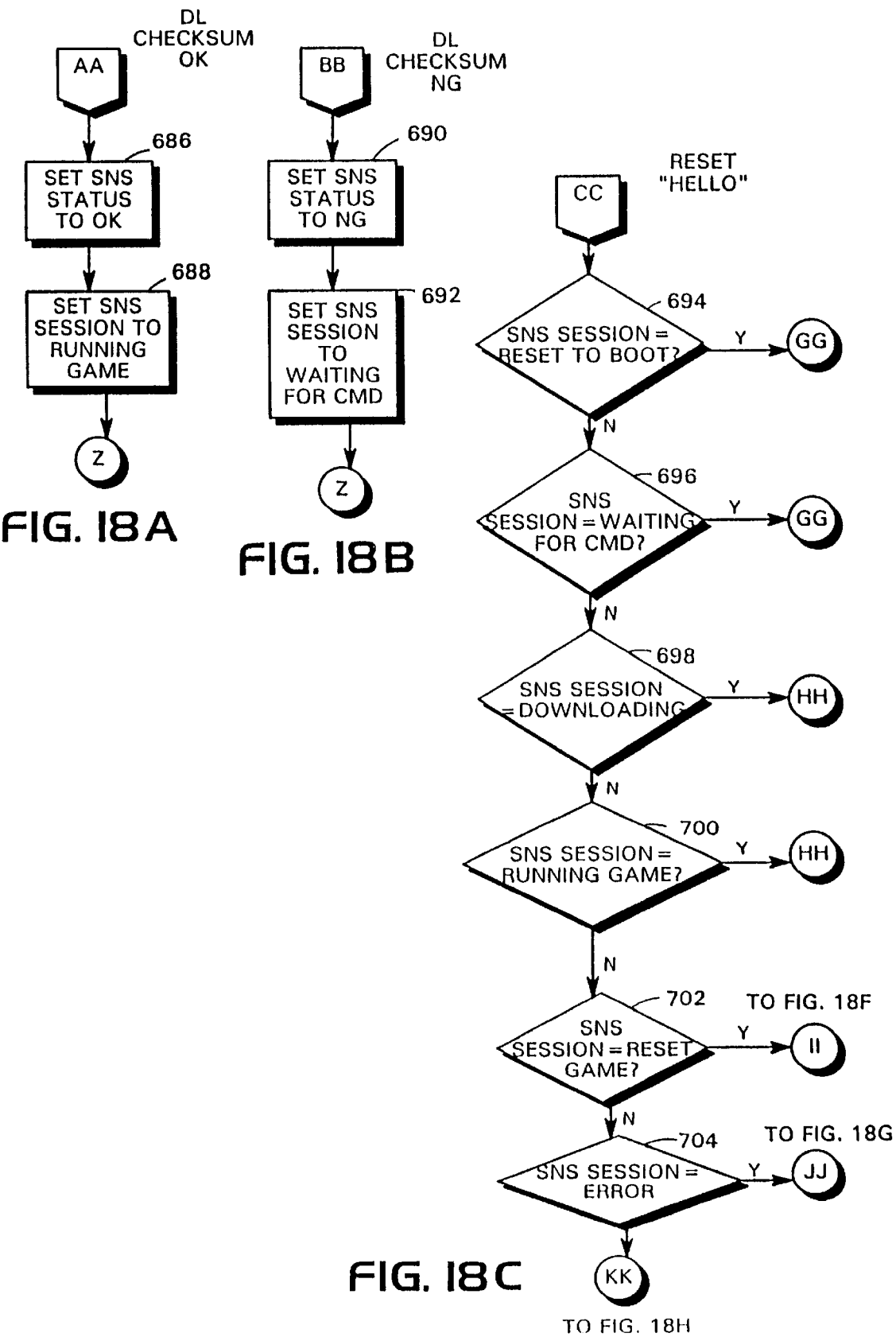

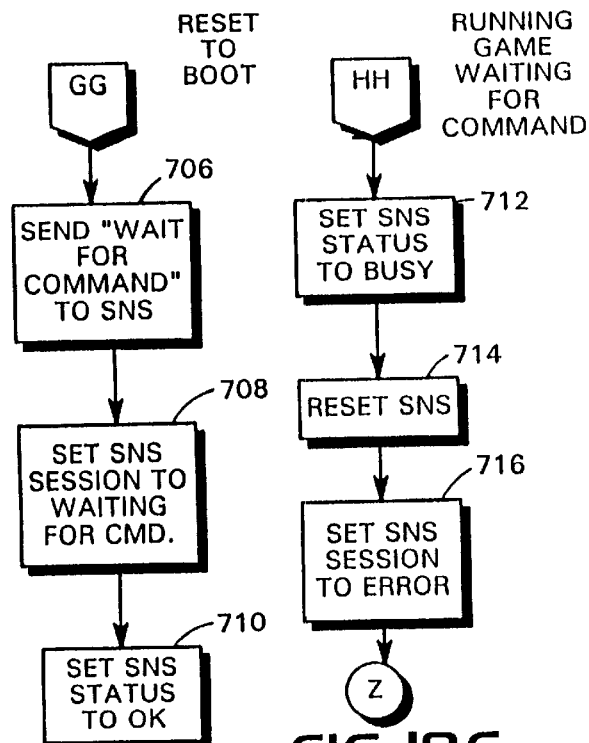
FIG. 18D
FIG. 18E
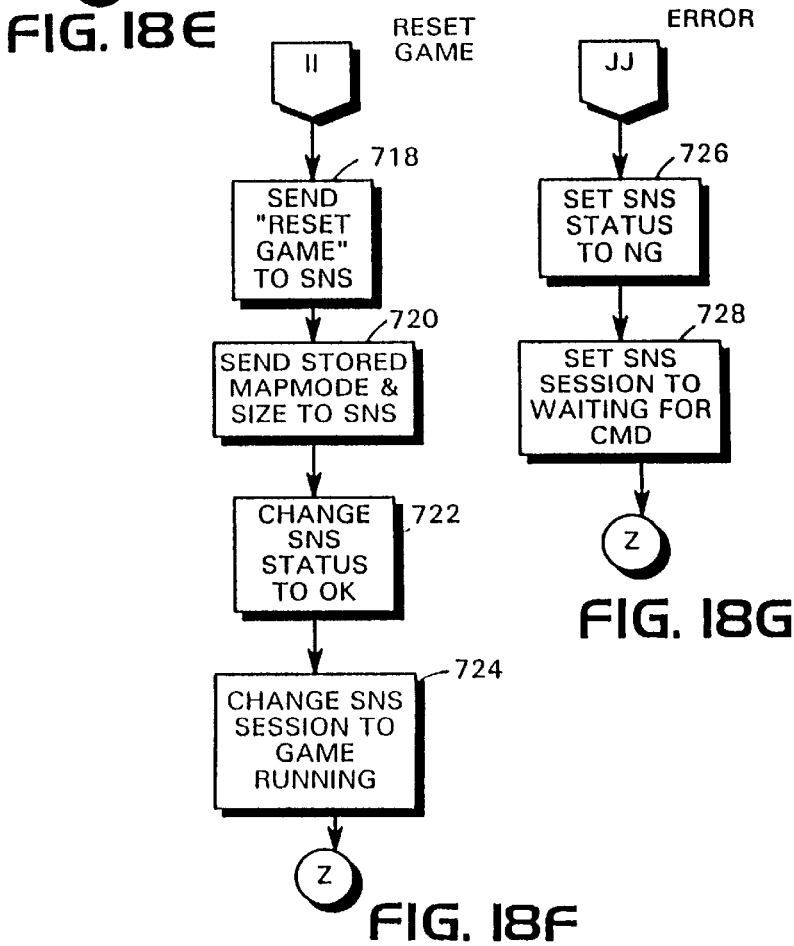
FIG. 18F
FIG. 18G

ERROR IN RECEIVER

ELECTRONIC ENTERTAINMENT AND COMMUNICATION SYSTEM

This is a continuation of application Ser. No. 08/818,123, filed Mar. 14, 1997; which in turn is a division of application Ser. No. 08/477,667, filed Jun. 7, 1995, now U.S. Pat. No. 5,923,306; which in turn is a division of application Ser. No. 08/132,293, filed Oct. 6, 1993, now U.S. Pat. No. 5,581,270 which is a continuation-in-part of application Ser. No. 08/080,836, filed Jun. 24, 1993, now U.S. Pat. No. 5,959,596, entitled "Airline-Based Video Game and Communication System".

FIELD OF THE INVENTION

This invention relates generally to digital communications and entertainment/video game systems. More particularly, the invention relates to a hotel-(or cruise ship) based video game and communications system part of which is embodied in individual guest rooms.

BACKGROUND AND SUMMARY OF THE INVENTION

Prior to the present invention, hotels have offered a limited degree of in-room entertainment services. Such services have typically involved a cable TV-based system in which a guest selects either a home box office (HBO)-type movie and entertainment channel at no cost, or, alternatively, pay-per-view services. Such pay-per-view systems have heretofore involved the generation of a menu display for a user to select a desired pay-per-view option such as a one of limited number of recently released movies.

In isolated instances, certain pay-per-view services have been expanded by establishing communication links between rooms in a hotel (or even between rooms in different hotels) to permit guests to play trivia-type games. Such systems operate in response to hotel guest entries via a television-type remote controller and use satellite and/or telephone communication links.

Such hotel-based entertainment systems are extremely limited in the range of entertainment services provided. For example, such systems do not permit each guest to play complex video games which generate moving object and background characters on the fly, like the Super Nintendo Entertainment System. (SNES), commercially marketed by the applicants' assignee.

The present invention is directed to a video game/ communications system which permits hotel guests to actively participate in video game play or to use other data processing/communication services. In an exemplary embodiment of the present invention, a multi-tasking master host computer which preferably stores video games and other application programs on its hard disk, downloads programs to an array of SNES game playing engines in response to guest selections. Each hotel guest room includes a terminal device which is coupled to the guest's color television and to a game controller (which in the illustrative embodiment is a modified version of the commercially available SNES game controller that includes a game reset key, a menu key, and volume-related keys).

By pressing a game controller menu key, the hotel guest initiates the downloading of applications software by the host computer to the array of SNES engines located within the hotel. A downloaded applications program generate a display menu which appears on the guest's television. In accordance with a preferred embodiment of the present invention, the display menu advantageously permits each hotel guest to select between various operating modes identified, for example, by displayed icons), including movies, games, shopping, survey forms, language selection, communication/data processing services, etc. If a user opts for video game play, then the available game titles and/or descriptions thereof are displayed.

When the host computer at a hotel-based head-end station receives a guest's game choice, it typically loads a game program from its hard disk into one of the bank of SNES game playing engines, which also may be located at the head-end station. Although the precise number of game playing engines incorporated into the system may vary depending upon the number of guest rooms in the hotel and system usage, it is presently preferred that approximately eight SNES game playing engines be installed per 200 guest rooms.

In accordance with an exemplary embodiment of the present invention, the host computer assigns a time slot to both a guest room terminal and a SNES game playing engine for passing game play indicating key strokes from the room's game controller to the SNES engine. The guest room terminal samples the SNES game controller 60 times per second for key strokes. Key stroke data is passed from the guest terminals through an interface which includes an RF modem and then to the bank of SNES engines.

Audio and video outputs from each of the SNES engines is connected to a channel modulator that places the composite signal on an assigned frequency in the RF distribution system. The assignment is communicated to the room terminal during an initial interactive session, whereby the terminal tunes the TV to the proper channel for its assigned SNES engine.

Once game play begins, each hotel guest using the system operates the SNES game controller as if an individual SNES was directly coupled to the room TV as in a conventional home system. When a hotel guest's playing time is expired, the host computer instructs the guest's terminal to suspend play and displays a menu which permits the guest to purchase more game playing time, if desired.

The above and other features and advantages of the invention and the manner of realizing them will become more apparent and the invention itself will be better understood from a study of the following detailed description and the appended claims with references to the attached drawings showing some exemplary embodiments of the invention.

BRIEF DESCRIPTION OF THE DRAWINGS

FIG. 3 is a diagram which generally depicts the overall operation of an exemplary embodiment of the present invention.

FIGS. 5A and 5B is a detailed flowchart delineating the sequence of operations performed by the SNES engines executing programs out of their respective boot ROMs.

FIG. 6 is a general block diagram which shows significant data and control signals associated with the SNES engines.

FIG. 16 delineates the sequence of operations involved in executing the commands shown in FIG. 14.

FIG. 17 is a flowchart delineating the sequence of operations involved in processing data from the microcontroller's SNES input buffer.

FIGS. 18A–18H delineate the sequence of operations in the various program branches associated with FIG. 17.

DETAILED DESCRIPTION

Figure 1:
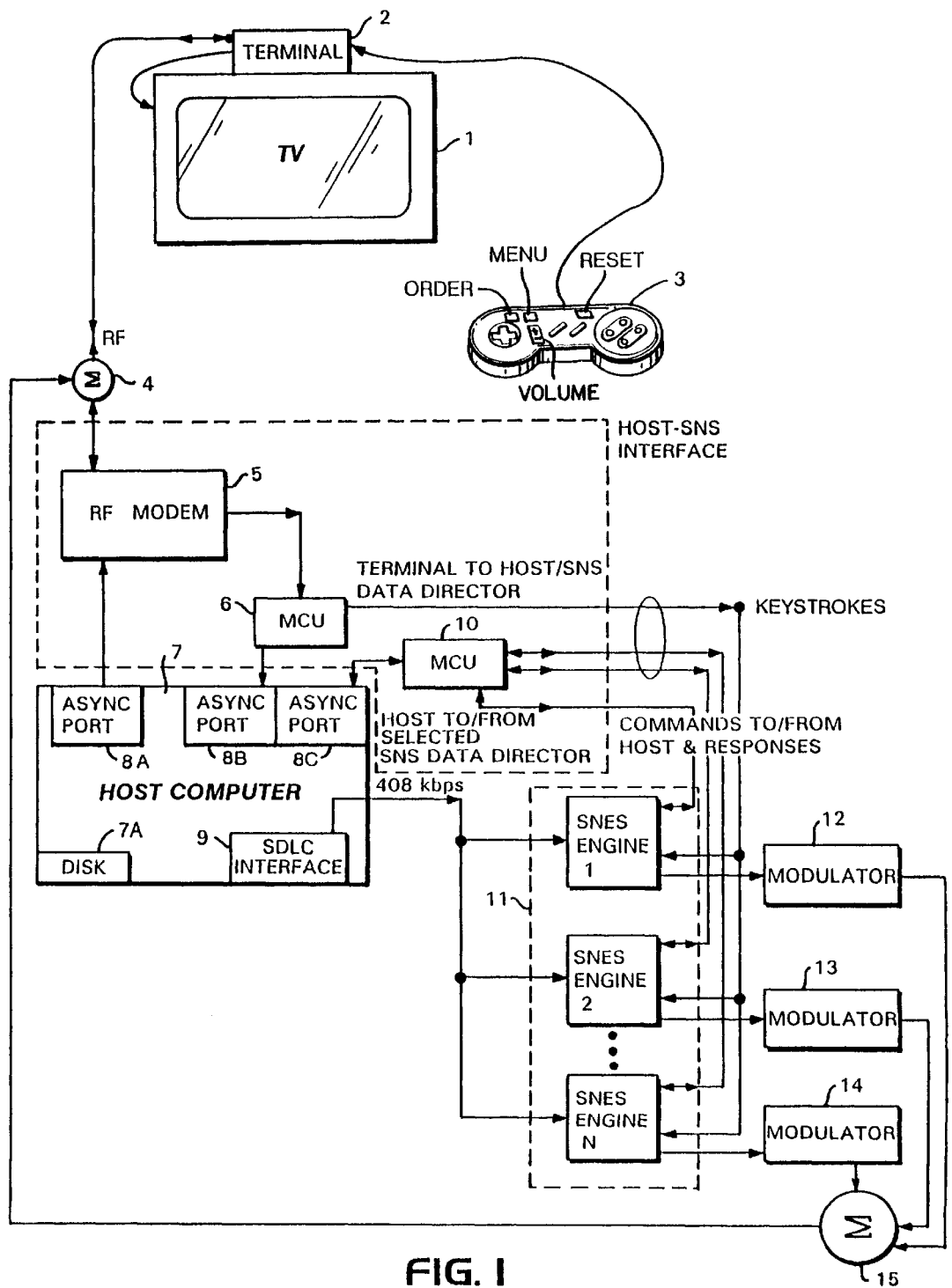
FIG. 1 is a block diagram of an exemplary hotel-based video game/communications system in accordance with an illustrative embodiment of the present invention.

FIG. 1 is a block diagram of an exemplary hotel-based video game/communications system in accordance with an illustrative embodiment of the present invention. Although the presently preferred illustrative embodiment of the invention is shown in a hotel, it is contemplated that the communications system described herein may be advantageously used in many other environments, such as an ocean liner, hospital, office building, or the like. As used herein, "hotel" should be construed broadly to refer to hotels, motels, hospitals, or any other similar facility for housing numerous overnight guests.

The hotel-based system of FIG. 1 includes a host computer 7. The host computer 7 is a multi-tasking computer which, for example, may be an IBM 386 computer running an interactive UNIX operating system. The host computer 7 includes a conventional communications board 9 which, for example, may be a SEALEVEL advanced communications Board (ACB-2) part no. 3061B, which generates synchronous data link control data (SDLC) and communicates with other processing modules shown in FIG. 1. The host computer 7 preferably stores video game and other programs in its memory 7A, which may include a hard disk memory system. Video games and, if desired, other programs are downloaded to an array 11 of SNES engines (1 to N) via a data link at a baud rate of, for example, a 408 kilobytes per second. It should be understood that implementation details identified herein such as baud rate and exemplary components are provided for illustrative purposes only and should not be construed as limiting the present invention.

Host computer 7, as will be explained further below, sends data to each guest terminal 2 in the hotel via a host-SNES array interface that includes an RF modem 5, which modulates the received signal and couples the signal to the appropriate guest terminal 2 on the appropriate data channel for the guest terminal. The RF modem 5 output is coupled to the guest room terminal 2 via a mixer 4 which couples a composite RF signal to terminal 2. Terminal 2, which is coupled to guest television's (1) tuner, receives the composite signal and tunes the TV to the proper channel.

Guest terminal 2 is also coupled to a video game controller 3. Game controller 3, in accordance with an exemplary embodiment, includes the standard keys/control switches found in a commercial SNES controller and key, a reset key (which may also serve as an order key during menu selection), a menu key and volume control keys.

Turning to the host-SNES interface (shown in FIG. 1) in more detail, terminal 2 couples data to the interface via the RF line mixer 4. RF modem 5 receives this data and couples the data to a microcontroller unit (MCU) 6 which operates as a data director to couple data to either the host computer 7 or the array of SNES engines 11. The MCU 6 decodes information transmitted by terminal 2 as either being information to be processed by the host computer 7 or the SNES engines 11. The data directing MCU 6 then appropriately couples data to the host computer 7 via an asynchronous port 8B or alternatively couples data to one of the SNES engines (1 to N) in array 11. The data output from MCU 6 which is coupled to SNES engines (1 to N) is keystroke controller data generated in response to actuation of control keys from controller 3. It is preferred (particularly where 8 SNES engines are used) that such keystroke data be coupled via direct links to each of SNES engines 1 to N. Alternatively, a conventional common bus link may be utilized.

As shown in FIG. 1, MCU 10 is coupled to an asynchronous port 8C of host computer 7 and to each one of the SNES engines in array 11. The MCU 10 couples commands (and associated data if any) from the host computer 7 to the active SNES engine with which communication is sought by identifying the address of the appropriate SNES engine in array 11. MCU 10 likewise receives information (e.g., responses to commands) from the SNES engines (1 to N) for coupling to host computer 7. The SNES engines may send commands to the host computer 7 via MCU 10. MCUs 6 and 10 may be conventional microprocessor based controllers having multiple I/O ports.

Audio and video game-related data is coupled from SNES engines 1 to N. via an array of modulators (12–14). The outputs of modulators 12 to 14 are combined using, for example, mixer 15 and coupled via mixer 4 to the appropriate terminal 2.

The host computer 7, SNES engine array 11 and host-SNES interface may be housed in a single head-end station located in an appropriate room in the hotel. Alternatively, if desired, these components may be disposed at various different locations. Host computer 7 need not necessarily be located within the hotel.

Figure 2A:
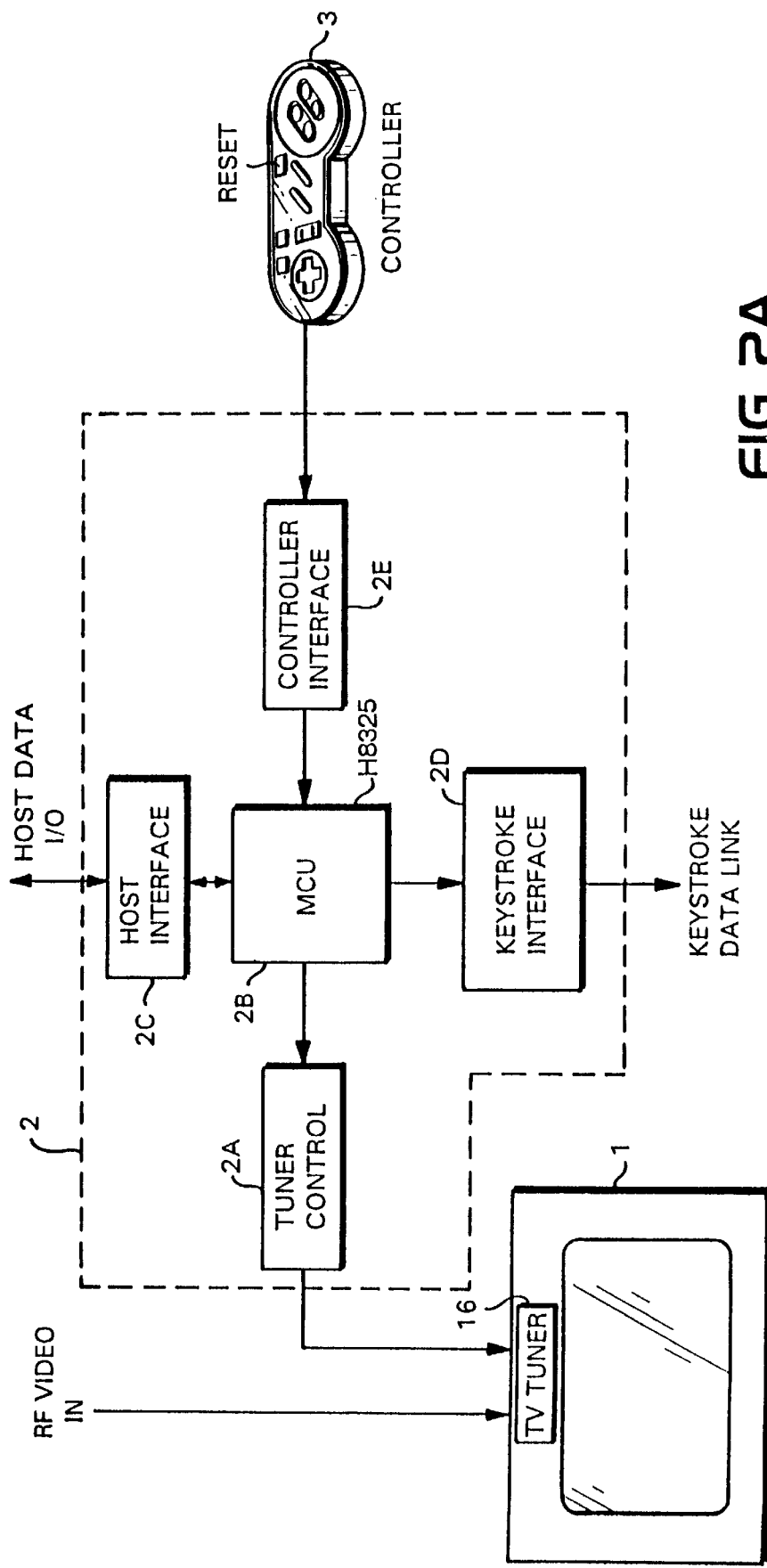
FIG. 2A is a block diagram of the guest terminal shown in FIG. 1.

FIG. 2A is a block diagram of terminal 2 shown in FIG. 1. The guest terminal 2 includes a microcontroller (MCU) 2B which may, for example, be a Hitachi H8325 microcontroller. MCU 2B is coupled via controller interface 2E to controller 3 for receiving player generated keystroke data. Controller interface 2E may be a conventional video game controller interface that includes shift register-based circuitry which temporarily stores the state of each of the controller switches at respective shift register stages and which serially outputs (to MCU 2B), for example, 2 bytes of controller data representing the state of each control key/ switch of controller 3 received at a respective parallel register input.

MCU 2B is also coupled to a host data I/O line interface 2C and a keystroke interface data link 2D. Interfaces 2C and 2D are represented as separate components in FIG. 2A and are shown as coupling data to separate data links. However, when used in the system of FIG. 1, the data outputs of the host by interface 2C and keystroke interface 2D may be combined and coupled to the RF link of FIG. 1 which is coupled to terminal 2. The host interface 2C and keystroke interface 2 outputs are separated and directed to either the host computer 7 or the SNES engine array 11 via MCU 6 as explained above in conjunction with FIG. 1. The MCU 2B is additionally coupled to tuner control 2A which tunes the TV tuner 16 of television 1 to the appropriate data channel. The RF video input from the RF data link shown in FIG. 1 is likewise coupled to TV tuner 16.

Figure 2B:
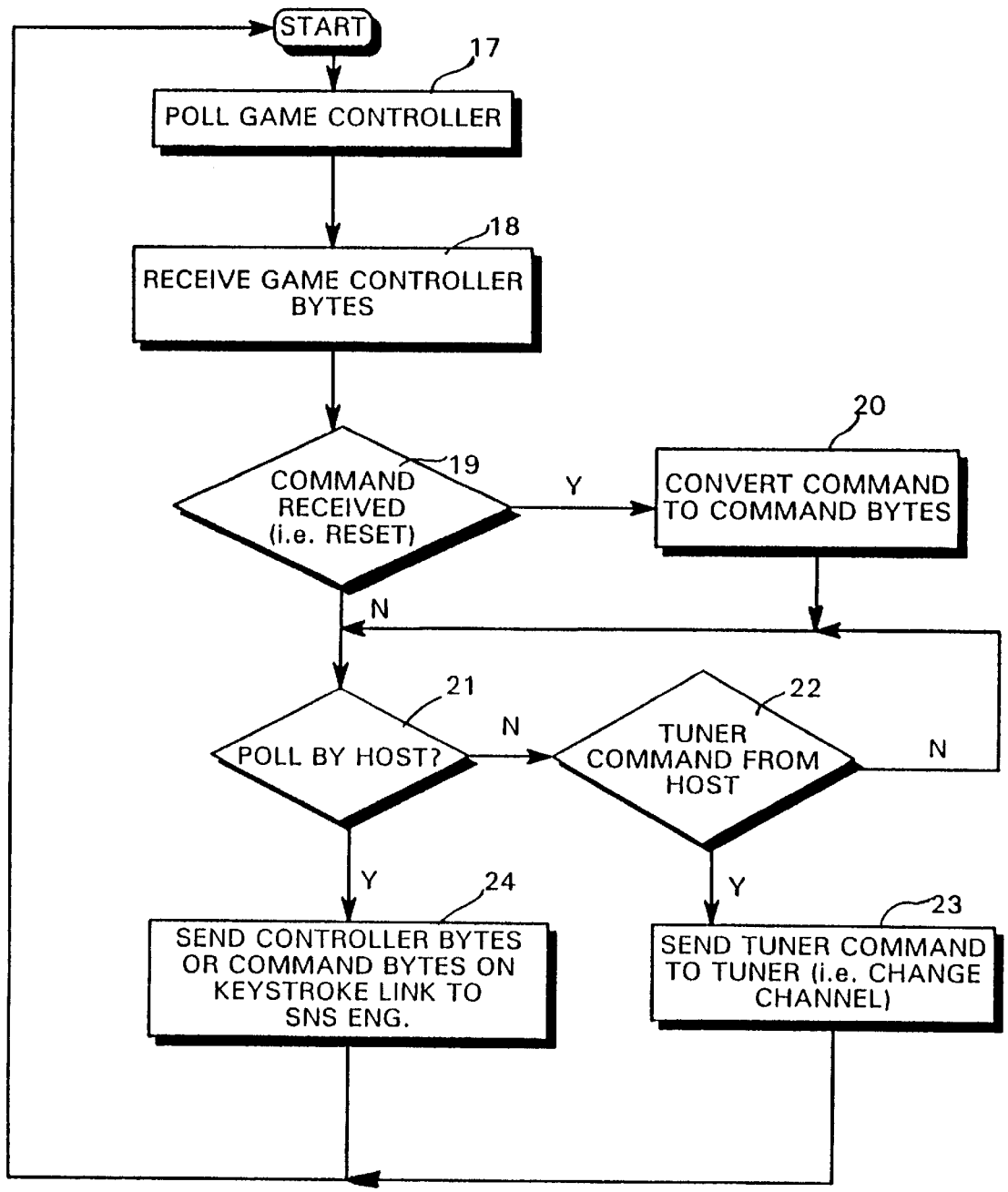
FIG. 2B is a flowchart showing the sequence of operations performed by the microcontroller in FIG. 2A.

FIG. 2B is a flowchart which delineates the sequence of operations performed by MCU 2B shown in FIG. 2A. The guest terminal MCU 2B software, after performing conventional initialization operations, polls the game controller 3 (once, for example, every 60th of a second) to determine whether any keys have been pressed by a player (17). The MCU 2B then receives any available game controller bytes via controller interface 2E (18). Upon receipt of the bytes, the data is checked to determine whether a command had been received, e.g., a reset command (19). A command may be detected, for example, by monitoring a predetermined bit position in the 2-byte data stream received from controller 3. For example, if the 13th bit position is a logic level "1," the MCU 2B may determine that a reset command has been entered by a player. Upon recognition of such a command in block 19, MCU 2B converts the identified command to a predetermined command byte format and couples the command to the SNES array 11 via MCU 6 and the keystroke link identified above.

If it is determined in block 19 that a command was not generated but instead that a regular controller data byte was generated, the byte is saved until the guest terminal 2 is polled by the host computer 7 as determined at block 21. If polling by the host did not occur, then a check is made at block 22 to determine whether a tuner command was received from the host 7 (i.e., directing a channel change). If there was no tuner command from the host, then processing branches back to block 21, where continuous checks are made for polling by the host or for tuner commands until one of these events occurs.

Upon detection of polling by the host at block 21, MCU 2B sends controller data bytes or command bytes on the keystroke link to the SNES engine array 11 (24). Although command bytes from MCU 2B have been described as being forwarded to the SNES, such commands could alternatively be directed to the host computer 7. After transmission of such controller data bytes or command bytes, the routine branches back to block 17, where the game controller polling continues. If the check at block 22 reveals that a tuner command was received from the host, then the tuner command is sent to the tuner to take the appropriate action, i.e., change channel (23), and processing branches to block 17 where polling of the game controller 3 continues.

FIG. 3 is a diagram which generally depicts the overall operation of an exemplary embodiment of the present invention. As shown in FIG. 3, immediately after power is turned on (1000), an initialization sequence is performed (1003). During initialization, each SNES engine in array 11 performs its own initialization routine during which various parameters are set to appropriate default values and serial ports are initialized to the correct baud rate. Additionally, if desired, a version identification number associated with the boot program executed in each SNES may be forwarded to microcontroller 190 FIG. 7. The microcontroller (190), which is preferably embodied on a memory board 102 (see FIG. 6) in each SNES engine, receives the version identification number and performs input/output interfacing functions for the memory board 102. The host computer 7 also performs conventional initialization functions including polling guest room terminals.

After initialization (1003), applications software is downloaded to the SNES engine. The downloading is initiated in response to a downloading request (e.g., selection of the menu key) from the guest terminal 2 coupled to the host computer 7 via the host-SNES interface.

After receipt of the downloading request, the host computer 7 responds by setting up an applications program transmission for generating the display menu which appears on each guest room TV set. The initial applications program downloading results in a menu display at every room that initiated a request. The applications program is coupled to each SNES engine from the host computer 7.

In accordance with the presently preferred embodiment of the present invention, the display menu permits the user to select between various operating modes including: movies 1009, games 1015, shopping 1023, survey forms 1025, language selection 1027, it communication/data processing services 1035. Initially, the user may be promoted to select a language (1027) so as to choose between English 1029, German 1031, Japanese 1033, etc. The language selection, in turn, determines the language used with, for example, any subsequent movie selection, etc.

In an exemplary embodiment of the present invention, icons are displayed on the screen to permit the user to select any one of the different modes of operation. If the movie option (1009) is selected, a check is made to ensure that the movie is presented in the appropriate language (1011). The channel is then changed (1013) for receipt of the selected movie via an associated VCR (not shown).

Communication or data processing services 1035 may be selected to select between word processing services 1045, fax services 1037, etc. It is contemplated that the room terminal may include a port for receiving a keyboard input. Keyboards, in accordance with one embodiment of the present invention, are distributed to guest rooms by hotel personnel upon request. Alternatively, the system may be expanded to include, in association with at least some rooms, a keyboard which is permanently offered to the guest terminal for selection of word processing 1045 or facsimile services 1037.

If the guest selects facsimile services 1037, then the user is prompted to begin formulation of a message to transmit 1039. After composition of the message, the user enters an end of message or other special control character to indicate that the message may be transmitted (1041).

If the user opts for video game play (1015), then the available game titles and/or descriptions thereof will be displayed to the user (1017). Thereafter, the master control unit 7 initiates a video game program downloading process which is explained in detail below in conjunction with FIGS. 5A and 5B (1019). The system then begins executing the game program and the passenger is able to play the selected video game (1021).

The communication system of the present invention also includes a shopping service option (1023) in which a wide range of available items may be selected by the user for purchase via credit card or room charge. Additionally, the system has the capability of requesting hotel guests to complete survey forms (25).

The entertainment and data processing services selectable via the communications system of the present invention shown in FIG. 3 are by way of example only. The present invention contemplates that additional services may be among the selectable options such as books or magazines which may be stored in a mass storage media associated with host computer 7. Additionally, it is contemplated that a selection of educational computer programs may be provided in addition to the selectable video games.

Although FIG. 3 identifies the selection of a wide array of entertainment/data processing and other services, the disclosure which follows focuses on the processing associated with the video game play option.

Figure 4A:
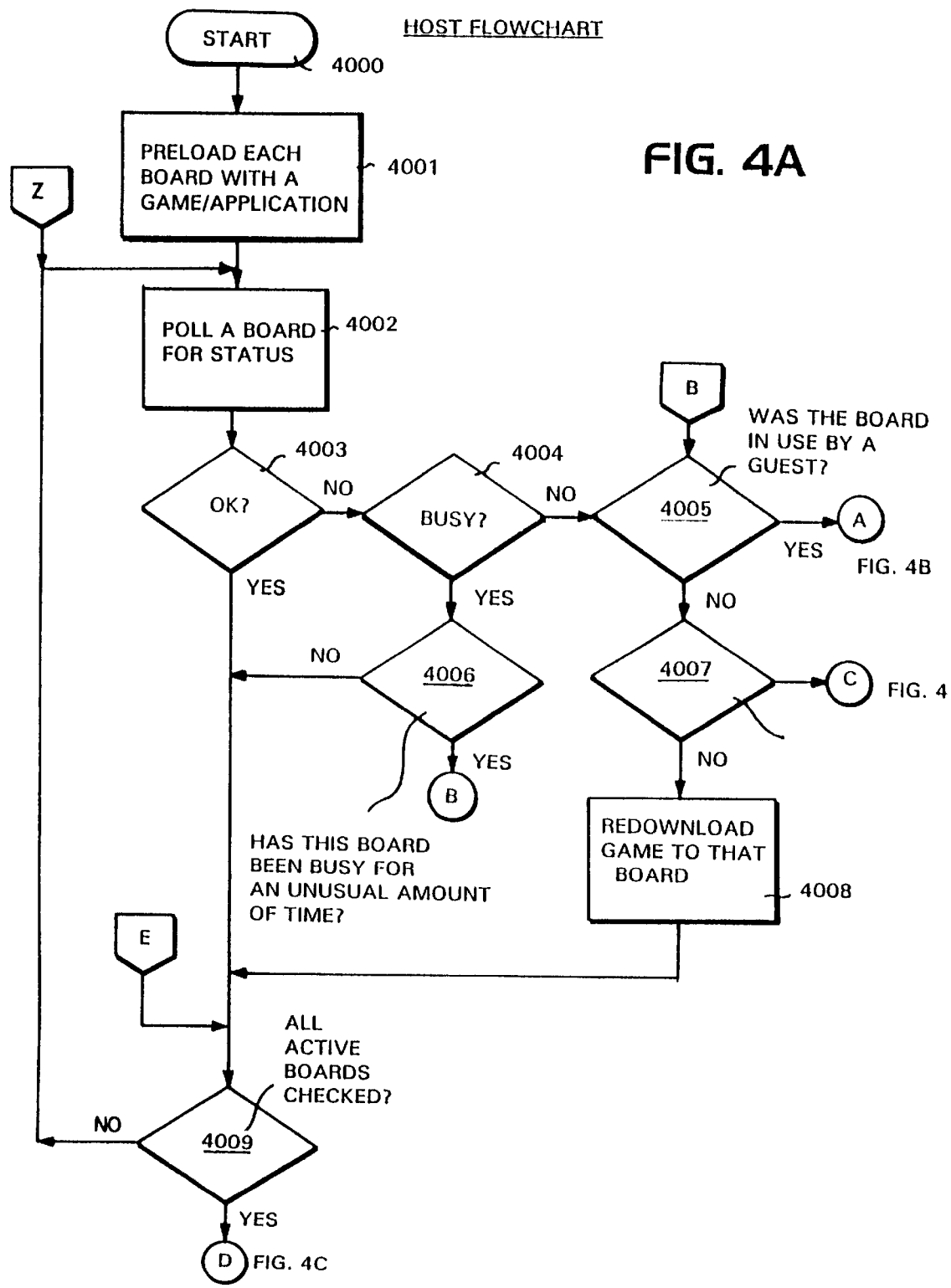
FIGS. 4A through 4G are flowcharts which delineate the sequence of operation performed by the host computer in controlling hotel-based video game play.

FIGS. 4A through 4G are flowcharts which delineate the sequence of operation performed by of the host computer 7 in controlling hotel-based video game play. FIG. 4A shows exemplary preload and status check operations. After power-up operations are performed initialization (4000) in accordance with one exemplary embodiment, the host computer 7 preloads each SNES engine (1 to N) with a video game or application program. The array 11 of SNES engines, which are described in detail below, may be preloaded with, for example, video games which are historically selected most frequently. For example, the two or three most popular video games may be distributed among the available SNES engines and subsequent SNES engine room assignments may be based on associating these games with requesting room terminals.

Although in accordance with another exemplary embodiment, as described above, the host computer may download an applications program for each SNES engine to execute for generating a main menu display (in which a wide range of entertainment options are presented for selection), the present flowchart focusses on the video game option implementation. As desired, any one of the SNES engines (1 to N), the host computer 7 or the guest terminals (2) may be programmed to control the generation of menu displays.

After preloading each board, the host computer 7 polls an SNES engine printed circuit board (1 to N) to determine its status (4002). As will be explained further below, a microcontroller 190 associated with each SNES engine responds to the host status request by returning a status byte which identifies the SNES status. If the polled SNES's status is okay (4003), then processing continues by checking the next board until all active boards have been checked (4009).

If the status check is not okay, a check is made to determine whether the received status word from the SNES microcontroller 190 indicates a busy condition (4004). If the SNES is busy, then a check is made at block 4006 to determine whether the SNES board has been busy for an unusual amount of time. If so, or if the check at block 4004 reveals that the SNES is not busy, a check is made to determine whether the board is in use by a guest (4005). If the board was not in use by a guest, then the host 7 determines whether the SNES engine board had an unusual amount of errors over a predetermined period of time (4007). If the board did not have an unusual amount of errors over a period of time, then the game download operation is repeated to that board (4008) and the routine branches to block 4009 to determine whether all active boards have been checked.

Figure 4B:
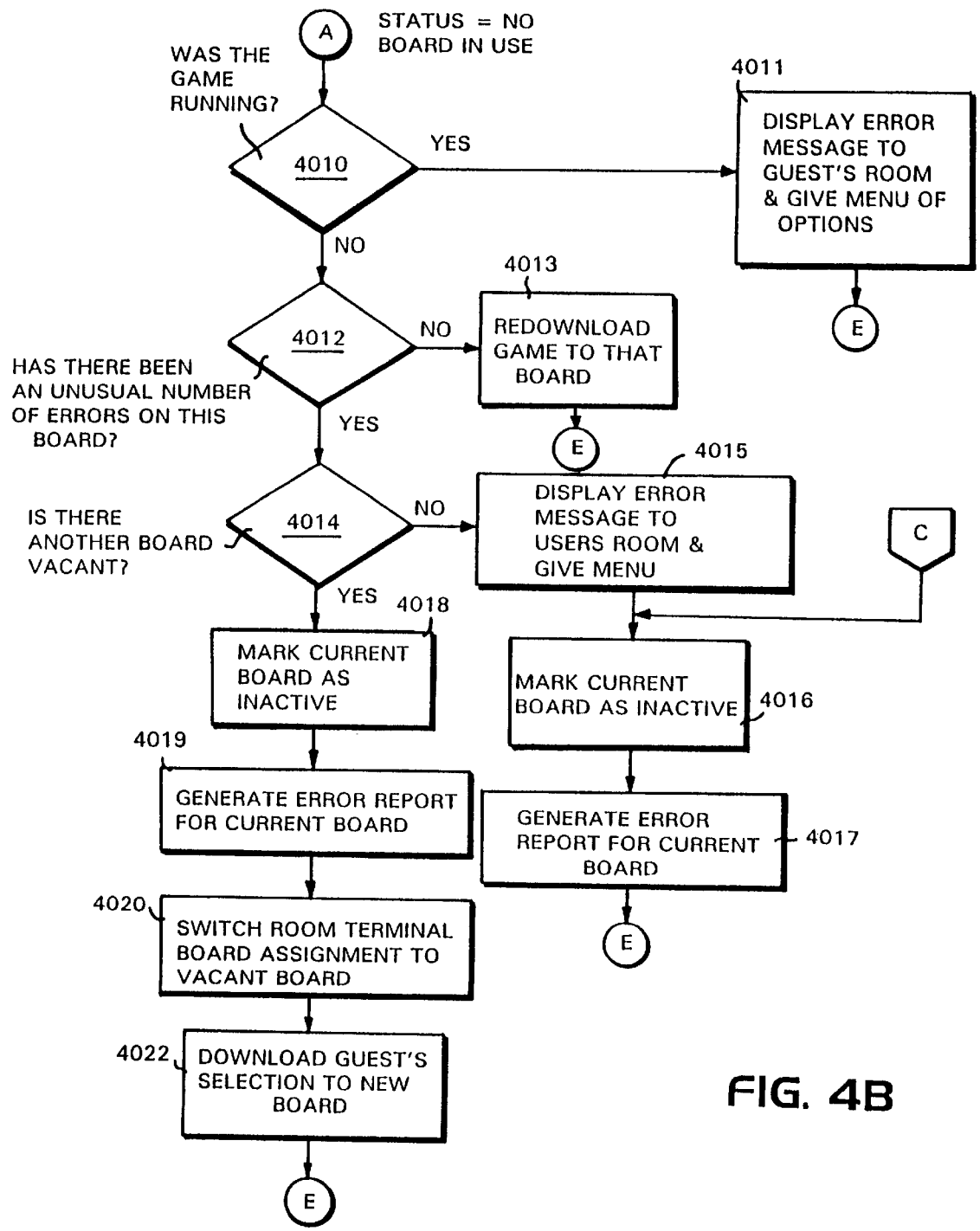

If the board was in use by a guest, as determined at block 4005, the routine branches to block 4010 in FIG. 4B for SNES board error processing. At block 4010 a check is made to determine if a game is running. If a game is running after an unacceptable status reply (4003), then the routine branches to an error handling program, since an error in game program processing (or possible downloading) must have occurred. An error message is then displayed at the appropriate guest room. A menu of options is also displayed and the routine branches to block 4009 of FIG. 4A to continue checking active SNES boards (4011).

If a game was not running based on the processing at block 4010, then an additional error check is made to determine whether there has been an unusual number of errors resulting from the SNES engine (1 to N) (4012). If there has not been an unusual number of errors, then the game is downloaded again to that SNES board (4013) and the routine branches to block 4009 of FIG. 4A to determine whether all active boards have been checked.

If there has been an unusual number of errors for the particular SNES engine (1 to N), then a check is made at block 4014 whether there is another vacant SNES engine vacant. If there is no vacant SNES engine, then an error message is displayed and a menu of options is presented to the user (4015). Thereafter, the current SNES engine is placed in inactive status (4016) and an error report is generated for the current SNES engine (4017).

If the check at block 4014 reveals that there is another SNES engine that is vacant, then the current SNES engine is identified as inactive and placed in an inactive status (4018). The identification of a current SNES engine as being in inactive status removes that SNES engine from the host computer polling scheme. Thereafter, an error report is it generated for the current SNES engine (4019) and the room terminal board assignment is switched to the identified vacant SNES engine (4020). The switch in the room terminal's SNES board assignment to a vacant board (4020) results in changing the station to which the guest terminal is tuned. The guest's game selection is then downloaded to the new SNES engine from the host computer 7 (4022) and the routine branches to FIG. 4A at block 4009. After the SNES status processing in FIG. 4B, all active SNES boards will have been checked as determined at block 4009 in FIG. 4A and the routine will branch to FIG. 4C.

Figure 4C:
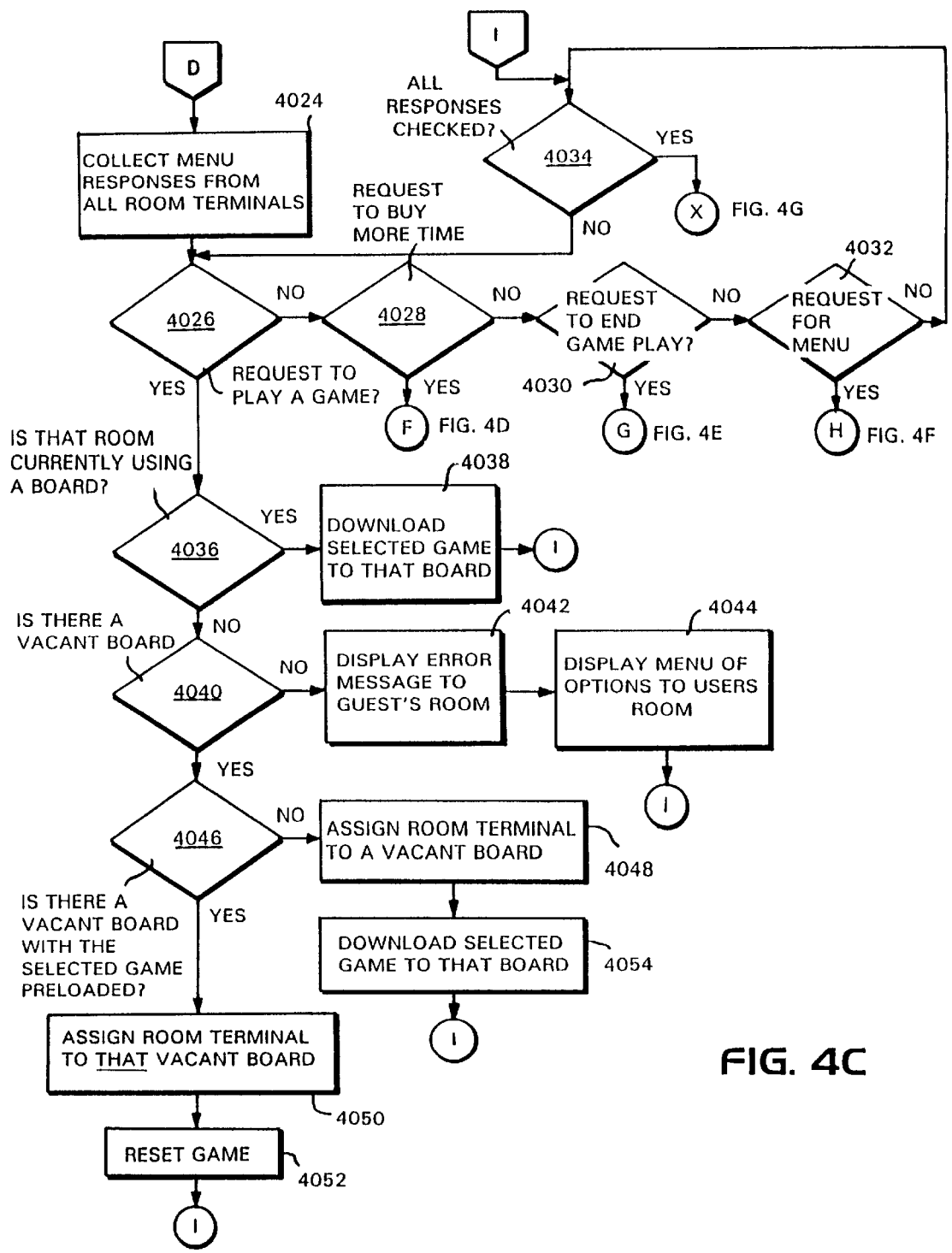
Figure 4D:
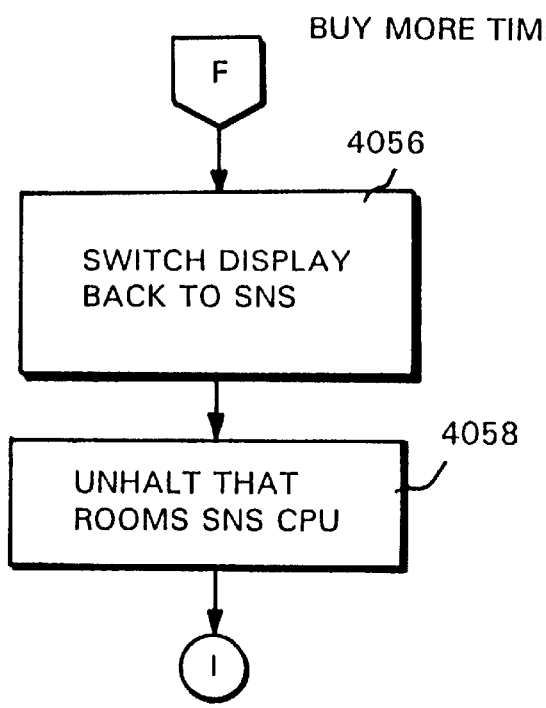
Figure 4E:
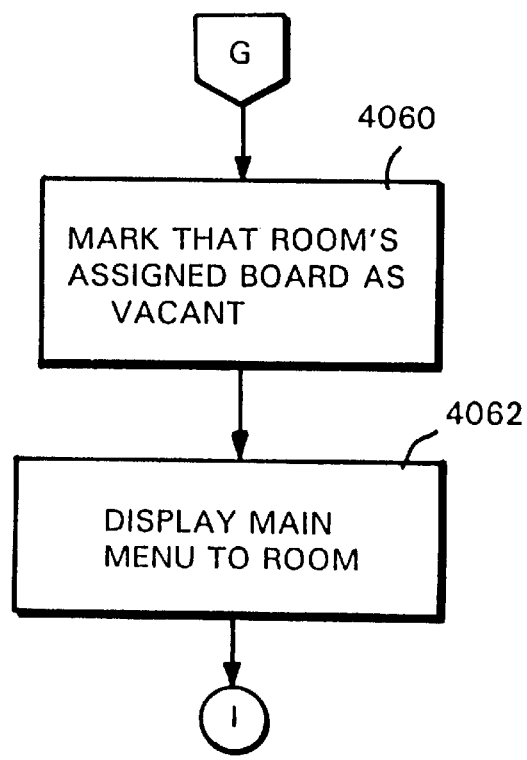
Figure 4F:
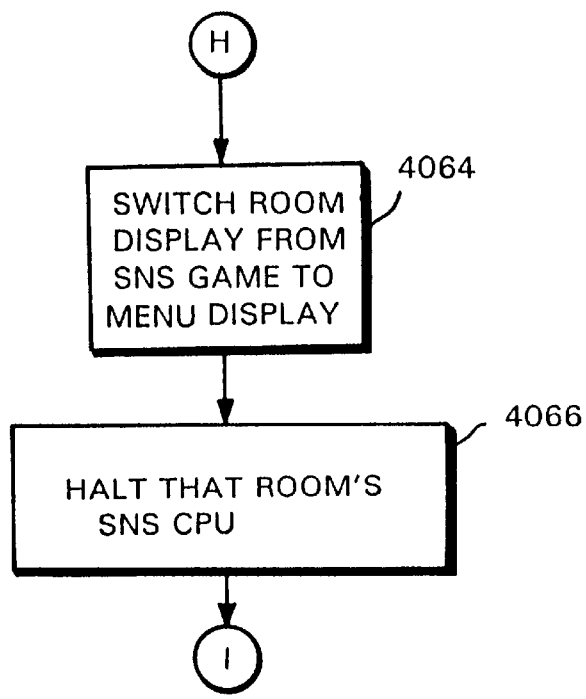

FIG. 4C is a flowchart delineating the sequence of operations performed by the host computer 7 processing menu responses. As indicated at block 4024, the host computer 7 collects menu responses from all room terminals, not just those that are currently playing a game. A check is then made to determine whether the menu response is a request to play a game (4026). If a request has been made to play a game, then a check is made at block 4036 to determine whether that room is currently using an SNES engine. If the check at block 4036 reveals that the room is not currently using an SNES engine, then a check is made to determine whether there is a vacant SNES engine board (4040).

If there is a vacant board, then a further check is made at block 4046 to determine whether the hotel guest's game selection has already been preloaded on a particular SNES engine. If so, then the room terminal is assigned to that vacant SNES engine (4050). The game is then reset to a starting condition (4052) and the routine branches FIG. 4C block 4034, where a check is made to determine if all menu responses have been checked. If not, the menu response processing begins again at block 4026. If all responses have been checked, then the routine branches to a game play time checking routine at block 4068, FIG. 4G which is described below.

If the check at block 4046 reveals that there is no vacant board with the selected game preloaded, then the host computer 7 assigns the room terminal to a vacant board (4048) and the selected game is downloaded to that SNES engine board (4054) and the routine branches to block 4034 to determine whether all responses have been checked.

If the check at block 4040 indicates that there is no vacant board at all, then an error message is displayed at block 4042 and a menu of options is displayed at the guest's room (4044). The routine then branches back to block 4034 to determine whether all responses have been checked.

If the check at block 4036 indicates that the room is currently using a board, then the selected game is downloaded to that SNES engine board (4038) and the routine branches to block 4034 to determine whether all responses have been checked.

If the check at block 4026 indicates that there was not a request to play a game, then a check is made to determine whether there was a request to buy more time (4028). If there was a request to buy more time, then the routine branches to block 4056 shown in FIG. 4D to switch the hotel guest's TV display back to being under control of an SNES engine. The host computer issues a command that unhalts the SNES CPU (4058) which had been halted when the game playing time elapsed. The routine then branches back to FIG. 4C at block 4034 to determine whether all responses have been checked.

If the check at block 4028 indicates that there was not a request to buy more time, then a check is made at block 4030 to determine if there was a request to end game play. If there was a request to end game play, then the routine branches to FIG. 4E at block 4060. As indicated at block 4060, the host processor flags that room's assigned SNES engine as being vacant. Thereafter, a main menu is displayed on the hotel room's TV (4062) and the routine branches to FIG. 4C at block 4034.

If the check at block 4030 indicates that there was not a request to end game play, then a check is made at block 4032 to determine whether there was a request for the main menu. If so, the routine branches to block 4064 shown in FIG. 4F. As indicated at block 4064, the room television display is switched from displaying character under the control of an SNES video game program to displaying a menu. Thereafter, the room's associated SNES CPU is halted (4066) and processing continues at block 4034 of FIG. 4C, where a check is made to determine if all menu responses from all room terminals have been checked. If the processing at block 4032 indicates that there was no request for the menu, then the routine branches to block 4034.

Figure 4G:
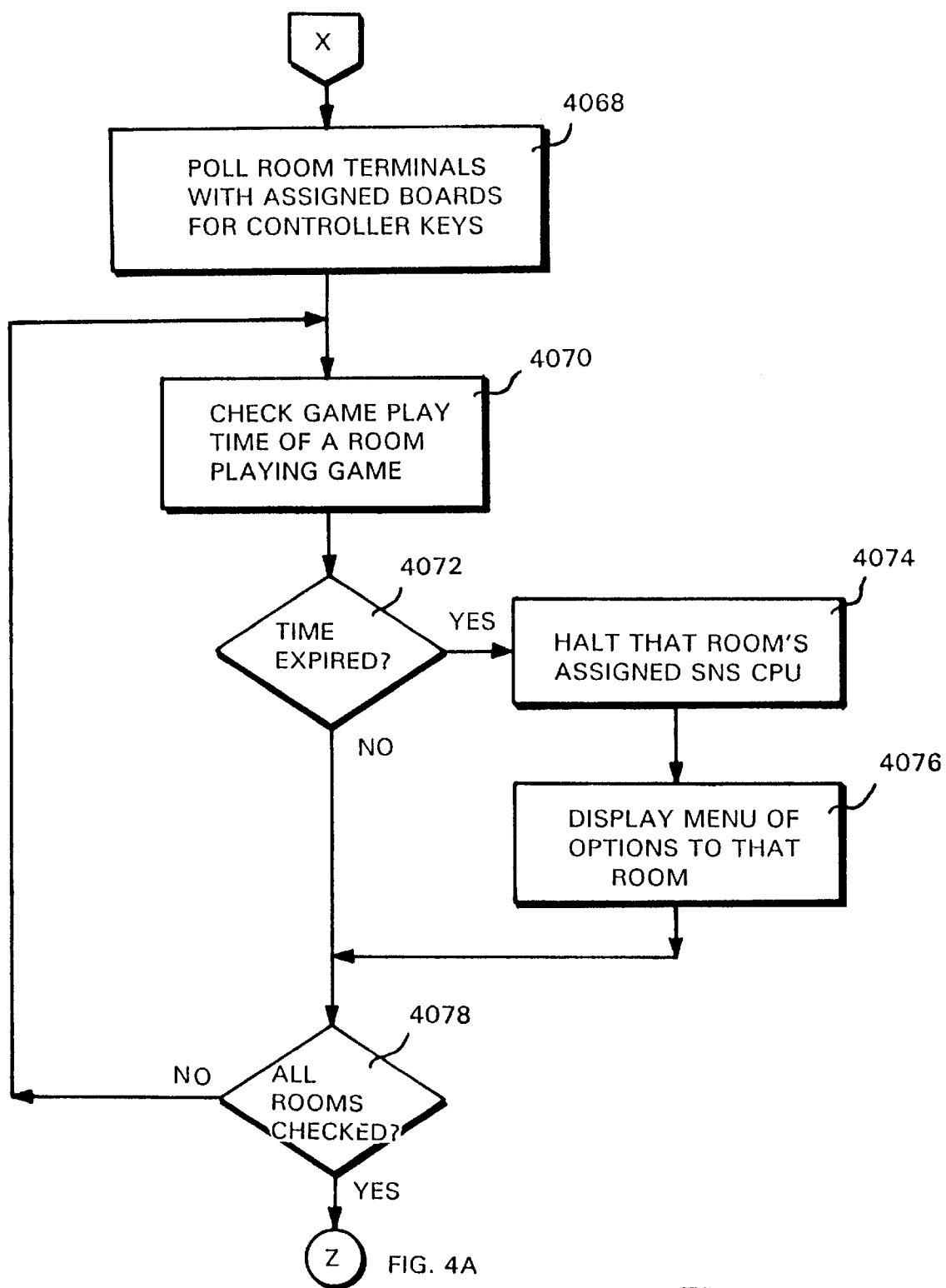

After all responses have been checked, as determined at block 4034, the routine branches to block 4068 of FIG. 4G, where game play time checking occurs. As indicated in block 4068, room terminals with assigned SNES engines are polled by the host processor 7 (at a rate which is more frequent than room terminals that are unassigned). For example, the host computer 7 may poll room terminals that are involved in game play every 60th of a second. Other non-game playing room terminals are also polled by the host computer 7, but preferably not at the same 60th of a second rate.

The information collected from the room terminals as a result of the host polling is coupled via the keystroke link shown in FIG. 1 to the assigned SNES engine. More specifically, keystroke information generated by the game controller 3 is coupled via MCU 6 to keystroke link shown in FIG. 1 which is received by the appropriate SNES engine (1 to N) . The microcontroller 190 associated with each SNES engine accesses the SNES game controller information to be processed by its associated SNES video game processor and couple such signals on game controller input lines to the SNES as will described below.

A check is then made of the game playing time of a first guest's room terminal actively playing a game (4070). A check is made at block 4072 to determine whether the game playing time exceeds the amount of time purchased. If the time has expired, then a halt command signal is coupled to the associated SNES CPU (4074) and a menu of options is displayed at the room terminal (4076) including an option to buy more time. If the time has not expired for the first room terminal (4072) or after menu options have been displayed (4076) processing continues at block 4078, where a determination is made whether all room terminals have been checked. If all room terminals have been checked, then processing continues at FIG. 4A at block 4002 to repeat host processing.

If the check at block 4078 indicates that all room terminals playing a game have not been checked, then the routine branches back to block 4020 to repeat the game play time check processing.

Figure 5A:
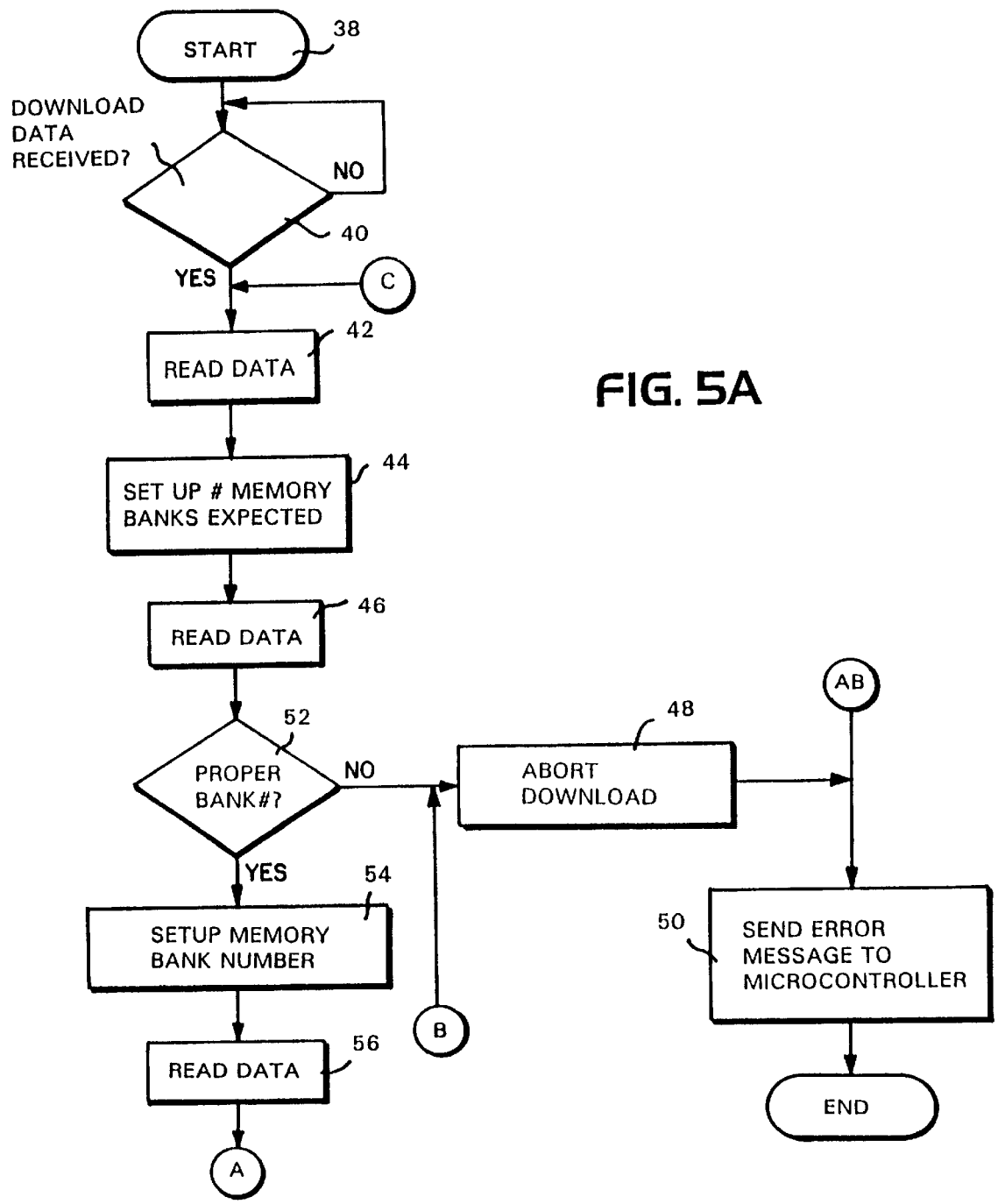

FIGS. 5A and 5B are a detailed flowchart delineating the sequence of operations performed by the SNES engines executing programs out of their respective boot ROMs during the game program downloading operation shown at block 1019 of FIG. 3. At the outset of game program downloading operation (38), the SNES CPU polls its receive buffer to determine whether any downloaded data has been received (40). Any data received includes program data interspersed with predetermined framing and other data as described below. If no downloaded data has been received, the routine continues to poll the receive buffer until such data is received.

When data is received, it is read (42). The first bytes of information are used to set up the number of memory banks of pseudo-static RAM (174, FIG. 7) which will be used to store the downloaded program (44). Thereafter, the next data byte is read (46) and is used to determine the starting bank number (52). A check is made at block 52 to determine if the bank number received is valid. The proper bank number may be verified by determining whether the bank falls within a predetermined range. If the received bank number is not valid, then the download is aborted (48) and an error message is sent to the SNES board microcontroller 190 (50) and the routine ends.

If the proper bank number has been specified, as determined by the check in block 52, then it loads a register in the SNES with the proper bank, so that program data is routed to this bank (54).

Thereafter, the next two data byte are read (56). As indicated in block 58, a check is made to determine whether the two bytes of data read in block 56 identify the correct memory starting address. If the correct starting memory address has not been identified, then the routine branches to block 48 to abort the download. If the proper memory starting address has been identified, as indicated in block 60, the identified starting address is set up. The next two bytes of data are then read (62) identifying the number of bytes in the bank. A check is made at block 64 to determine whether the proper number of it bytes have been identified. If not, the routine branches to block 48.

If the proper number of bytes have been identified, then data is read at block 66, which is the actual program related data. Thereafter, after each byte is read, the byte is written to memory (68). As indicated at block 70, a check is then made to determine whether all bytes in the bank have been received. If all the bytes have not been received, then the routine branches back to block 66. Once all bytes have been received, then a check is made to determine whether all the identified banks have been received (72). If all banks have not been received, then the routine branches to block 42 for further bank processing.

If all banks have been received, then a checksum is calculated of the downloaded memory contents (74). If the checksum matches a stored checksum value (76), the program is executed (80) and the routine ends. If the checksum does not match, then the routine branches to node AB in FIG. 5A for error processing after which the downloading process may be initiated again.

FIG. 6 is a general block diagram which shows significant data and control signals associated with the SNES engines 1 to N. Each SNES engine includes a video game computer board 100 and a memory board 102 each of which is described in further detail below. In the presently preferred exemplary embodiment, the video game computer board 100 is a compact version of the Super NES video game system. The memory board 102 includes storage devices for storing downloaded game program, game character data and other applications program information. The memory board 102 additionally includes a boot read-only memory (ROM) whose boot program executed upon power-on determines whether the pseudo static RAM in the memory board 102 contains the expected program information and performs other operations as explained below in conjunction with FIGS. 10A–10C. In the presently preferred embodiment, the memory board also contains a microcontroller 190 shown in FIG. 7 together with a ZILOG communications controller model number Z85233.

Turning next to the data and control signals which are exchanged between the video game/computer board 100 and the memory board 102, a refresh signal REFRESH is coupled to the memory board 102 to refresh the random access memory (RAM) devices in a manner that will be appreciated by those skilled in the art. The computer board 100 also couples a system clock signal and a 21 MHz clock signal to the memory board. The system clock signal provides the necessary clocking for register functions and for the memory board RAM in a manner understood by those skilled in the art. The system clock preferably permits the clocking rate to be selectable to at least a limited extent. The ROMSEL and the RAMSEL signals are generated by the video game computer board and are used as chip enable signals which are processed by decoding logic in the memory board to select the appropriate memory at the appropriate time. As shown in FIG. 6 various power lines and bidirectional control lines are also coupled to the memory board and the video game computer board.

Among the control signals coupled to the video game computer board 100 are video game control signals generated by a player hand-held controller 3. These signals are coupled to the video game computer board 100 via a microcontroller 190 (FIG. 7) on the memory board 102. In a preferred embodiment of the present invention, the signals generated by a SNES-type game controller 3 are latched by logic circuitry within the memory board 102. In accordance with the present exemplary embodiment, the controller signals are coupled to the microcontroller 190 which latches the player input signals and couples these signals to the video game computer via the controller lines shown in FIG. 6. In the memory board 102, two 8-bit latches are used to provide 16 bits of player controller information to the video game computer board 100

The video game computer board has 24 address lines CA0–CA23 which are coupled to the memory board 102 and used to address the memory devices embodied therein. Additionally, 8 data lines are used for exchanging data between the memory board 102 and the computer board 100. The memory board 102, as will be explained further below, includes a pseudo static RAM for storing program information which, like other memory in memory board 102, is coupled to the address data lines. The video game computer board 100 also includes additional control lines for coupling read or write signals to the memory devices on the memory board 102.

The memory board 102 also includes an IRESET line for providing an externally generated reset signal to the video game computer board 100. IRESET is used when the system needs to be reset due to communication problems which may develop from time to time in the hotel or when communication must be terminated due to other higher priority communications. The RESET line shown in FIG. 6 is used to reset the elements embodied in the memory board upon power-up to permit voltage levels to settle. The computer and memory board are also interconnected via an 8 bit address bus PA0–PA7 which permits addressing of registers (described below) that are located in a particular CPU address space.

The memory board 102 receives high speed synchronous serial input which includes program information downloaded from the host computer 7. Such synchronous serial input is received at, for example, 408k baud and may include game program or application program information. The memory board also includes an asynchronous serial input/output port which receives input at, for example, 102.4k baud including game controller keystroke data or commands (e.g., halt, unhalt, reset) sent to the SNES by a guest terminal 2 via RF modem 5, MCU 6 and the keystroke data link shown in FIG. 1. Additionally, a further asynchronous serial input/output port is included which receives information from the computer host 7 at, for example, 38.4k baud. Commands from the host computer 7 are coupled to the memory board microcontroller and the SNES (which in turn respond to the host computer 7), via this bidirectional link. The memory board 102 also receives a 5 volt power input. Additionally, the video game computer board 100 outputs video signals outputs and left and right channel audio signals to the guest's television as described in FIG. 1.

As will be appreciated by those skilled in the art, the input signals described above are appropriately routed to the SNES engine assigned to a it particular guest room. If eight SNES engines are used in a given application, a 3-bit "address" may be used to uniquely identify a particular SNES engines.

Figure 7:
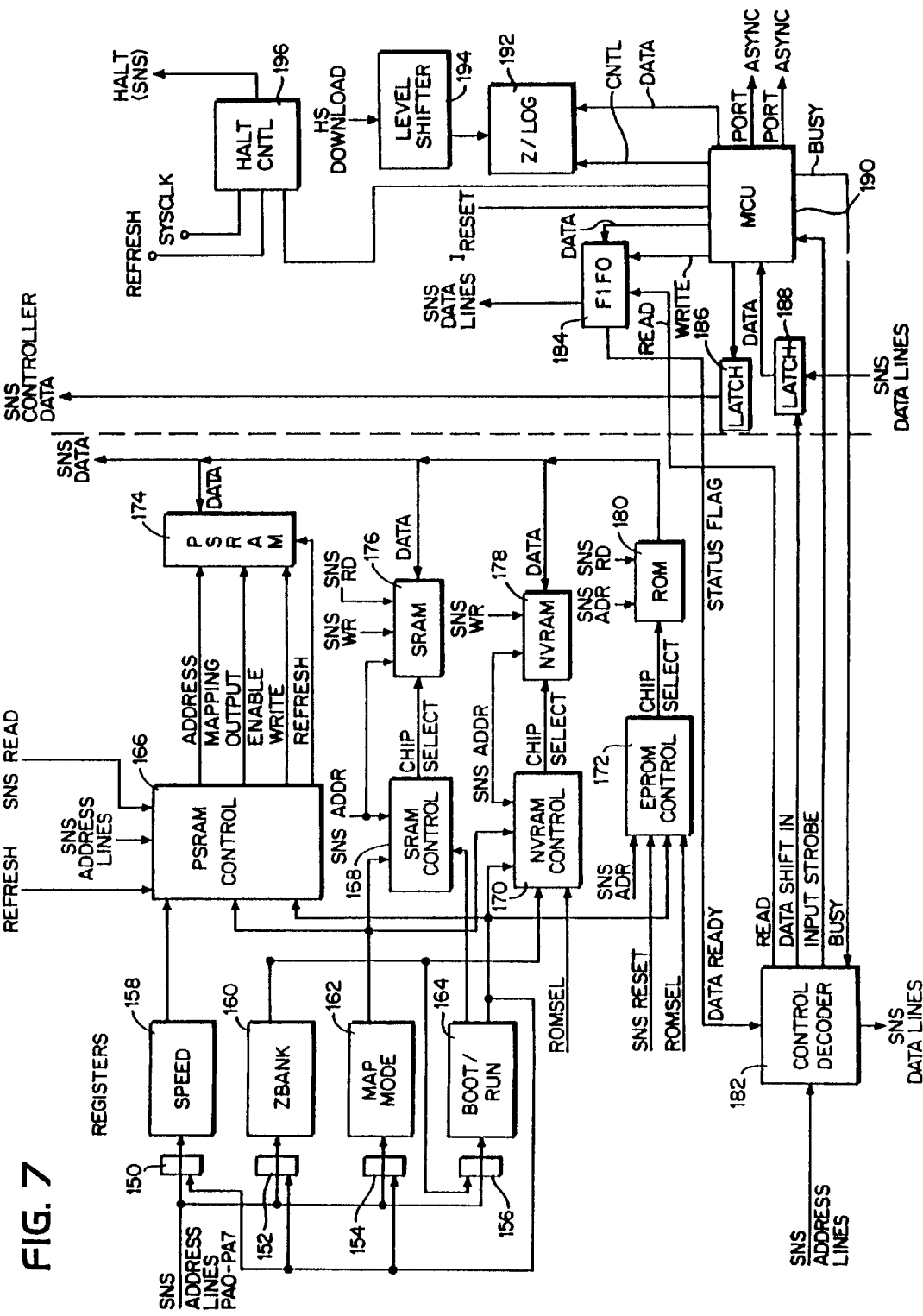
FIG. 7 is a block diagram of the circuitry embodied on the memory board 102 shown in FIG. 6.

FIG. 7 is a block diagram of the circuitry embodied on the memory board 102 shown in FIG. 6. The memory board 102 includes decoder logic 150, 152, 154, 156 which may include associated registers 158, 160, 162, 164 and may, for example, be implemented programmable array logic (PAL). The decode logic 150–156 performs decoding and register loading related functions as will be explained in detail below.

Associated with each decode logic 150, 152 154, 156, is a single bit register. Register 158 is identified as the speed register. Register 160 is identified as the Zbank. Register 162 is identified as the map mode register and register 164 is identified as the boot/run register. The function of the registers 158–164 are explained further below. The bits stored in the respective registers are input to a pseudo RAM (PSRAM) controller 166 which, in turn, selects in accordance with the state of the output from registers 158–164, the pseudo RAM 174 address mapping mode. The address mapping functions implemented by the PSRAM controller 166 permits diverse games using different address mapping modes to be executed using the same memory board hardware.

The pseudo-static RAM controller 166 in addition to performing address mapping functions also provides a pseudo-static RAM output enable signal for read function, a write enable signal, and generates the refresh signal required for the pseudo static RAM 174. The pseudo static RAM controller 166 receives address data from the Super NES address lines (as shown in FIG. 6). This address data is interpreted dependent upon the state of registers 158–164, which, in turn are set in response to the address signals input from decode logic 150–156 via address lines as PA0–PA7. In the illustrative embodiment, the pseudo-static RAM 174 is preferably a 2 Mbyte RAM which is also responsive to PSRAM controller signals as shown in FIG. 7.

The registers 162, 164 are also coupled to static RAM controller 168 which controls access to RAM 176 by generating a chip select signal based upon output that is received from registers 164, 162. The static RAM 176 is addressed via address signals on the Super NES address bus and is responsive to the Super NES read and write control signals as shown in FIG. 7.

The registers 160, 162 and 164 are also coupled to a non-volatile RAM controller 170 which generates a chip select signal for non-volatile RAM 178. Non-volatile RAM 178 is addressed from the SNES address bus and receives write control signal and read control via chip enable as shown in FIG. 7. The contents of boot/run register 164 as well as SNES reset and ROM select signals are coupled to EPROM controller 172 which generates a chip select signal at the appropriate time to read the EPROM 180. The EPROM controller 172 receives an address from the Super NES address bus. The EPROM may be written in response to an SNES write control signal. Each of the pseudo-static RAM 174, SRAM 176, non-volatile RAM 178 and boot ROM 180 is coupled to the SNES address and data buses.

The pseudo-static RAM 174 stores either a downloaded game program or the downloaded applications programs as described above. The static RAM 176 stores various types of game parameter information and operates as a scratch pad memory. The non-volatile RAM 178 stores information generated by an applications program and information relating to the status of the pseudo-static RAM 174 including information identifying the kind of data stored in the pseudo-static RAM 174.

The memory board 102 also includes in the present exemplary embodiment an interface microcontroller 190 which may, for example, be a Hitachi H8/325 microcontroller. The microcontroller 190 performs functions which are described in detail below.

Memory board 102 additionally includes a control decoder 182 that is coupled to the SNES address lines. In response to signals received on the SNES address lines, control decoder 182 couples a "data ready" signal to microcontroller 190, a "read" signal to first-in first-out (FIFO) buffer 184, provides a "data shift in" signal to latch 188 (which receives data from the SNES data lines) which, in turn, shifts data out to microcontroller 190. The FIFO 184 receives high speed downloaded information from microcontroller 190 and stores such data in response to the "write" signal generated by MCU 190. The control decoder 182, in response to a read control signal on its input address lines triggers a read operation from FIFO 184. If there is no data available in FIFO 184 upon request, a "data not ready" signal is generated by FIFO 184 which is coupled to control decoder 182 and to the SNES data lines. To write data to MCU 190, the SNES processor checks the "busy" line which indicates if MCU 190 can receive data. If MCU 190 can receive data, then one byte is shifted in latch 188, which, in turn, activates the "Busy" signal by sending a "Input Strobe" signal. If MCU 190 cannot receive data, SNES continues to check the "busy" signal.

The microcontroller 190 additionally controls a ZILOG serial communications controller 192 which is coupled to receive high speed downloaded program instructions and data from the host computer 7. The downloaded program instructions and data are coupled to the ZILOG serial communications controller 192 via voltage level shifter 194. The high speed downloaded data from the tuner 86 has a logic level of 0 to 1 volts. Level shifter 194 is a conventional level shifter which converts the 0 to 1 volt data to 0 to 5 volts.

The memory board 102 also includes a halt controller 196 which is coupled to microcontroller 190. The halt controller 196 is designed to couple a halt signal to the video game computer. The halt signal may be generated to halt game play after a predetermined time period, e.g., 1 hour after initiation, so that the user may be prompted to request further playing time and to pay for such time. Additionally, the halt controller may be programmed to be responsive to public address announcements or other events in the hotel deemed to be events which should trigger the halt condition. The halt controller 196 ensures that the halt does not take place at any arbitrary time, but requires halting in sync with a memory refresh operation to avoid losing stored data and the system clock signal. Halting the Super NES may be desirable when higher priority tasks must be performed or if, for example, some other reason exists for halting the video game computer such as during communications or power problems.

As previously indicated, memory board 102 couples game controller data to the video game computer board through controller input lines. Such controller data is coupled to microcontroller 190 via an asynchronous serial port. The controller data is output to the SNES through latch 186 whose output is coupled to a controller data lines as shown in FIG. 6.

The microcontroller 190 also includes a reset output line which is used to reset the video game computer to, for example, recover from a temporary drop in voltage level in the hotel or any other it electrical disturbance. The boot ROM program checks to determine whether it is executing as a result of such error condition.

FIGS. 8A–8H depict various configurations of the video game computer address space. The memory configuration accessible by the video game computer CPU is defined by the information stored in registers 158, 160, 162 and 164, as exemplified in FIGS. 8A–8H.

Figure 8A:
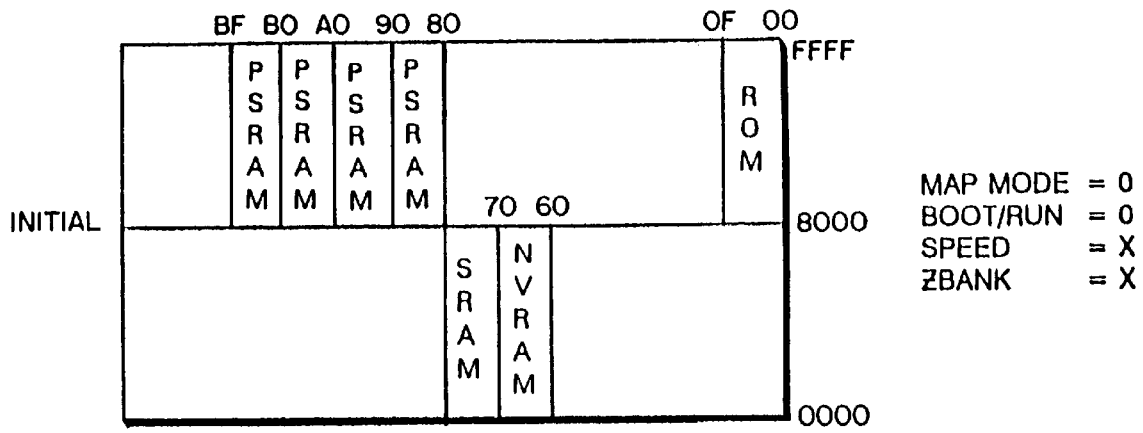
FIGS. 8A–8H show exemplary memory configurations during various possible operating modes.
Figure 8B:
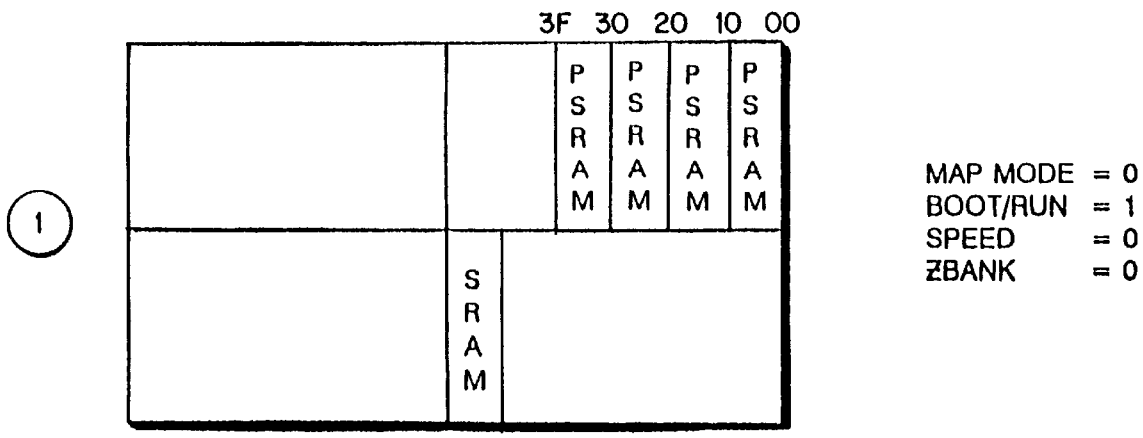
Figure 8C:
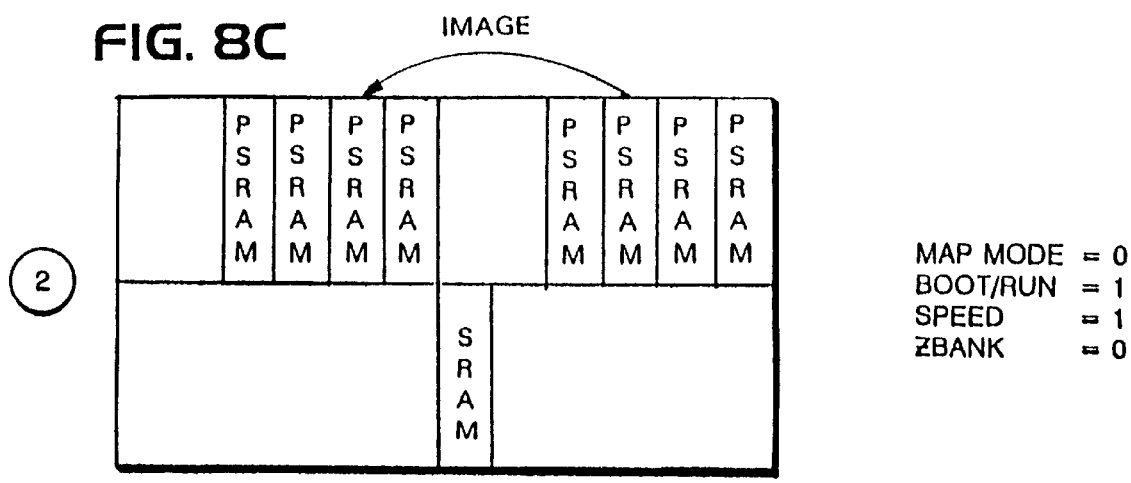
Figure 8D:
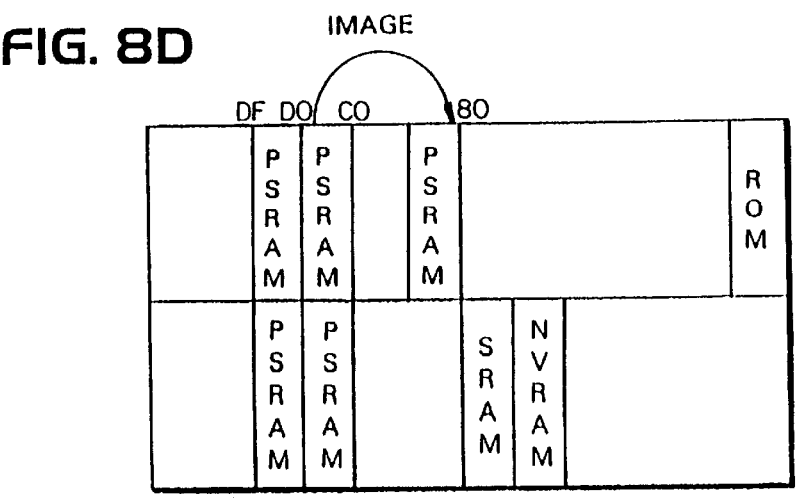

FIGS. 8A and 8D show two exemplary memory configurations after the power is initially turned on. As shown in FIGS. 8A and 8D the boot ROM program is initially executed which is accessed by accessing memory bank 00. During this time period no application program is running, as indicated by the boot/RUN register storing a logical "0". The boot/run bit switches between the boot ROM being mapped to a location for the video game computer to execute (boot/run=0) or the contents of the pseudo-static RAM being mapped to a location position for the video game computer to execute (boot/run=1). As shown in FIGS. 8A and 8D, the contents of the "speed" and "Zbank" registers have no effect on this memory configuration (as indicated by the "X" or "don't care" condition). The registers 158–164 are set in response to the selection of a game program prior to downloading a specific game program.

FIG. 8A reflects the memory configuration which is the standard configuration where the SNES video game computer would normally begin executing out of a game cartridge ROM. In this configuration, the boot ROM embodied on the memory board 102 is mapped in place of the game cartridge ROM. In the initial power up mapping shown in FIG. 8A, the non-volatile RAM, (NVRAM) is accessible by the video game computer to enable the boot ROM program to provide a check of the last status of the system prior to being powered up (which is stored in a non volatile RAM 178). As shown in FIG. 8A during the boot program execution, the pseudo-static RAM 174, the static RAM 176, and the NVRAM 178, are accessible by the CPU.

Figure 8E:
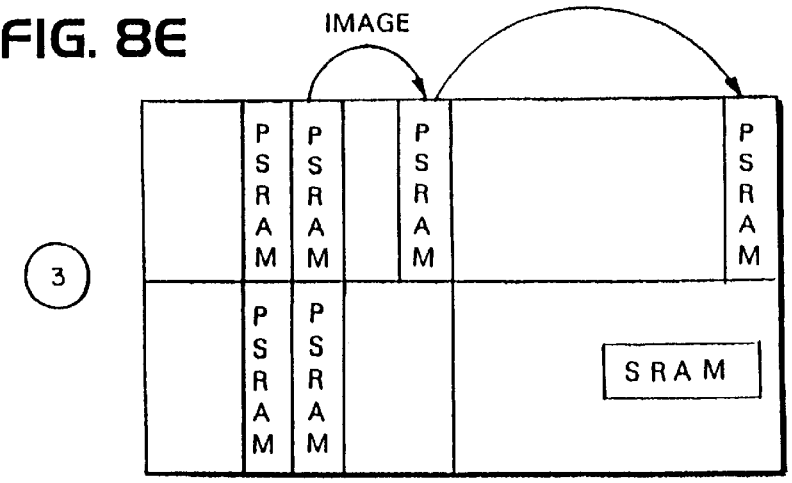
Figure 8F:
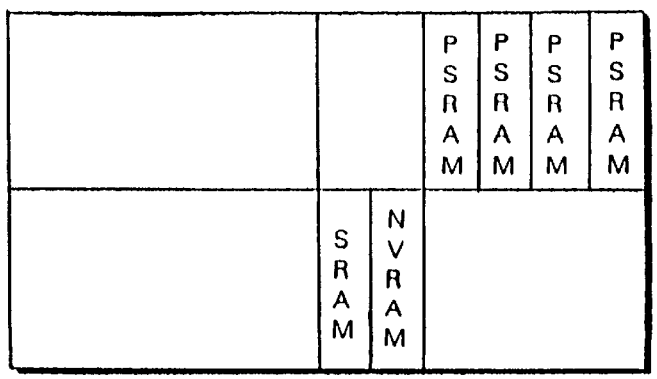
Figure 8G:
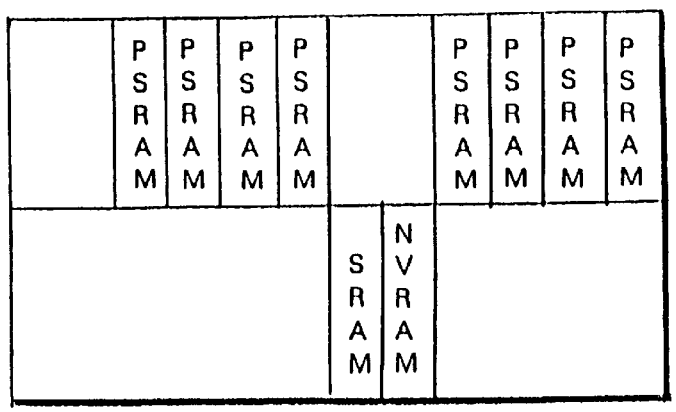
Figure 8H:
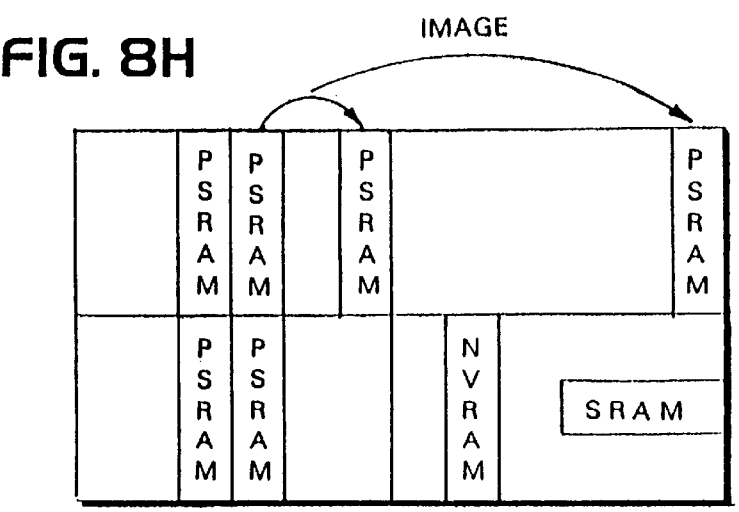

FIGS. 8B, 8C, and 8E define memory three standard address space configurations associated with a wide range of Super Nintendo Entertainment Systems games. As indicated in 8B, 8C, and 8E, the contents of the boot/run register is "1" indicating that the game program is executing.

The memory mapping modes shown in FIG. 8B and 8C differ in that in FIG. 8C an image of the pseudo static RAM locations appears in predetermined lower address memory banks and higher memory address banks. As shown in FIGS. 8B and 8C, the associated register states differ based upon the contents of the "speed" register. As previously indicated, the video game computer system clock generates signals at two different rates. In an exemplary embodiment of the present invention, the high speed clock rate is used to execute programs (stored in an image of lower order PSRAM memory banks) out of higher order address banks.

The Zbank register setting controls the ability of an applications program to, upon completion of execution, permit the video game computer to access the boot ROM to permit down loading of a game program. A game program, however, cannot be permitted to access the boot ROM. The state of the Zbank register is fed back to the decoding logic to indicate that the application program is running. The map mode bit defines in part the address mapping mode to be selected.

If a video game program is running, the state of the Zbank register precludes modification of the speed, Zbank, map mode, or boot run registers. However, if an application program is running, the state of these registers may be later modified.

The memory board 102 shown in FIG. 7 operates as follows. When power is initially turned on, video computer board's CPU is represented as shown FIG. 8A and the program stored in the boot ROM is executed. The boot ROM program execution (which is explained in further detail below) requests the video game computer CPU to write data appearing on the video game computer data lines into latch 188 in response to "data shift in" control signals generated by control decoder 182 in response to signals on the SNES address lines. The microcontroller 190 is informed that data is ready via its "Input Strobel" control input. The MCU 190 reads the data stored in latch 188 and outputs the data to the SNES video game processor or the host computer 7.

Data which is to be coupled to the SNES is loaded by MCU 190 into FIFO 184. The SNES video game computer, when executing programs stored in the boot ROM, monitors FIFO 184 for the presence of a status flag when data is available. The SNES then couples a control signal on its SNES address lines which are decoded by control decoder 182 to generate a "read" signal which is coupled to FIFO 184 which initiates the read out of information from the SNES data lines.

The boot ROM program may then, in response to the read data, initiate the downloading of an applications program, a game identifier which uniquely indicates the game which has been selected, and/or mapping mode register indicia that is to be loaded into registers 158–164. In accordance with one exemplary embodiment of the present invention, the first time the boot ROM program is executed the applications program downloading is initiated. As the application program is downloaded, the boot ROM monitors the FIFO 184 status flag for the presence of information which may be read. The applications program itself is downloaded via a high speed download link through level shifter 194 to the ZILOG serial communication port controller 192 which, in response to control signals from the microcontroller 190, couples data to the microcontroller which, in turn, loads the data and/or instructions to FIFO 184.

When the applications program is downloaded from the host computer 7, after being buffered in the FIFO 184, it is loaded into the pseudo-static RAM 174 via the SNES data bus. After the applications program is downloaded, game related parameter data is loaded and stored in the nonvolatile RAM 178. In this fashion, the applications program is able to access during execution the contents of the non-volatile RAM 178 to enable display of such information as the particular games and/or educational programs that are available. When the applications program has been successfully downloaded, the contents of the z bank register is set to "1" and the video game computer memory address space is organized as shown in FIG. 8E–8H.

During the execution of the application program, the user makes the desired menu selections. The menu selections result in the loading of data into latch 188 in FIG. 7. The "Input Strobe" signal is then sent to the microcontroller 190 which triggers the reading of data from latch 188 to result in the menu selection data being sent to the host computer 7. The ultimate destination of the data depends upon the user's menu selection which may indicate the need to download a particular video game program, or the user's selection of a movie, shopping or same other mode.

If a game is selected, player control data indicating, for example, the movement of a moving object, e.g., Super Mario, is coupled to the MCU 190 from a room terminal and the player controller information is loaded into latch 186. The player control data is then coupled to the video game controller via SNES controller data lines. The player controller data may indicate, left, right, up, down directional movement of a moving object, or control signals generated by the "A," "B", etc., control buttons on a conventional SNES game controller.

During execution of the program stored in the boot ROM it is permissible for the contents of registers 158–164 to be changed. Addresses appearing on address lines PA0–PA7 are used to uniquely set or reset each of the four registers 158, 160, 162, and 164. PAL decode logic 150, 152, 154 and 156 prevents associated registers from being set or reset during the time period when the system precludes such a modification. For example, during execution of a game, the decode logic 150 will not permit the clock rate of a game to change.

Figure 9:
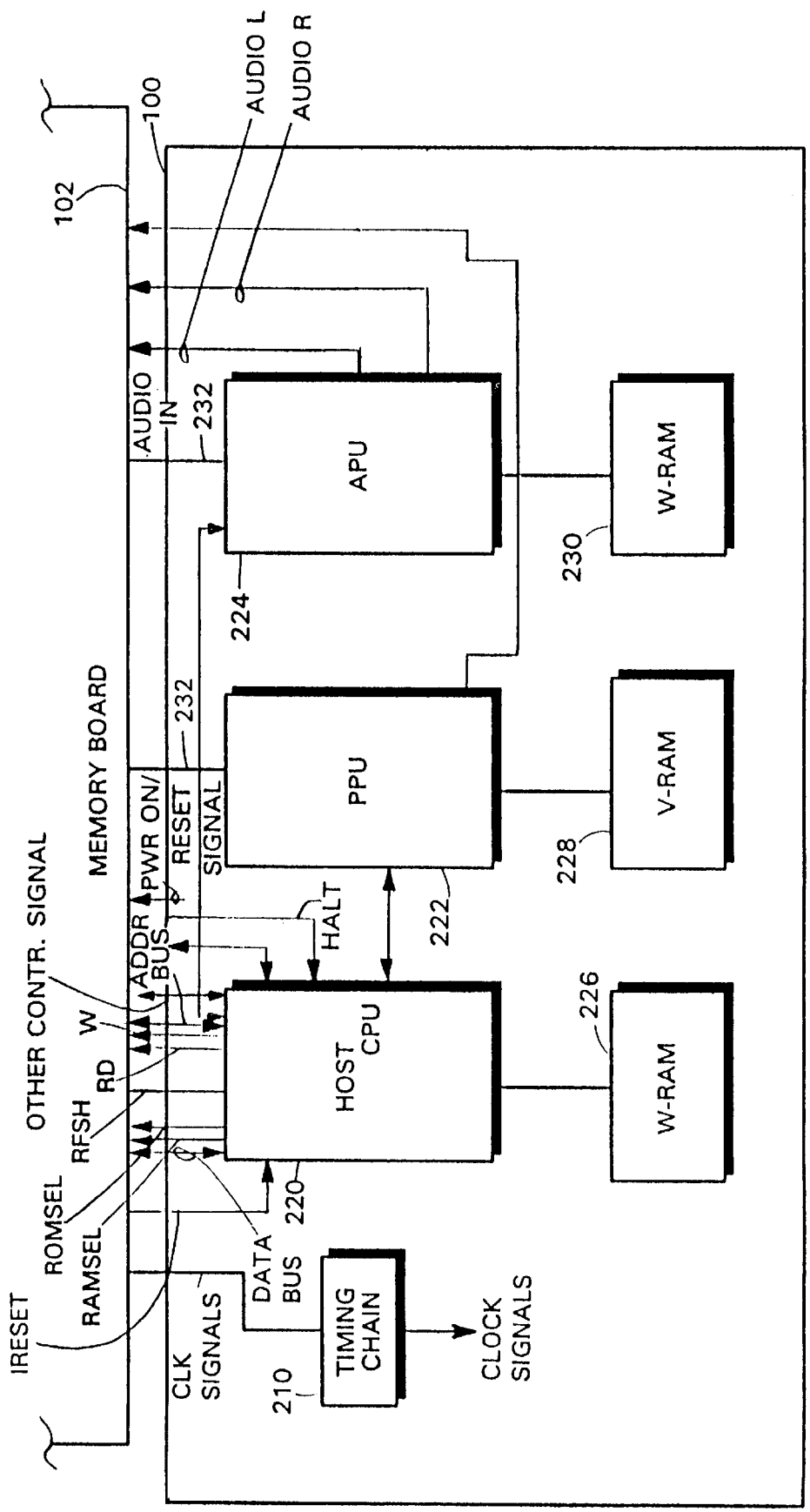
FIG. 9 is a simplified block diagram of an exemplary computer/video game processing system which may be used in conjunction with the present invention.

FIG. 9 is a simplified block diagram of an exemplary computer/video game processing system which may be used in conjunction with the present invention. In accordance with the present exemplary embodiment, the computer board may, for example, be the 16 bit video game system commercially sold by Nintendo of America Inc., as the Super Nintendo Entertainnment System (Super NES). The Super NES is described in part in U.S. Pat. No. 5,327,158, entitled "Video processing apparatus," which was filed on Apr. 10, 1991, U.S. Pat. No. 5,291,189, entitled "Direct Memory Access Apparatus and External Storage Device Used Therein," and filed on Aug. 26, 1991 and U.S. Pat. No. 5,400,052, entitled "Mosaic picture Display Apparatus and External Unit Used Therefore." These applications are expressly incorporated herein by reference. It should be understood, however, that the present invention is not limited to Super NES related applications and may be used in conjunction with other video game/data processing systems or other non-video game information processing apparatus. References throughout the specification to Super NES (SNES) or SNES engines should not be construed as limiting the scope of the present invention to Super NES related applications or systems having a block diagram such as shown in FIG. 9. The Super NES preferably is modified in a number of respects such as those described herein. The RF modulator circuitry contained in a conventional Super NES system is not embodied in the present exemplary embodiment but rather external RF modulators are used. As shown in FIG. 9, the video game computer board 100 is coupled to the memory board 102 which was described in detail in FIG. 7. The host CPU 220 and the other hardware components on board 100, as indicated above, are representative of the Super NES commercially sold by Nintendo of America.

The host CPU 220 is a 16 bit CPU which may, for example, be a 65816 compatible microprocessor. CPU 220 is coupled to a working RAM 226 which may, for example, include 128K bytes of storage. The CPU 220 is coupled to a picture processing unit 222 (which is described in detail in the '265, '530 and '735 applications) which, in turn, is coupled to a video RAM 228. The CPU 220 can only access the video RAM 228 via the PPU 222 at times other than active line scan, when the PPU 222 is accessing video RAM 228. PPU 222 generates a video signal which is coupled to the a guest's television monitor. CPU 220 is also coupled to an audio processing unit APU 224 which is coupled to its working RAM 230. The APU 224, which may comprise a commercially available sound chip, generates the sounds associated with the video game stored in the pseudo-static RAM 174 on memory board 102. Host CPU 220 can only access the working RAM 230 via APU 224.

The video RAM 228 in the Super NES is loaded with appropriate character data stored in the pseudo-static RAM 174 (which stores not only the game program but also the character data used during game play). Any moving object or background characters to be displayed are resident in video RAM 228 before display.

For further details of the moving object and background character processing in the Super NES, see, for example, FIGS. 4 and 5 of U.S. Pat. No. 5,327,158, which has been incorporated herein by reference.

The program storing pseudo-static RAM 174 is accessed by the host CPU 220 via address busses and data busses which are generally shown in FIG. 9. The PPU 222 is connected to the memory board via shared host CPU data and address busses and via connector 234 to provide a path for PPU data and control signals to be coupled to the memory board. The APU 224 is connected to the memory board via shared host CPU busses and audio bus 232.

As previously described and as indicated in FIG. 9, the Super NES generates a variety of control signals. When the Super NES CPU 220 needs to access pseud-static RAM 174, it generates control signal ROMSEL. To initiate a memory refresh, the Super NES generates a refresh signal RFSH. The host CPU 220 additionally generates read and write signals. System timing signals are generated from timing chain circuitry 210 within the video game processing board 100. A power-on reset signal is also generated within the video game computer board 100 and is coupled to the memory board 102. Other control signals shown in FIG. 8 which are unique to the present hotel application implementation have been previously described such as the "halt" control signal and the "IRESET" signal described in conjunction with FIGS. 6 and 7. A more complete portrayal of the signals exchanged between the memory board 102 and the video game/computer board 100 is shown in FIG. 6.

FIGS. 10A–10D delineate the sequence of operations performed by the program stored in the boot ROM 180 shown in FIG. 7, except for the downloading operations previously described in FIGS. 5A and 5B. When the boot program begins executing, the CPU 220, PPU 222 registers and ports associated with the video game/computer board 100 are initialized (251). After initialization, the initial display screen seen by the user (which may be generated by either the host computer 7 or the SNES) is set up (252).

Figure 10A:
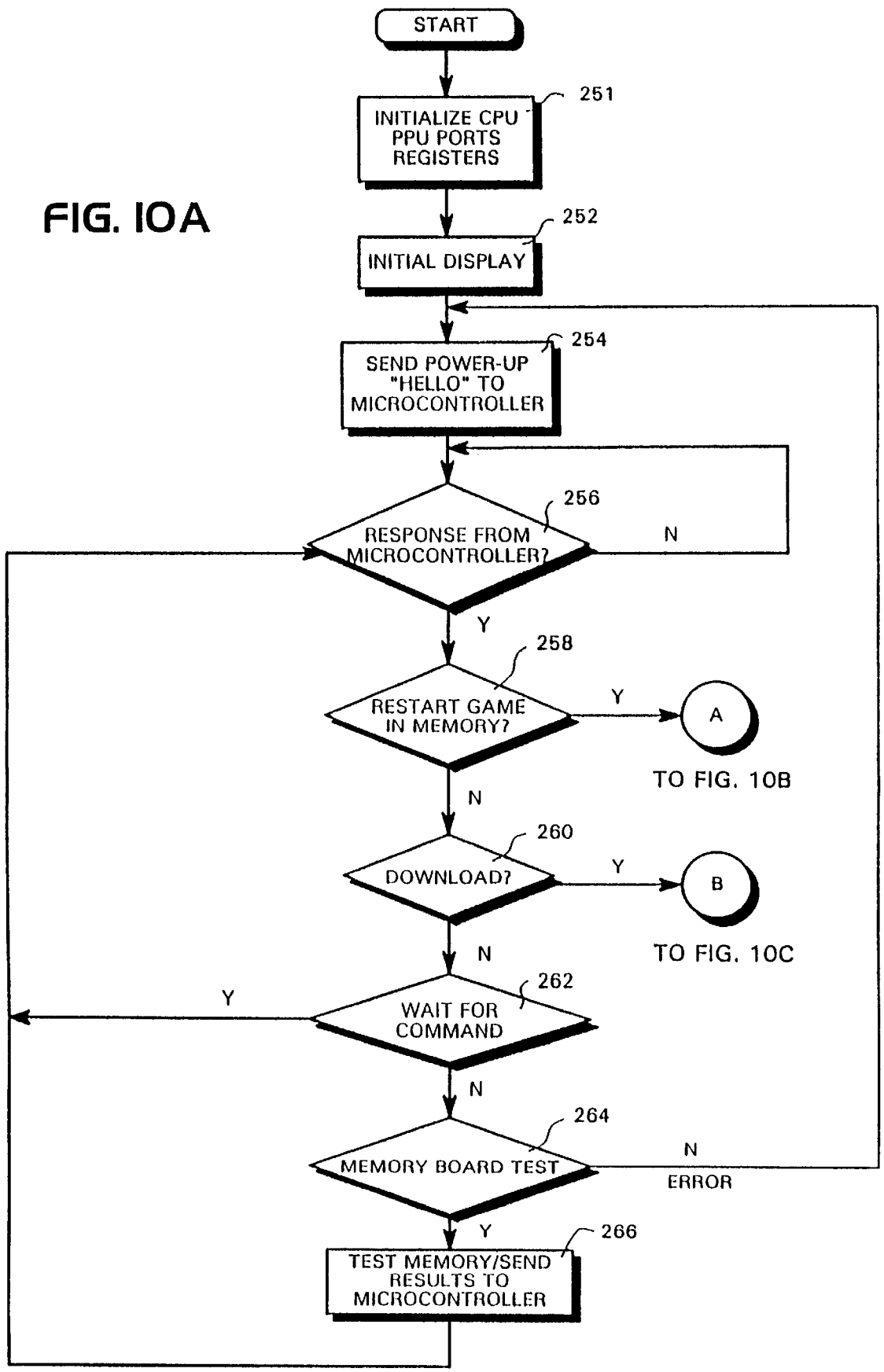
FIGS. 10A–10D delineate a sequence of operations performed when executing the boot ROM program.

As indicated in FIG. 10A, the illustrative boot ROM program execution results in the SNES sending a power-up message, e.g., "hello" to microcontroller 190 on the memory board (254). The message from the SNES informs microcontroller 190 that the SNES has just gone through a reset operation (i.e., either power-on reset or a reset resulting from actuation of the game controller "reset" key).

The microcontroller 190 thereafter generates one of various responses to the SNES "hello" message. As indicated at block 256, the SNES continuously checks as to whether a response from the microcontroller has been received. When a response from microcontroller 190 is received, a check is made to determine whether the response indicates that the game stored in pseudo-static RAM should be restarted (258).

If the response does not indicate that the game should be restarted, then a check is made at block 260 to determine whether a download operation has been initiated. If a program download has not been initiated, then a check is made at block 262 to determine whether a "wait for command" response was received, which typically indicates that after the entire system is initially powered up, it is necessary to wait for a command.

If the response did not indicate the need to wait for a command, then a check is made at block 264 to determine whether a memory board test was initiated. If a memory board test had not been initiated, then the routine branches back to block 254 to initiate the transmission of the power-up message to the microcontroller to repeat the above-described processing. If a memory board test was initiated, then the SNES boot RCM program tests the memory and sends the results to microcontroller 190 (266). The memory test may consist, for example, of reading and writing information into pseudo-static RAM 174, static RAM 176, and nonvolatile RAM 178 to ensure proper memory operation. The routine then branches back to block 256 to test for a response from the microcontroller 190.

Figure 10B:
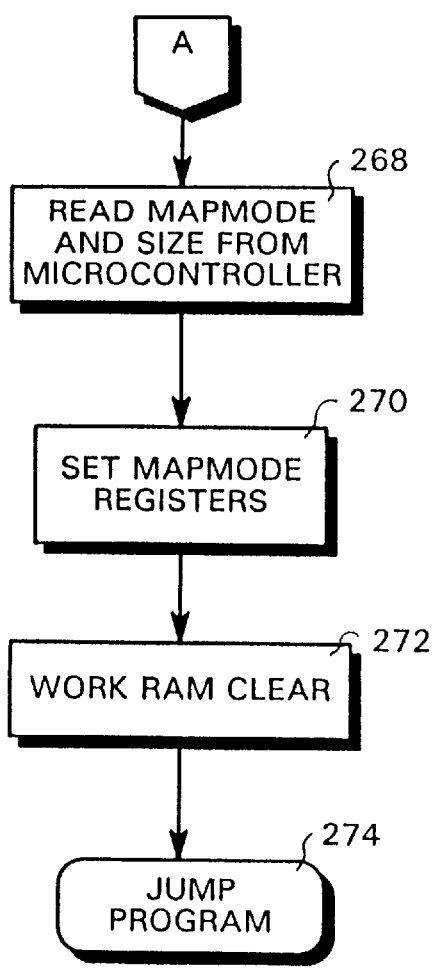

If, based on the check at block 258, the response from microcontroller 190 indicates that a game is to be restarted, then, as shown in FIG. 10B, the microcontroller forwards the game program map mode (see FIGS. 8A–8H) and game program size information to the SNES. Thereafter, the map mode registers shown in FIG. 7 are loaded (270) and the work RAM is cleared (272). The routine then branches to the game program to be executed (274).

Figure 10C:
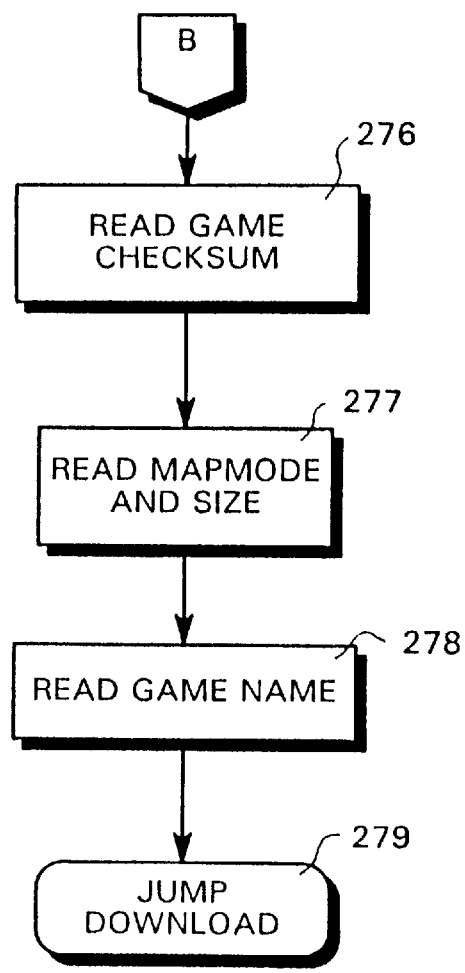

Turning back to FIG. 10A, if the check at block 260 indicates that a download operation has been initiated, then as shown in FIG. 10C, game checksum data forwarded by microcontroller 190 is read by the SNES (276). Thereafter, the SNES reads game program map mode and size, and game name information forwarded by microcontroller 190 (277, 278). The routine then branches to the download processing routine (279) described above in conjunction with FIGS. 5A and 5B.

Figure 10D:
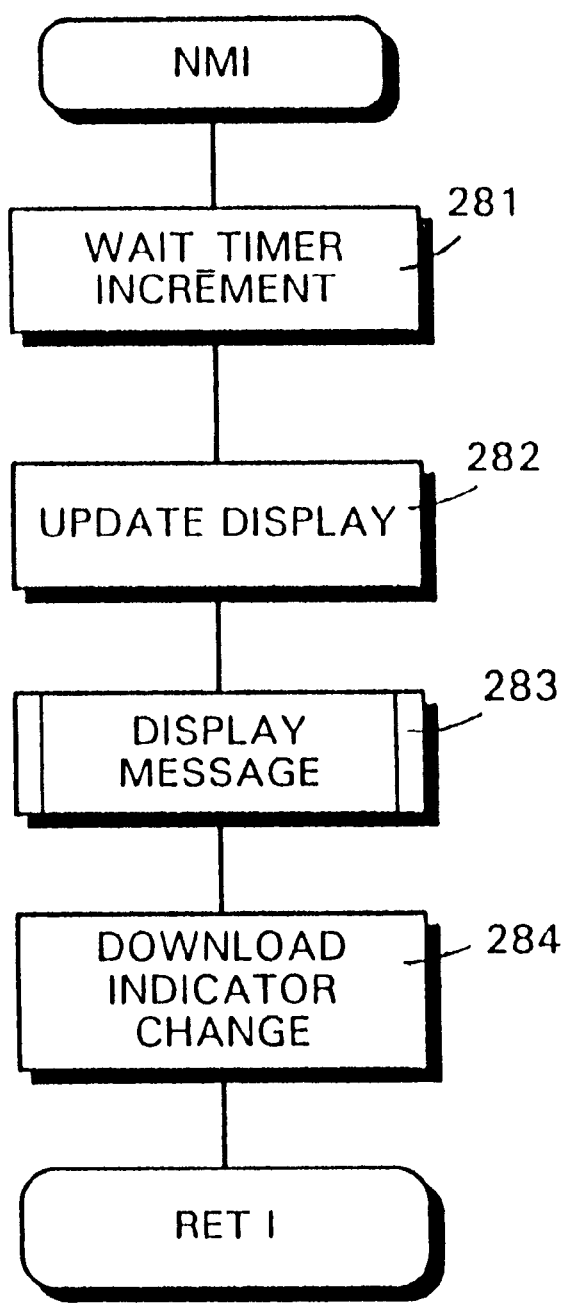

FIG. 10D represents the sequence of operations which occur during boot ROM non-maskable interrupt processing which is the only interrupt that may occur in the boot RCM program. As indicated at block 281, a "wait" timer is incremented which is used to control various timers, such as the timer which controls the allowable waiting time for a download to start. Next, as indicated at block 282, the display is updated with clock information (e.g., hand movement) to indicate ongoing operation of the system. Any additional messages which need to be displayed are then displayed (283). In an exemplary embodiment of the present invention during the downloading operation, a download indicator is changed (284) to indicate the degree of download completion. After the interrupt routine is executed, the routine then goes back to the main boot routine shown in FIGS. 10A–10C.

Figure 11:
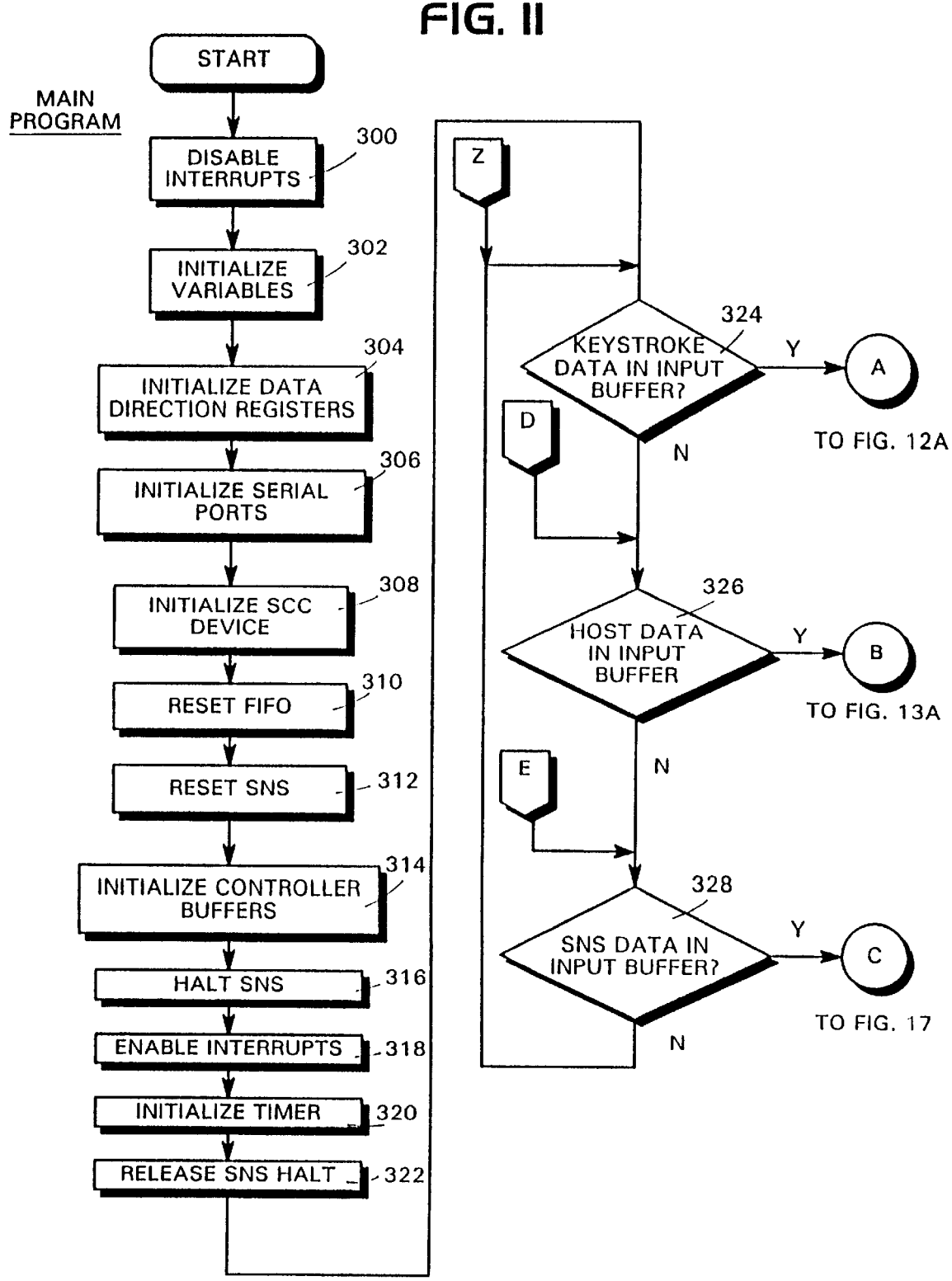
FIG. 11 is a flowchart which delineates the sequence of operations performed in a main processing routine by microcontroller 190 shown in FIG. 7.

FIG. 11 is a flowchart which delineates the sequence of operations performed in a main processing routine by microcontroller 190 shown in FIG. 7. FIGS. 12A–12D, 13A, 13B, 14, A-151, 16, 17, 18A–18H, 19–21 are flowchaats which show further details of the sequence of microcontroller operations resulting from branches taken from the main program of FIG. 11 in accordance with an exemplary embodiment of the present invention. Microcontroller 190 executes interrupt driven software which continually checks various status flags. Depending upon a status flag state, microcontroller 190 proceeds to either send data or receive data on a byte-by-byte basis.

Turning to FIG. 11, a series of initialization steps are performed to begin the controller's main program loop. Once power is turned on, as indicated in block 300, the interrupts associated with the microcontroller 190 are disabled. Thus, if serial data is received on the controller's input port during this time period, initialization is not interrupted. Thereafter, variables which determine what action is to be taken are initialized (302). As indicated at block 304, data direction registers associated with MCU 190 are initialized to determine whether a particular pin operates as an input or output pin. Thereafter, the MCU serial ports are initialized to set the appropriate baud rates, and the number of start, stop and parity bits (306). The baud rates to be associated with the serial communication controller (192) ports are then initialized (308). The microcontroller 190 software then resets the FIFO 184 (310) and the Super NES CPU 220 and PPU 222 (312) to ensure that the SNES begins executing out of boot ROM 180.

Thereafter, buffers which couple player controller data to the SNES are initialized (314). As indicated in step 316, the Super NES is then halted and MCU 190 interrupts are enabled (318). The built-in timer is then initialized (320). The MCU timer is used to trigger time-controlled interrupts which are initialized when the timer, for example, counts down to zero from an initial value.

The main program initialization processing is completed upon the release of the SNES from it's halt state (322). Thereafter, as indicated at block 324, microcontroller 190 checks to determine whether keystroke data is present in the MCU's input buffer. If so, the routine branches to the keystroke data processing routine shown in FIG. 12A, which is described below.

If there is no keystroke data present, as determined at block 324, then a check is made (326) to determine whether there is host data present in the host data input buffer. If there is host data present, then the routine processes the host data in accordance with the flowcharts shown in FIGS. 13A and 13B.

If there is no host data present as determined at block 326, then a check is made (328) to determine whether there is data in an SNES input buffer in the microcontroller 190. If there is data in the SNES input buffer, then that data is processed in accordance with the flowchart in FIG. 17. If there is no SNES data present, then the routine branches back to block 324 to again determine whether there is any data present in the keystroke input buffer.

The above-described processing takes place independently in each microcontroller 190 associated with a representative one of the SNES engines (1–N) shown in FIG. 1.

FIGS. 12A–12D delineate the sequence of operations involved in processing keystroke data. If the check at block 324 (FIG. 11) indicates that data is present in the keystroke input buffer, the routine branches to block 330 in FIG. 12A, where it is determined if there are at least two bytes of keystroke data in the keystroke input buffer. If there are not at least two bytes of keystroke data in the input buffer, then the routine branches back to block 326 (FIG. 11) to check the host input buffer. If there are at least two bytes in the keystroke input buffer, then one byte is read (332).

After reading the first keystroke data byte, a check is made to determine whether the first byte is a header byte (334). The preamble of a keystroke data stream consists of a header byte that denotes that keystroke data is to follow. The header byte delineates the starting point of the stream of data. Each SNES engine is assigned a time slot for reading data in a transmitted data stream. If the byte read is a header byte as determined at block 334, the next byte is read (336). In accordance with the exemplary communication protocol, this byte should be a data stream identifier. It is compared with the data stream number assigned to the subject SNES engine (338).

If the check at block 338 indicates that the assigned data stream number is for the particular SNES engine microcontroller 190, then a data position counter is reset (340) so that it is counting in synchrony with the assigned data stream position. The status of the MCU 190 is then set to "synchronized" (342) and the routine branches back to block 330 (FIG. 12A) for further processing to determine whether there are at least two more bytes in the input keystroke data buffer. If there are at least two bytes in the buffer, then once again, one byte is read (332) and a check is made to determine whether the byte is a header byte (334).

Figure 12A:
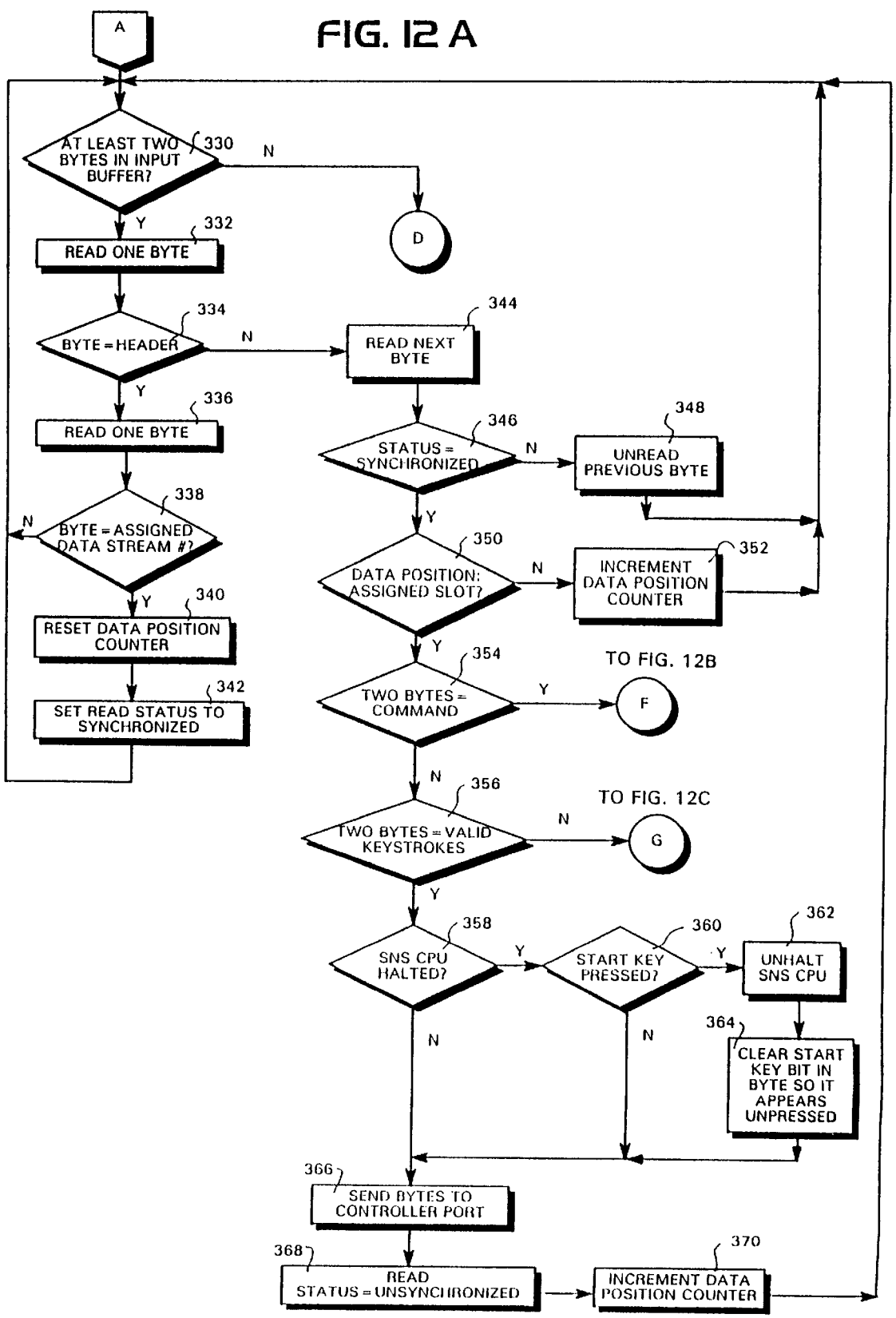
FIGS. 12A–12D delineate the sequence of operations involved in processing keystroke data.

After having initially read a header byte, the second pass through this loop results in the reading of the next byte (344). A check is made to ensure that the status is synchronized (346). If the status is not synchronized, then the byte which was just read is "unread" (by resetting the read pointers) (348) and the routine branches back to block 330 to repeat the loop processing. If the check at block 346 indicates that the status is synchronized, then a check is made to determine that the data is part of an assigned slot (350). If the data is not part of an assigned slot, then the data position counter is incremented (352) and the routine branches back to block 330 (FIG. 12A).

If the data is part of an assigned time slot, then a check is made at block 354 to determine whether the two bytes which have been read constitute a command (354). If the bytes read are not a comand, a check is made to determine if they are valid keystroke data (356). If the two bytes are a command, then the routine branches to FIG. 12B at block 372, as described below.

If the two bytes read are valid keystroke data as determined at block 356, a check is made to determine whether the SNES CPU has been halted (358). A halt check is make to permit the user to unhalt the CPU to, for example, purchase more game playing time. If the CPU has been halted, then the guest terminal 2 displays a menu display providing an option for continuing game play. The SNES is unhalted in response to a start key actuation 50. A check is made to determine whether a start key has been pressed (360). If so, the SNES CPU is unhalted (362) and the start key bit is cleared in the associated game controller byte so the start key appears as if it had not been pressed (364).

After the processing in block 364, or if the start key had not been pressed, or the CPU was not halted (358), the routine branches to block 366 to send bytes to the SNES controller port. Thereafter, the status is set to "unsynchronized" (368), the data position counter is incremented (370), and the routine branches back to block 330, where the input keystroke buffer is checked to determine whether two bytes are present.

In accordance with the FIG. 12A processing, keystroke data on the keystroke data link is sent to all SNES engines. This data is monitored by all SNES engines and the appropriate data assigned to a particular SNES engine is pulled out of the data stream by that SNES engine and processed.

Figure 12B:
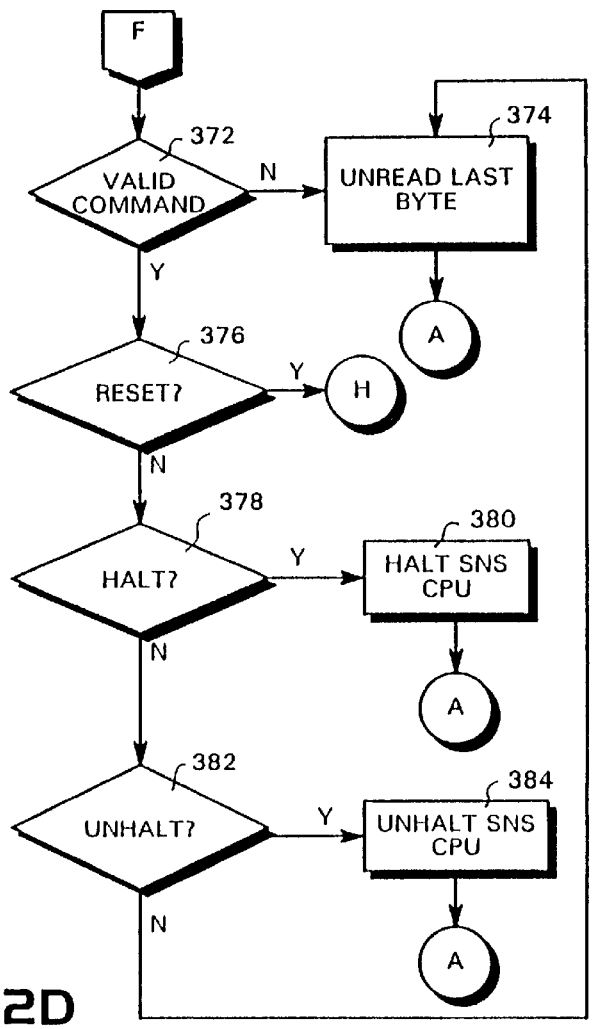
Figure 12D:
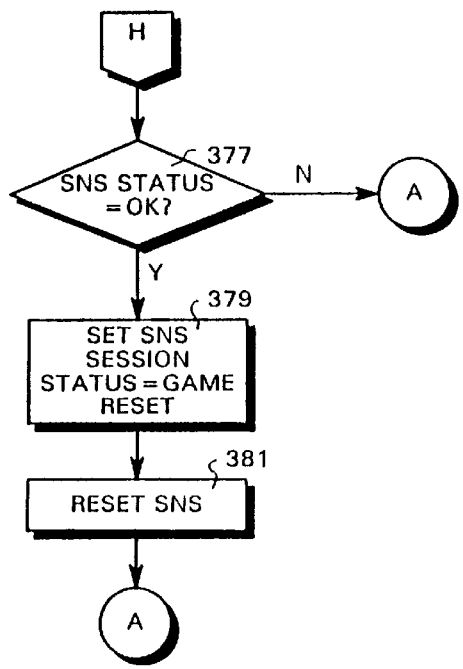

If the check at block 354 indicates that the two bytes read from an assigned time slot are a command, then the routine branches to FIG. 12B at block 372 to ensure that the command is a valid command. A valid command check is made by determining if the command is one of the limited number of valid commands which may be received by MCU 190 from a guest terminal. If the check at block 372 indicates that the command is not a valid command, then the last byte read is unread (374) and the routine branches back to block 330 (FIG. 12A).

If the command is a valid command as determined at block 372, a check is made to determine whether the command is a "reset" command (376). If the command is a reset command, then the routine branches to block 377 (FIG. 12D) where a check is made to determine if the SNES download operation status is okay. If the Super NES download status is okay, then a status flag is set to indicate game reset status (379). After the SNES is reset (381), the SNES CPU sends a "hello" command to microcontroller 190 which responds by instructing the SNES to begin executing the game program stored in pseudo-static RAM 174. Thereafter, the routine branches back to block 330 (FIG. 12A).

If the check at block 376 indicates that the command is not a reset command, then a check is made to determine whether the command is a "halt" command (378). If the command is a halt command, then the microcontroller issues a halt command to the SNES CPU (380) and processing returns to block 330 (FIG. 12A). If the check at block 378 indicates that the command is not a halt command, then a check is made to determine if the command is an "unhalt" command. If the command is an unhalt command, then microcontroller 190 unhalts the SNES CPU (384) and the routine branches to block 330 (FIG. 12A).

Figure 12C:
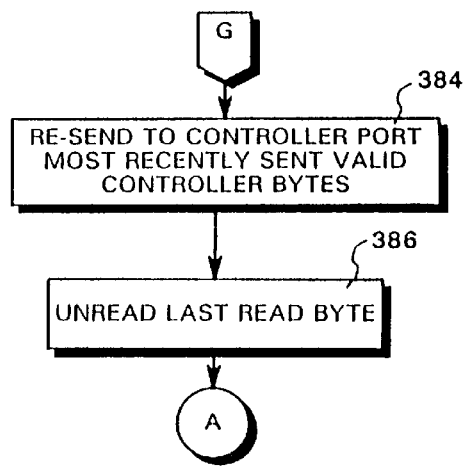

Turning back to FIG. 12A, if the check at block 356 indicates that the two bytes read from the assigned slot are not valid keystrokes, then the routine branches to block 384 (FIG. 12C). As indicated in FIG. 12C, if invalid data is detected, then the last two most recently sent valid controller bytes are resent (384). Thereafter, the last two bytes are "unread" (386) and the routine branches back to block 330 of FIG. 12A.

The afore-described keystroke data and command processing results in the SNES receiving all keystroke data and control information necessary for the SNES to respond to player interactive commands for moving objects (such as Super Mario) in the multitude of different ways permitted by SNES game programs. Information is processed in accordance with conventional SNES game programming processing techniques.

Figure 13A:
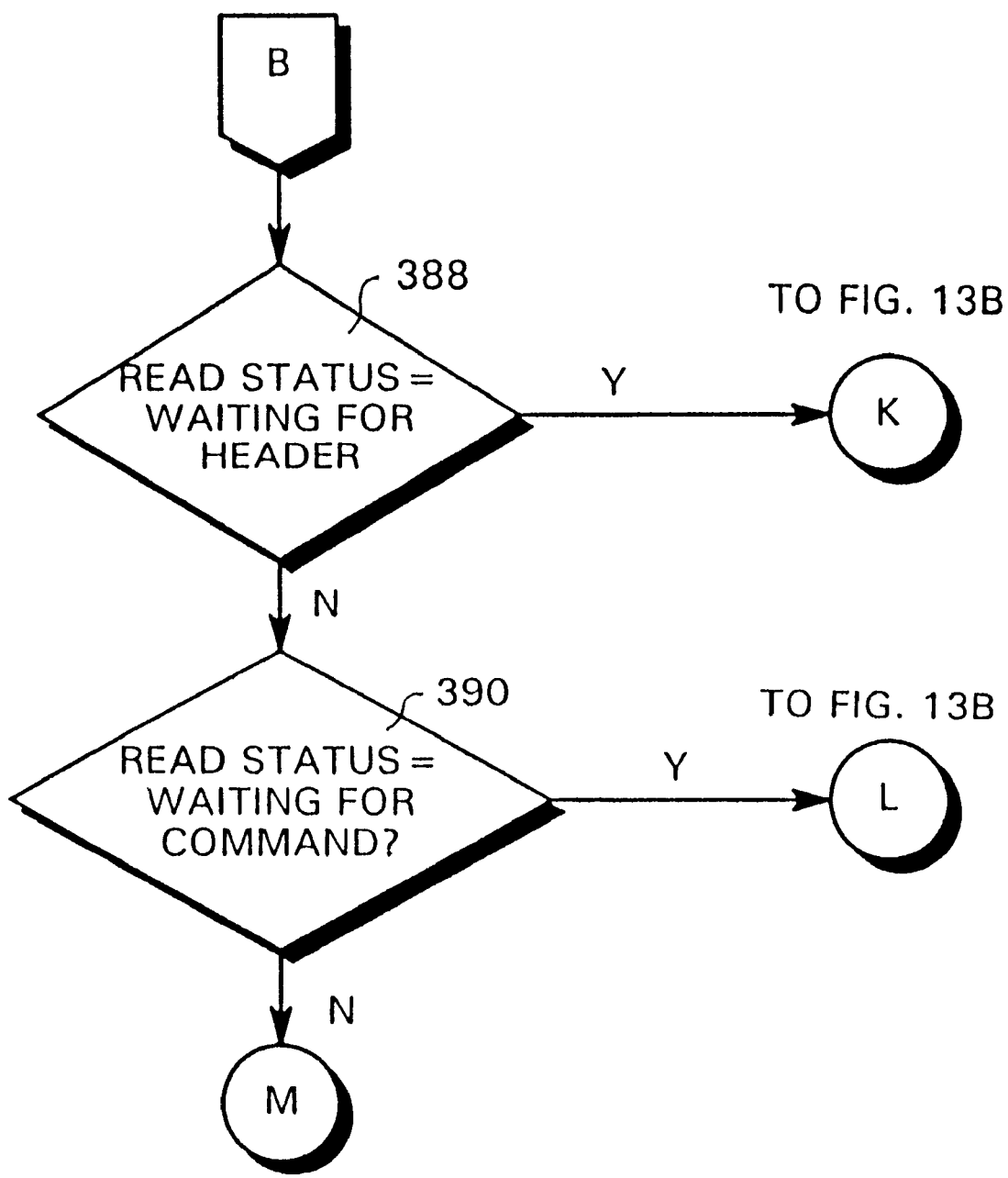
FIGS. 13A and 13B are flowcharts which relate to the microcontroller's processing of host information.
Figure 13B:
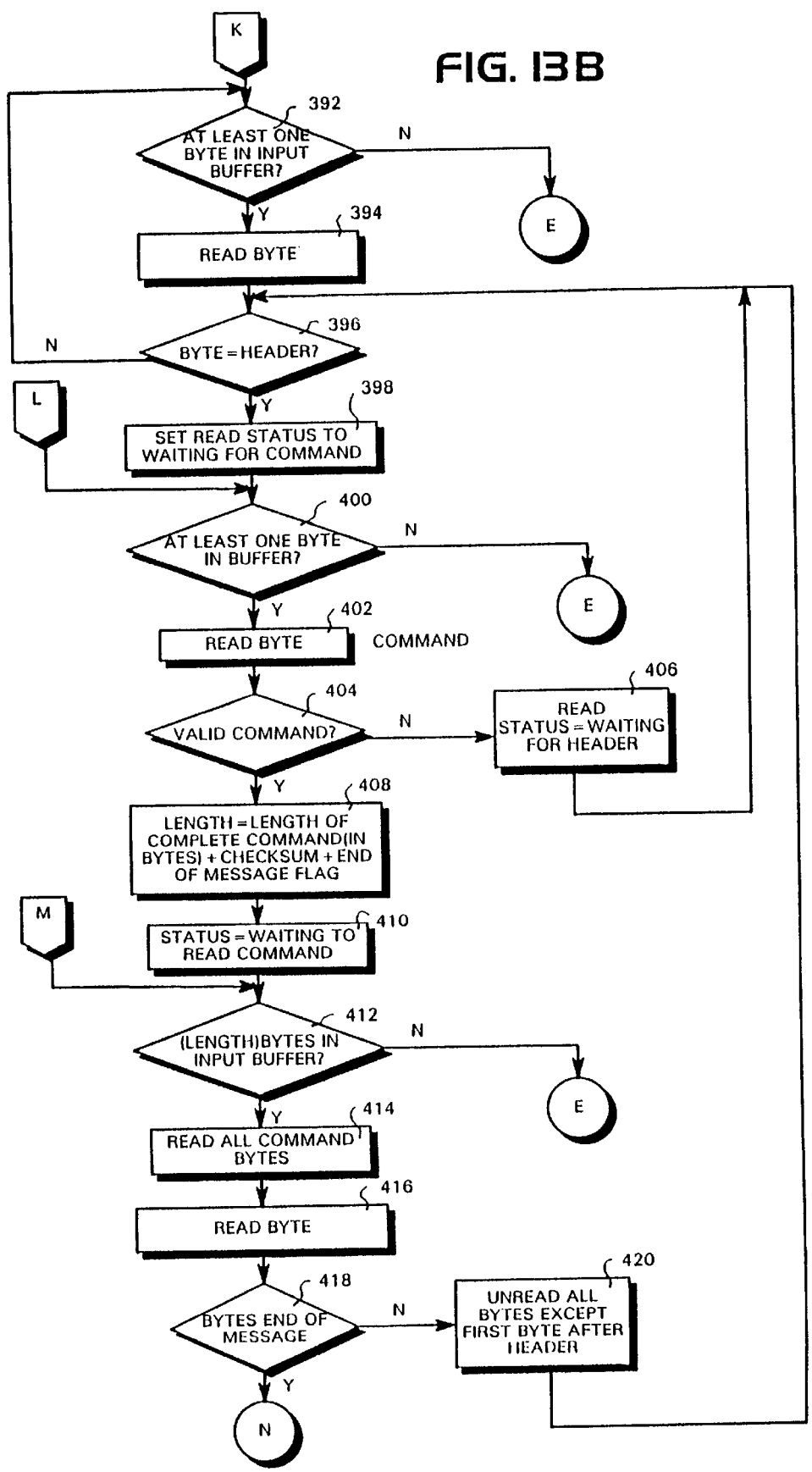

Turning back to the main processing routine in FIG. 11, if the check at block 326 indicates that there is data present in the input host buffer, then the routine branches to block 388 in FIG. 13A. In block 388, a check is made to determine if the read status flag is set to "waiting for the header byte" to identify the start of the data stream. If not, then a check is made to determine if the status is "waiting for a command" (390).

If the check at block 388 indicates that the status is waiting for a header byte, then the routine branches to block 392 (FIG. 13B) where a check is made to determine if at least one byte is in the host input buffer. If not, then the routine branches back to the main program (FIG. 11) at block 328 to determine whether there is data in the input SNES buffer. If there is at least one byte in the input host buffer, then that byte is read (394) and a check is made to determine whether the byte is a header byte (396). If the byte is not a header byte, then the routine branches back to block 392 to await receipt of the header byte.

If the check at block 396 indicates that the byte is a header byte, then the read status is set to "waiting for command", and processing continues at block 400, where a check is made to determine if there is at least one byte in the host input buffer. If not, then the routine branches to the main program (FIG. 11) at block 328. If there is at least one byte in the buffer, that byte is read (402) and a check is made to determine if the byte read is indicative of a valid command (404). If the check at block 404 indicates that the command is not a valid command, then the read status flag is set to "waiting for header" and the routine branches back to block 396 to check for a header byte.

If the check at block 404 indicates that the byte read is indicative of a valid command (as, for example, indicated by a table of valid commands), then the microcontroller determines the length of the complete command including additional required information, such as checksum data and an end of message flag (408). In this fashion, the MCU 190 can ensure that the complete command has been received before any processing begins. Possible valid commands include "halt", "unhalt," various memory tests commands, a "reset to boot ROM" command, a command which changes the SNES engine identifying address various status check commands, etc. Thereafter, the status is set to "waiting to read command" (410).

If the check at block 390 (FIG. 13A) indicates that the status is "waiting for command", or if the status has just been set to "waiting to read command" (410), then a check is made at block 412 to determine whether the command length calculated in block 408 matches the length of the bytes in the input buffer (412). If the complete command is not resident in the input buffer, then the routine branches back to the main program at block 328 (FIG. 11). If the entire command is in the input buffer, then all command bytes are read (414). After all command bytes have been read, the next byte is read (416) and a check is made to determine whether the next byte is equal to the end of message flag (418).

If the last byte read is not an end of message byte, then an error occurred in the command processing and all bytes are unread except for the first byte after the header (420). Thereafter, the routine branches to block 396, where a check is made to determine if the byte read is a header byte.

If the last byte read as determined at block 418 was an end of message flag, then the routine branches to block 422 (FIG. 14) for command processing. Command processing begins by calculating a checksum based on the command message just received 422. Checksum data stored in the input buffer is then read (424). After setting the "read status" flag to "waiting for header" (426), the calculated and received checksums are compared to determine if there is a match (428). If the checksums do not match, then a reply is sent to the host computer 7 (over the same command link over which the comand was transmitted) indicating that the command was not properly received (430) and the routine branches back to block 328 (FIG. 11).

Figure 14:
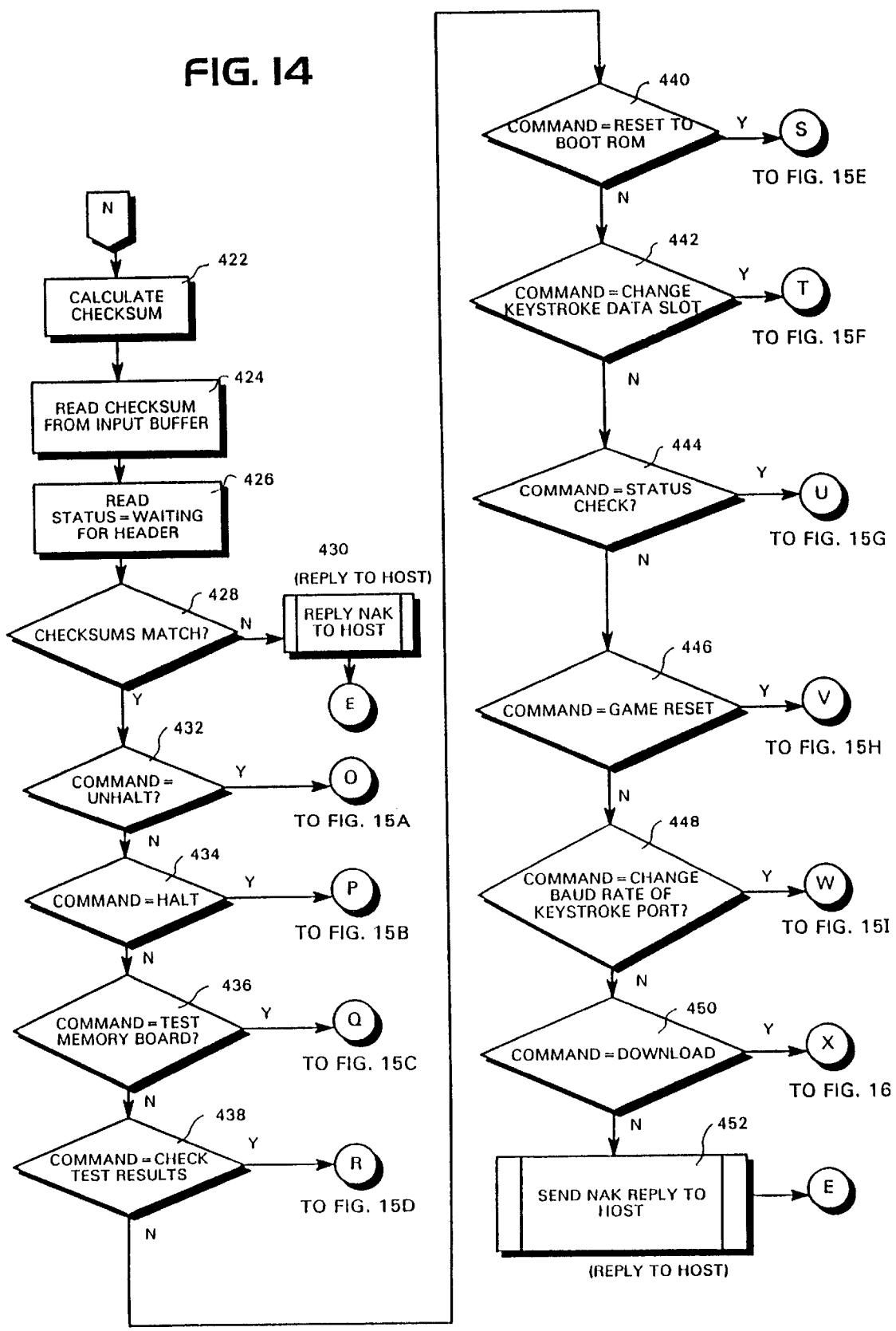
FIG. 14 is a flowchart delineating the sequence of operations involved the microcontroller's command processing.

If the checksums match, then a series of tests are performed (432–450) to determine which command has been transmitted so that command may be executed. As shown in FIG. 14, a series of tests determine whether the command is an "unhalt" command (432), "halt" command (434), "test memory board" command (436), "check test results" command (438), "reset to boot ROM" (440), "change keystroke data slot" command (442), "status check" command (444), "game reset" command (446), "change baud rate of keystroke port" command (448), or a "download" command (450).

If the series of "command" tests in block 428 through 450 each yield a negative result, then microcontroller 190 sends a non-acknowledged (NAK) reply to host computer 7 to indicate that either an invalid or unimplemented command has been received, and the routine branches back to the main program (FIG. 11) at block 328.

FIGS. 15A–15I, and FIG. 16 delineate the sequence of operations involved in executing the commands shown in FIG. 14. Turning to the "unhalt" command (block 432), to execute this command, the routine branches to block 454 (FIG. A) where a test is made to determine whether the SNES is busy as a safety check to ensure that the SNES is not in the process of receiving a downloaded game. If the SNES is busy, then a reply is sent to the host that the SNES is busy (456) and processing branches to block 328 (FIG. 11).

If the SNES is not busy, then the "unhalt" command is executed (458) and an acknowledgement signal is sent to the host indicating that the "unhalt" command was properly received and executed (460), and the routine branches to FIG. 11A at block 328.

Figure 15A:
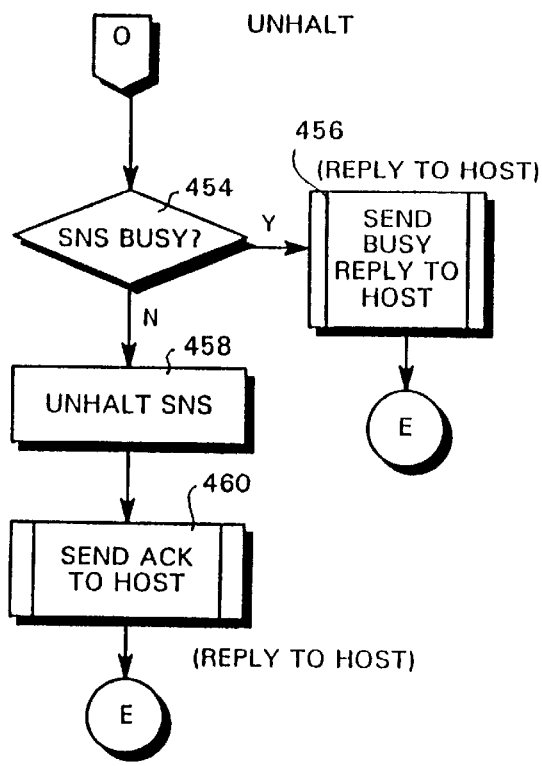
FIGS. 15A–15I delineate the sequence of operations involved in executing the commands shown in FIG. 14.
Figure 15B:
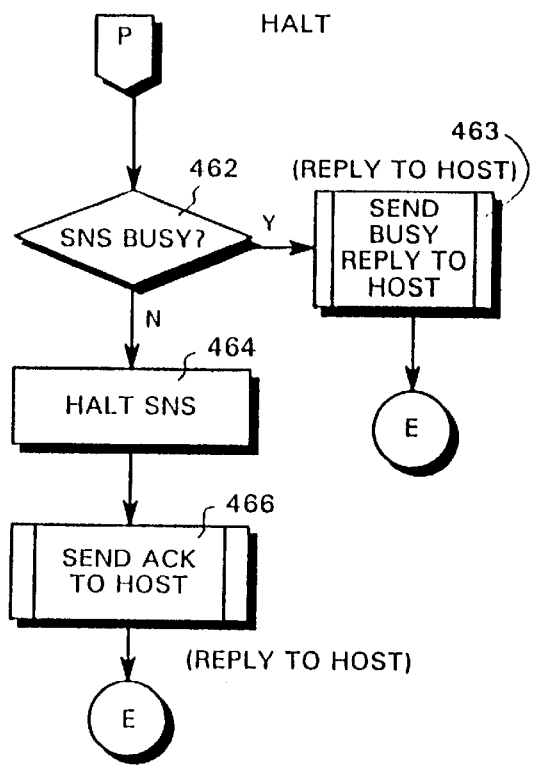

If an "unhalt" command was not received, but a "halt" command was received, then the routine branches to block 462 (FIG. 15B). Much like the "unhalt" processing, "halt" processing begins by checking to determine whether the SNES is busy (462). If the SNES is busy, then a busy reply is sent to the host (463) and the routine branches to block 328 (FIG. 11). If the SNES is not busy, then the halt command is executed by microcontroller 190 (464), an acknowledgement signal is forwarded to host computer 7 (466), and the routine branches to block 328 of FIG. 11A.

Figure 15C:
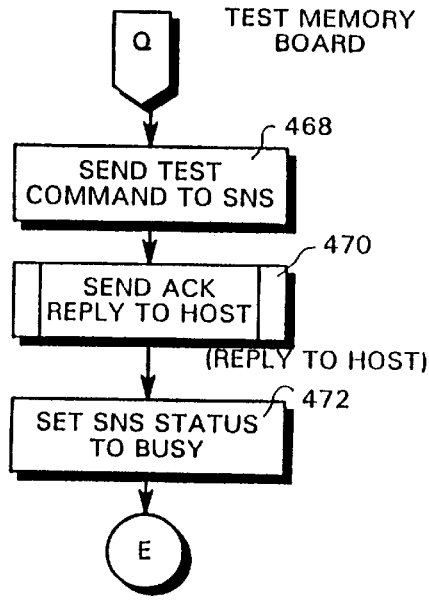
Figure 15D:
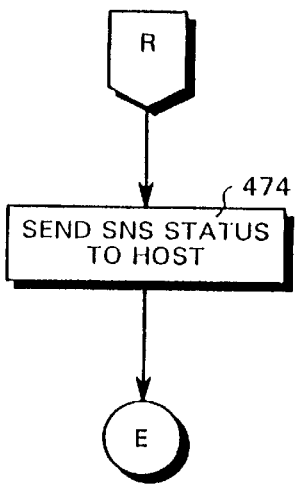

If the comand being processed is a "test memory board instruction" (436), then the routine branches to block 468 FIG. 15C. At block 468, the Super NES is reset to a boot state to await a command. Microcontroller 190 then sends a memory test command to the SNES (468). The microcontroller 190 then sends an acknowledgement signal to the host computer 7 (470) to indicate a memory test is in progress and sets the SNES status as busy (472). The routine then 17 branches to block 328 (FIG. 1A).

If the check at block 438 of FIG. 14 indicates that a "check test results" command is being processed, then the routine branches to block 474 (FIG. 15D), where the SNES status is sent to the host and the routine branches to block 328 (FIG. 11). If a memory test is still in progress, then the SNES status is busy. If the memory tests evidence an operational condition, then the status is "okay". If the test results indicate a memory read or memory write error, then the status is set to a "no good" (NG) condition.

Figure 15E:
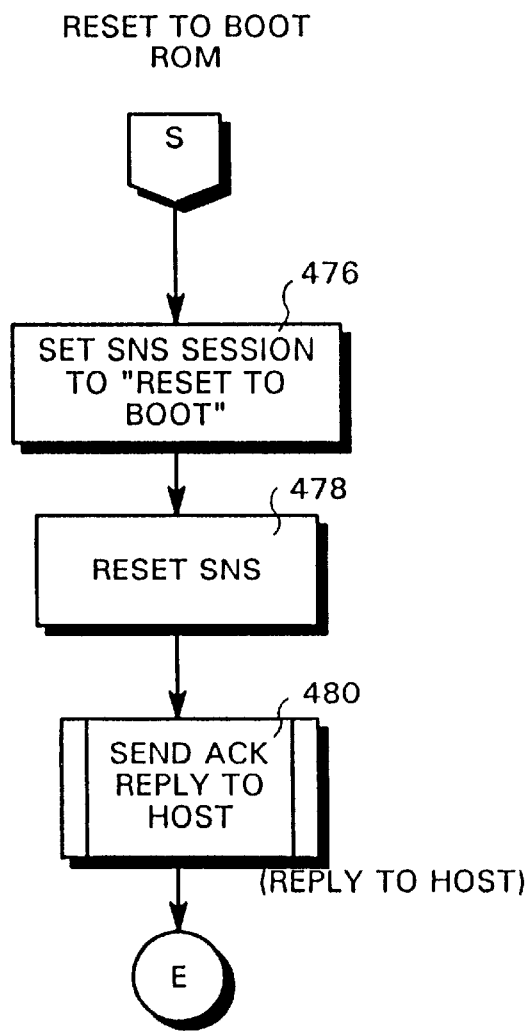
Figure 15F:
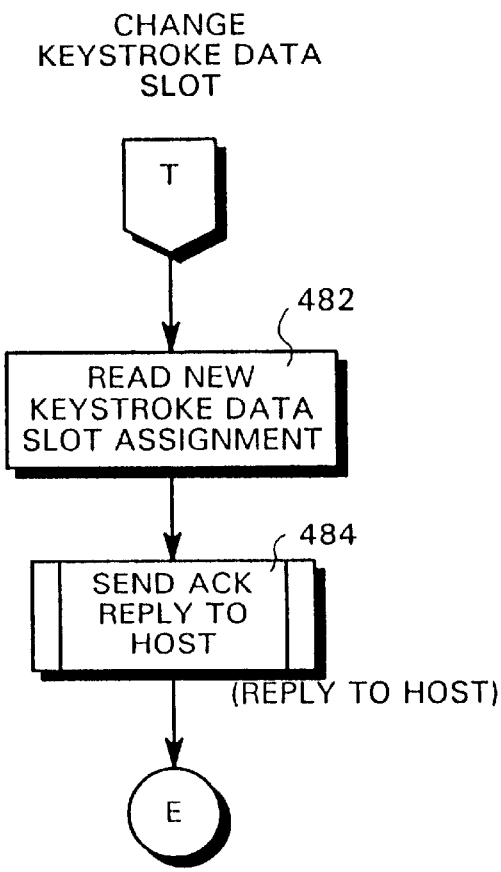

If the check at block 440 of FIG. 14 indicates that the command is a "reset to boot ROM" command, then the routine branches to FIG. 15E at block 476, where the SNES sessions status is changed to "reset to boot." The SNES is then placed in a reset state (478) after which the boot ROM program is executed (see FIG. 10 A–D) and a reply is sent to the host acknowledging the completion of the receipt and execution of the command (480) after which processing branches to block 328 (FIG. 11).

If the processing at block 442 indicates that a "change keystroke data slot" command is to be executed, then the routine branches to block 482 (FIG. 15F) where the microcontroller 190 reads a new keystroke data slot assignment. The keystroke data slot assignment indicates to the microcontroller 190 which position in the keystroke data stream contains keystroke data for it to process. This command may be optionally utilized to change the SNES engine time slot such that if only the last SNES engine in the array is currently active, the time slot can be changed for that SNES engine from the last time slot to the first to avoid unnecessarily sending dummy data to inactive SNES engines.

After reading a new keystroke data slot assignment, microcontroller 190 sends an acknowledgement reply to host computer 7 (484), and the routine branches to block 328 FIG. 1A).

Figure 15G:
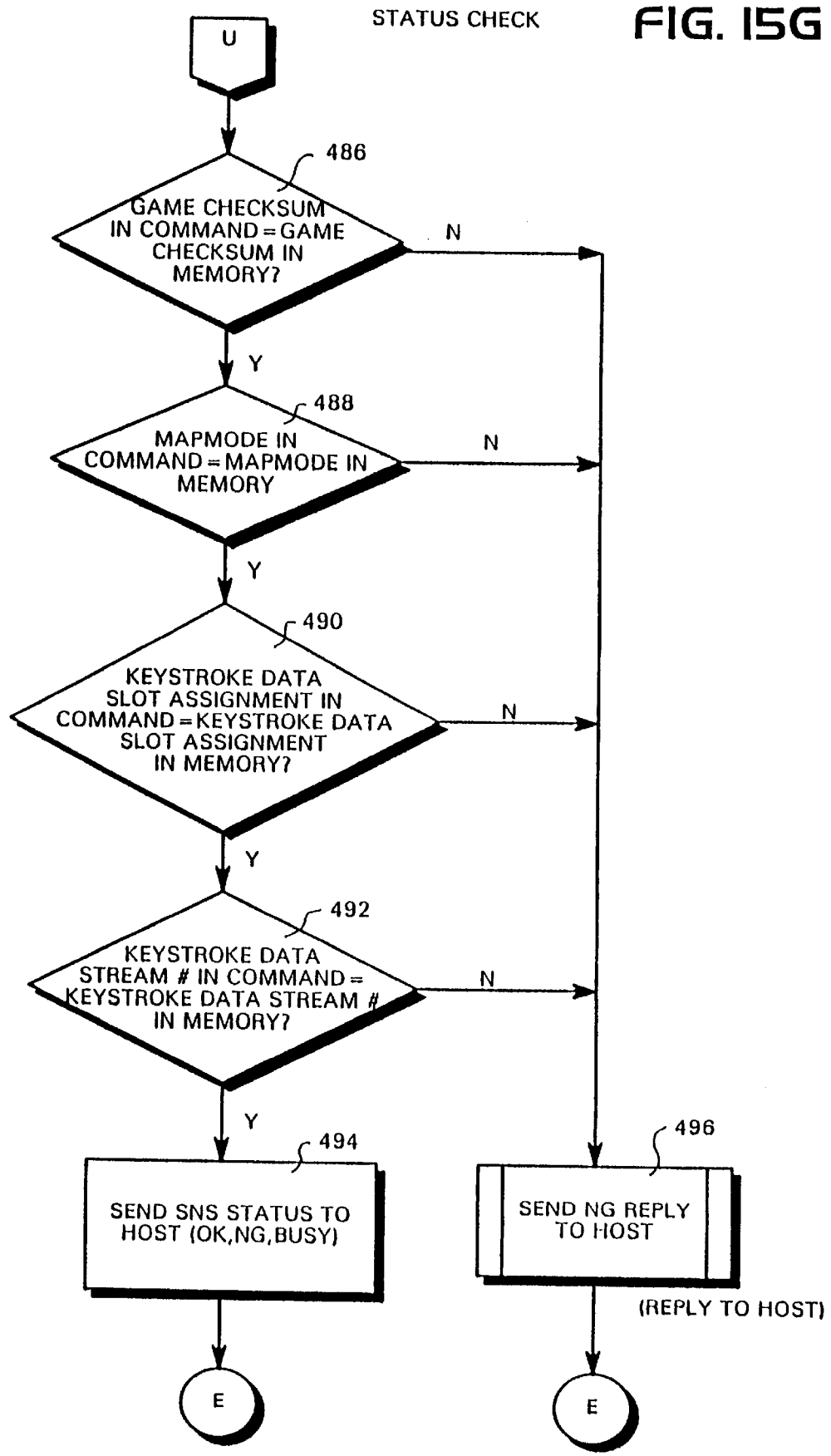

If the processing at block 444 (FIG. 14) indicates that a "status check" command is being processed, then the routine branches to block 486 of FIG. 15G. The status check subroutine checks the status of the Super NES to, for example, determine the status of the game program download operation. In accordance with block 486, a comparison is made of the game checksum in the command for the game that the host computer 7 expects to have associated with the particular SNES engine with the game checksum stored in memory. If there is not a match, then the routine branches to block 496 where a "No Good" (NG) reply is sent to the host computer 7 the microcontroller 190 and the routine branches to block 328 (FIG. 11).

If the checksums match, then a check is made at block 488 to determine whether the map mode indication in the command being processed is equal to the map mode information stored in memory. If the map mode data does not match, then the routine branches to block 496 to generate a NG reply message. If the map mode information matches, then a check is made to determine whether the keystroke data slot assignment in the command matches the keystroke data slot assignment in memory (490). If there is not a match, then processing continues at block 496, where a NG reply message is sent to the host computer 7.

If the keystroke data slot assignment information matches, then a check is made at block 492 to determine whether the keystroke data stream identifier in the command matches the keystroke data stream identifier stored in the microcontroller memory.

If there is not a match, then a NG reply message is generated (496). If there is a match, then the SNES status is sent to the host computer 7 and processing continues at block 328 (FIG. 11).

The status information sent to the host 7 can be either "okay", "NG", or "busy". The NG status generated at block 494 differs from the non-acknowledgement NG status generated at block 496 which indicates that the individual command is invalid. The NG status at block 494 indicates that, while the individual command being processed was valid and properly received, the overall status of the SNES is not good for any one of a variety of reasons.

Figure 15H:
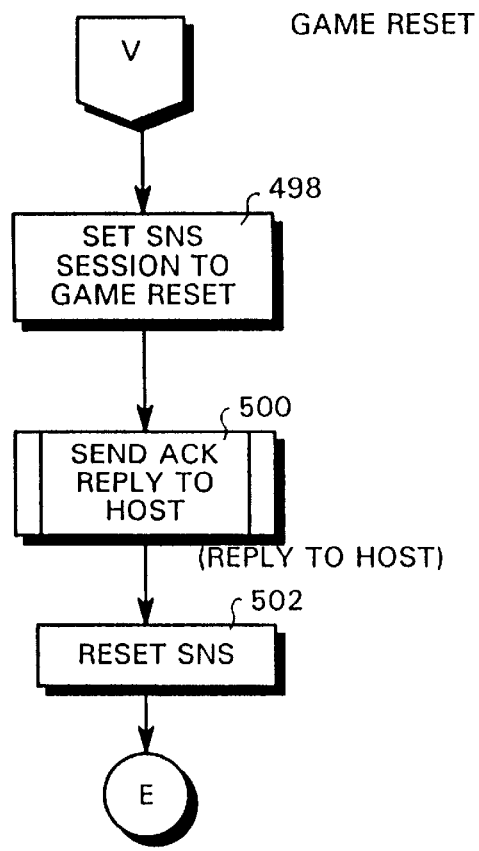

If the check at block 446 (FIG. 14) indicates that a "game reset" command is being processed, then the routine branches to block 498 of FIG. 15H. At block 498, the SNES session status is set to game reset. An acknowledgement reply is then sent to the host computer 7 to indicate that the game reset command has been properly received (500), the SNES is reset (502), and the routine branches to block 328 (FIG. 1A). The reset command processing at block 502 results in the SNES reexecuting the program stored in its pseudo-static RAM.

Figure 15I:
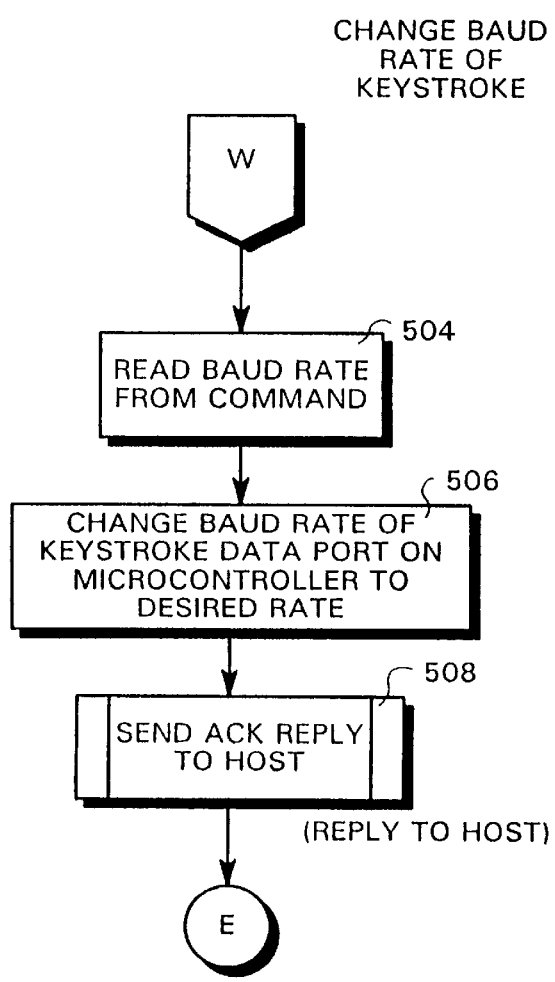

If the processing at block 448 (FIG. 14) indicates that the command is a "change baud rate of keystroke port", then the routine branches to block 504 (FIG. 15I). At block 504, a baud rate is read from the command and stored in a register used by the microcontroller 190 to define the baud rate. Thereafter, the keystroke data port baud rate is set to the desired rate, as indicated by the contents of the associated register (506), and an acknowledgement of successful execution of the command is sent to the host computer 500. The routine branches to block 328 (FIG. 11).

If the check at block 450 (FIG. 14) indicates that a download command is to be executed, then microcontroller 190 branches to block 654 of FIG. 16. To execute a download command, microcontroller 190 sets the SNES status to busy at block 654 to prevent any other commands from being executed during downloading operations. Thereafter, a file ID (656) and a game checksum are retrieved from the command (658).

Map mode and game size information are then retrieved from the command (660). Keystroke data slot assignment information, if any, is retrieved from the command (662). Finally, for example, a 21-byte game name is retrieved from the command (664). Thereafter, the SNES session status is set to "download start" (666), and the SNES is reset (668). The SNES reset process involves generating a "hello" message, as previously described, and the microcontroller 190 responds by initiating the download after determining that the SNES session is "download start". Thereafter, microcontroller 190 sends an acknowledgement reply to host computer 7 to indicate that the download operation has been executed and processing returns to the main program (FIG. 11) at block 328.

Turning back briefly to FIG. 11, after data has been processed in the keystroke input buffer, and the host input buffer, a check is made at block 328 to determine if there is data in the SNES input buffer. If there is data in the SNES input buffer, then the routine branches to block 672 (FIG. 17) to read a byte from the SNES input buffer. The byte read from the input buffer may validly be any one of six bytes shown in FIG. 17. With respect to block 674, the information sent from the SNES to microcontroller 190 could be an indication that the download checksum is "okay" and that the game program may be executed.

If the test at block 674 is negative, then a check is made to see if the byte is an indication that the download checksum was no good (676). If the check at block 676 is negative, then a check is made to determine whether the byte received is a reset related "hello" signal which indicates that the SNES is waiting for instructions for proceeding. If the check at block 676 is negative, then a check is made at block 680 to determine whether the byte indicates that the downloading is complete.

If the test at block 680 is negative, then a check is made at block 682 to see whether the byte indicates that the memory board test was no good. If the check at block 682 is negative, then a final test is made as to whether the byte which has been read indicates that the memory board test is okay (684). If the check at block 684 is negative, then the routine branches to block 324 (FIG. 11) to test whether there is data in the keystroke input buffer.

Turning to FIG. 18A, if the check at block 674 of FIG. 17 indicates that the download checksum is okay, then the routine branches to block 686, where the SNES status is set to "okay". Thereafter, the SNES session status is set to "running game" (688) and the routine branches to FIG. 11 at block 324.

If the check at block 676 indicated that the byte in the SNES input buffer was "download checksum No Good", then the routine branches to block 690 (FIG. 18B), which sets the SNES status to "No Good (NG)". Thereafter, the SNES session status is set to "waiting for command" (692). Since no game program can be run under the condition, the routine branches block 324 (FIG. 11).

If the processing at block 678 indicates that the byte is a reset related "hello" indication, then the processing branches to block 694 (FIG. 18C). During the reset "hello" processing, all the SNES session status possibilities are checked. Turning first to block 694, a check is made to determine whether the SNES session is "reset to boot". If so, then the routine branches to block 706 (FIG. 18D) where a "wait for command" command is sent to the SNES. After the SNES session status is set to waiting for command (708), and the SNES is set to "okay" (710), processing continues at block 324 (FIG. 11).

If the check at block 694 is negative, and the check at block 696 indicates that the status is "waiting for a command", then the routine branches to block 712 (FIG. 18I) where the SNES status is set to busy. If the SNES session status is "waiting for command", an error condition exists since the SNES should not be waiting for a microcontroller command. At block 714, the SNES is reset and the SNES session status is set to "error" (716) to identify an error condition (the processing for which is explained further below in conjunction with FIG. 18G) and the routine branches to FIG. 11 at block 324.

If the SNES session status, as determined by the check at block 700, is "ruuning game", the routine likewise branches to block 712–716, i.e., the routine shown in FIG. 18E. If the processor is in the reset subroutine shown in FIG. 18C, it should not be in a running game session status so the FIG. 18E error processing routine is performed. Similarly, if the check at block 698 indicates that the SNES session status is downloading, then the routine also branches to block 712 shown in FIG. 18E to repeat the error condition processing.

If the check at block 702 indicates that the SNES session status is "reset game", then processing branches to block 718 (FIG. 18F). At block 718, the microcontroller 190 sends the reset game command to the SNES. After the microcontroller 190 sends the stored map mode and size of the game to the SNES (720) and changes the SNES status to okay (722), a session status is changed to game running (724), and the routine branches to FIG. 11 at block 324.

If the check at block 704 indicates that the SNES session status is an error condition, then the routine branches to block 726 of FIG. 18G. At block 726, the SNES status is set to "NG", and the SNES session status is set to "waiting for command" (728). The host computer 7 initiates an appropriate remedial action such as, for example, repeating the game program download, and the routine branches to block 324 (FIG. 11).

Figure 18H:
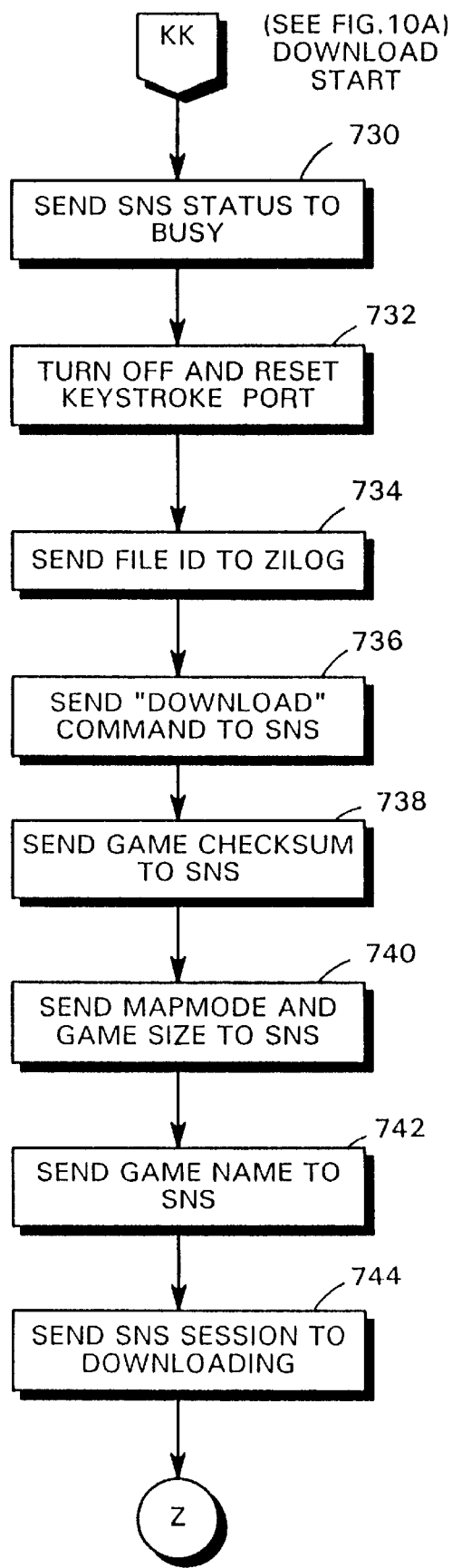

If the check at block 704 indicates that the SNES session status is not "error", then the routine jumps to the "download start" routine shown in FIG. 18H. The download start routine results from the Super NES generating a "hello" command which triggers a download response from microcontroller 190. The "download start" processing begins by setting the SNES status to busy (730). Thereafter, the keystroke port is turned off and reset so that the downloading processing is not interrupted (732). The game file ID is sent to the ZILOG communication controller 192 (FIG. 7) coupled to microcontroller 190 so that the game to be downloaded is identified (734). Thereafter, in steps 736, 738, 740 and 742, respectively, the NES is sent a download command, game checksum, map mode and game size and a 21-byte game name. The SNES session is then set to downloading (744) and the routine branches back to block 324 in FIG. 11.

Figures 19, 20:
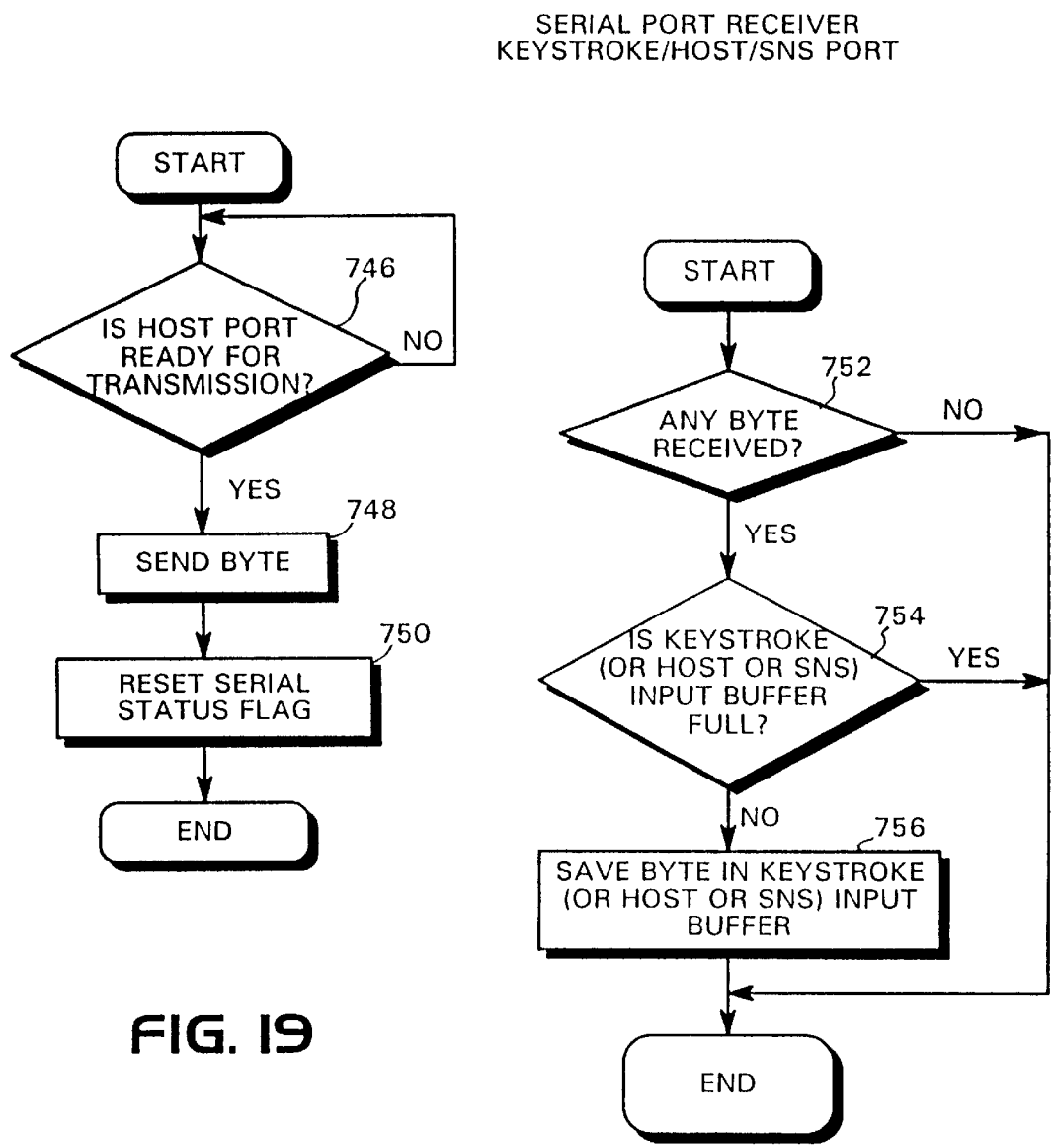
FIG. 19 delineates the sequence of operations performed in a "reply to host" subroutine.
FIG. 20 delineates the sequence of operations performed when receiving keystroke, host, or SNES data at a microcontroller port.

FIG. 19 delineates the sequence of operations performed in a "reply to host" subroutine where an acknowledged or not-acknowledged reply is sent by microcontroller 190 to host computer 7. A check is first made to determine whether the host port is ready for transmission (746). If the host port is not ready for transmission, then the routine waits until the host port is ready. The host port ready state may be determined by checking whether data is present in a predetermined register. Once the host port is ready for transmission, the requested byte is sent to the host (748) and the serial status flag of the microcontroller is reset (750) to indicate a reply has been generated.

FIG. 20 delineates the sequence of operations performed when receiving keystroke, host, or SNES data at a microcontroller port. Initially, a check is made at block 752 to determine whether any byte is received at the subject port. If no byte is received, then the "receive" processing ends. If a byte has been received, then a check is made as to whether the keystroke (or host or SNES) input buffer is full. If the respective buffer is not full, then the byte is saved in the keystroke (or host or SNES) buffer and the routine ends. If the keystroke (or host or SNES) input buffer is full, then the receiver processing ends.

Figure 21:
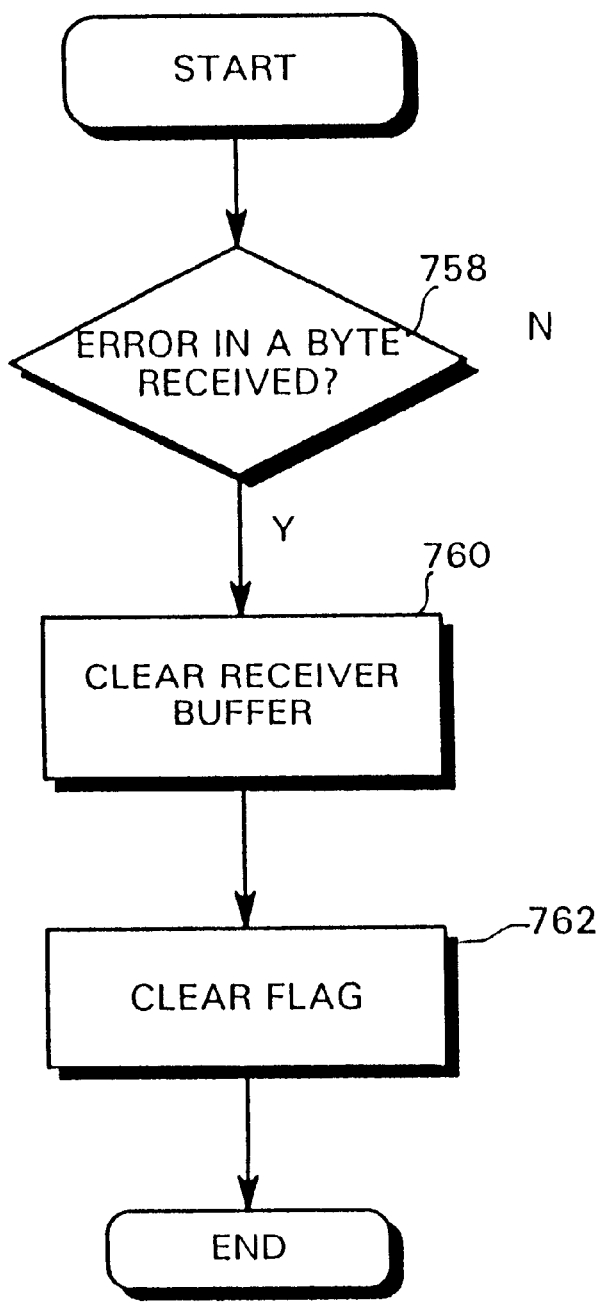
FIG. 21 is a flowchart which delineates the sequence of operations performed if the MCU 190 detects an error in receiving data on one of its serial ports.

FIG. 21 is a flowchart which delineates the sequence of operations performed if the MCU 190 detects an error in receiving data on one of its serial ports. If an error is detected, an internal interrupt routine causes branching to block 758 which determines if there is an error in the byte received. If so, the receiver buffer is cleared (760) to delete the erroneous data. The flag which triggers the interrupt is then cleared (762) and the error routine is exited. If there is not an error in the byte received, then the error routine is exited.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A guest room communications system for generating interactive, in-room videographic display sessions in a plurality of guest rooms comprising:

an in-room display located in each of the plurality of guest rooms;

an array of videographic processing systems, the number of videographic processing systems in said array being less than the number of guest rooms, each videographic processing system including:

a videographics program executing processor receiving information generated during an in-room interactive videographics display session, and a memory system, coupled to said videographics program executing processor, storing a videographics program, each videographic processing system in the array assignable to any of the in-room displays; and a data director directing information generated in one of the guest rooms to an identified videographics processing system for processing.

2. A guest room communications system according to claim 1, wherein each of the plurality of guest rooms includes an in-room controller having a plurality of control keys for generating keystroke data.

3. A guest room communications system according to claim 2, wherein the controller includes a reset key, and wherein an assigned one of the videographics program executing processors is reset in response to the actuation of the reset key.

4. A guest room communications system according to claim 2, wherein the in-room controller includes a plurality of video game control keys.

5. A guest room communications system according to claim 2, wherein each videographics processing system includes a buffer that stores keystroke data generated by the in-room controller corresponding to the room to which the videographics processing system is assigned.

6. A guest room communications system according to claim 5, wherein the keystroke data is processed if at least two bytes of data are present in the buffer.

7. A guest room communications system according to claim 5, wherein if keystroke data is present in the buffer, the corresponding videographics processing system determines whether the first byte of data is a header byte.

8. A guest room communications system according to claim 5, further comprising:

a host computer system controlling loading of videographics program data to one of the videographics processing systems.

9. A guest room communications system according to claim 8, wherein each videographics processing system includes a buffer that stores data received from the host computer, and wherein if data is present in the buffer, the videographics processing system checks to determine if a valid command is received from the host computer.

10. A guest room communications system according to claim 1, wherein each videographics processing system is capable of executing at least one test command.

11. A guest room communications system for generating in-room video displays on one of a plurality of guest room display units, comprising:
- a controller;
- a plurality of computer programs identifiable by program identifiers; and
- a plurality of first data processors, each of the plurality of first data processors for executing at least one of the plurality of programs stored in its associated program receiving system for generating a video display on a guest room display device, the controller being operable to dynamically assign each of the plurality of first data processors to one of the plurality of guest room display units,
- wherein the controller indicates that one of the computer programs is to be executed by an assigned one of the first data processors.

12. A guest room communications system according to claim 11, further including:
- a plurality of second processors, each coupled to an associated one of the first data processors, for performing interface tasks for the associated first processor.

13. A guest room communications system according to claim 11, further including:
- a guest room television monitor for displaying videographics data resulting from the execution of a selected one of the plurality of programs.

14. A guest room communications system in accordance with claim 11, further including:
- a display processing unit coupled to the first data processor for generating a video signal for displaying on the in-room display screen.

15. A videographics entertainment system comprising:
- a first number of remotely-located displays;
- a host computer;
- a storage device storing a plurality of computer programs; and
- a second number, less than the first number, of videographics processing systems, each videographics processing system being operable to execute one of the plurality of computer programs stored in the storage device and to generate a videographics display on one of the plurality of displays,
- wherein the host computer is operable to dynamically assign each of the videographic processing systems to any one of the displays.

16. A videographics entertainment system in accordance with claim 15, wherein the received program is a video game program.

17. A videographics entertainment system in accordance with claim 15, wherein each of the videographics processing systems includes a central processing unit for executing programs and a display processing unit coupled to the central processing unit for generating a video signal for display on one of the plurality of displays.

18. A videographics entertainment system in accordance with claim 15, wherein each of the videographics processing systems includes a central processing unit and a boot read-only memory for storing a program to be executed by the central processing unit at power-up.

19. A videographics entertainment system according to claim 15, wherein each of the videographics processing systems includes a central processing unit and an interface control processor for receiving information to be coupled to the central processing unit for processing.

20. In a guest room entertainment system having a host computer, a plurality of in-room display units, and an array of videographics processing systems, where the number of videographics processing systems is smaller than the number of in-room display systems, a method of operating the guest room entertainment system, comprising:
- displaying at each of the plurality of in-room display units, a display menu identifying a plurality of videographics programs;
- detecting the videographics program selected by a user;
- dynamically assigning one of the videographics processing systems to the in-room display unit where a videographics program was selected;
- providing the videographics program selected by the user to the assigned videographics processing system; and
- the assigned videographics processing system executing the videographics program selected by the user.

21. A method according to claim 20, further comprising:
- displaying indicia indicative of different video games which may be selected for play.

22. A method according to claim 20, further comprising:
- transferring a selected video game to the assigned videographics processing system.

23. A room based communications system, comprising:
- a plurality of in-room display units;
- an array of videographics processing systems including plural video game processors each being coupled to a storage that stores at least one of a plurality of computer programs,
- a host computer controlling operation of the array of videographics processing systems by dynamically assigning ones of the videographics processing systems to any one of the in-room display units, a number of videographics processing systems being less than a number of in-room display devices;
- each associated receiving system storing program information and moving object and background character data and each videographics processor executing a program transferred from the storage to generate a videographics display at a display unit and processing moving object and background character data stored in said associated receiving system.

24. A room based communication system according to claim 24, further comprising:
- an in-room controller having a plurality of control keys for generating keystroke data.

25. A room based communications system according to claim 24, wherein the controller includes a reset key, and wherein an assigned one of the video game processors is reset in response to the actuation of the reset key.

26. A room based communications system according to claim 24, further comprising:
- a microcontroller, coupled to each videographics processor, having an input port and at least one buffer coupled to said input port and further including an interface for coupling keystroke data to the input port, the microcontroller being operable to perform repetitive tests to determine whether keystroke data received from the controller is present in the at least one buffer.

27. A room based communications system according to claim 23, wherein the host computer controls transfer of video graphics program data to at least one of said videographics processing systems.

28. A passenger-based communications system for generating interactive, videographic display sessions at a plurality of passenger locations, comprising:

a display located at each of the plurality of passenger locations;

an array of videographic processing systems, the number of videographic processing systems in the array being less than the number of passenger locations, each videographic processing system including:

a videographics program executing processor receiving information generated during an interactive videographics display session, and a memory system, coupled to the videographics program executing processor, storing a videographics program, each videographic processing system in the array assignable to any of the passenger displays; and a data director directing information generated at one of the passenger seats to an identified videographics processing system for processing.

29. A passenger-based communications system according to claim 28, wherein each of the plurality of passenger locations includes a controller having a plurality of control keys for generating keystroke data.

30. A passenger-based communications system according to claim 28, wherein the controller includes a reset key, and wherein an assigned one of the videographics program executing processors is reset in response to the actuation of the reset key.

31. A passenger-based communications system according to claim 28, wherein the controller includes a plurality of video game control keys.

32. A passenger-based communications system according to claim 28, wherein each videographics processing system includes a buffer that stores keystroke data generated by the room controller corresponding to the passenger location to which the videographics processing system is assigned.

33. A passenger-based communications system according to claim 32, wherein the keystroke data is processed if at least two bytes of data are present in the buffer.

34. A passenger-based communications system according to claim 32, wherein if keystroke data is present in the buffer, the corresponding videographics processing system determines whether the first byte of data is a header byte.

35. A passenger-based communications system according to claim 28, further comprising:

a host computer system controlling loading of videographics program data to one of the videographics processing systems.

36. A passenger-based communications system according to claim 35, wherein each videographics processing system includes a buffer that stores data received from the host computer, and wherein if data is present in the buffer, the videographics processing system checks to determine if a valid command is received from the host computer.

37. A passenger-based communications system according to claim 28, wherein each videographics processing system is capable of executing at least one test command.

38. A passenger-based communications system for generating video displays on one of a plurality of passenger display units, comprising:

a controller;

a plurality of computer programs identifiable by program identifiers; and a plurality of first data processors, each of the plurality of first data processors configured to execute at least one of the plurality of programs stored in its associated program receiving system to generate a video display on one of the passenger display units, the controller configured to dynamically assign each of the plurality of first data processors to one of the plurality of passenger display units, wherein the controller is configured to indicate that one of the computer programs is to be executed by an assigned one of the first data processors.

39. A passenger-based communications system according to claim 38, further including:

a plurality of second processors, each coupled to an associated one of the first data processors, configured to perform interface tasks for the associated first processor.

40. A passenger-based communications system according to claim 38, further including:

a display processing unit coupled to the first data processor configured to generate a video signal for displaying on the passenger display unit.

41. In a passenger-based entertainment system having a host computer, a plurality of passenger display units, and an array of videographics processing systems, where the number of videographics processing systems is smaller than the number of passenger display units, a method of operating the passenger-based entertainment system, comprising:

displaying at each of the plurality of passenger display units, a display menu identifying a plurality of videographics programs;

detecting the videographics program selected by a passenger;

dynamically assigning one of the videographics processing systems to the passenger display unit where a videographics program was selected;

providing the videographics program selected by the passenger to the assigned videographics processing system; and the assigned videographics processing system executing the videographics program selected by the passenger.

42. A method according to claim 41, further comprising: displaying information indicative of different video games which may be selected for play.

43. A method according to claim 41, further comprising: transferring a selected video game to the assigned videographics processing system.

44. A passenger-based communications system, comprising:

a plurality of passenger display units;

an array of videographics processing systems including plural video game processors each being coupled to a storage that stores at least one of a plurality of computer programs, a host computer controlling operation of the array of videographics processing systems by dynamically assigning ones of the videographics processing systems to any one of the passenger display units, a number of videographics processing systems being less than a number of passenger display units;

each associated receiving system storing program information and moving object and background character data and each videographics processor executing a program transferred from the storage to generate a videographics display at a display unit and processing moving object and background character data stored in the associated receiving system.

45. A passenger-based communication system according to claim 44, further comprising:

a passenger-based controller having a plurality of control keys for generating keystroke data.

46. A passenger-based communications system according to claim 45, wherein the controller includes a reset key, and wherein an assigned one of the video game processors is reset in response to the actuation of the reset key.

47. A passenger-based communications system according to claim 45, further comprising:

a microcontroller, coupled to each videographics processor, having an input port and at least one buffer coupled to the input port and further including an interface for coupling keystroke data to the input port, the microcontroller being operable to perform tests to determine whether keystroke data received from the controller is present in the at least one buffer.

48. A passenger-based communications system according to claim 44, wherein the host computer controls transfer of videographics program data to at least one of the videographics processing systems.

* * * * *